United States Patent
Li et al.

(10) Patent No.: US 9,344,211 B2
(45) Date of Patent: *May 17, 2016

(54) OFDMA WITH ADAPTIVE SUBCARRIER-CLUSTER CONFIGURATION AND SELECTIVE LOADING

(71) Applicant: Adaptix, Inc., Plano, TX (US)

(72) Inventors: Xiaodong Li, Bellevue, WA (US); Hui Liu, Clyde Hill, WA (US); Kemin Li, Bellevue, WA (US); Wenzhong Zhang, Bellevue, WA (US)

(73) Assignee: Adaptix, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,749

(22) Filed: Jul. 23, 2015

(65) Prior Publication Data

US 2015/0326345 A1 Nov. 12, 2015

Related U.S. Application Data

(63) Continuation of application No. 14/678,848, filed on Apr. 3, 2015, now Pat. No. 9,191,138, which is a continuation of application No. 14/294,117, filed on Jun. 2, 2014, which is a continuation of application No.

(Continued)

(51) Int. Cl.
*H04L 1/00* (2006.01)
*H04W 72/04* (2009.01)
(Continued)

(52) U.S. Cl.
CPC ............ *H04J 11/005* (2013.01); *H04B 17/345* (2015.01); *H04J 11/003* (2013.01); *H04L 1/0003* (2013.01); *H04L 1/0005* (2013.01); *H04L 1/0009* (2013.01); *H04L 1/0011* (2013.01); *H04L 1/0025* (2013.01); *H04L 1/0026* (2013.01); *H04L 1/0079* (2013.01);
(Continued)

(58) Field of Classification Search
CPC ... H04L 1/0026; H04L 1/0003; H04L 5/0007; H04W 72/0406; H04W 72/0453; H04W 72/082
See application file for complete search history.

(56) References Cited

U.S. PATENT DOCUMENTS

| 4,355,411 | A | 10/1982 | Reudink et al. |
| 4,488,445 | A | 12/1984 | Aske |

(Continued)

FOREIGN PATENT DOCUMENTS

| CA | 2119983 A1 | 9/1994 |
| CA | 2254643 A1 | 7/1999 |

(Continued)

OTHER PUBLICATIONS

5:13-cv-1774, -1776, -1777, -1778, -1844, -2023, Claim Construction Order, U.S. District Court for Northern District of California, U.S. Magistrate Judge Paul S. Grewal, Dec. 19, 2013, 4 pgs.

(Continued)

*Primary Examiner* — Charles C Jiang
*Assistant Examiner* — Thad Defauw
(74) *Attorney, Agent, or Firm* — Martin & Ferraro, LLP

(57) ABSTRACT

A method and apparatus for allocating subcarriers in an orthogonal frequency division multiple access (OFDMA) system is described. In one embodiment, the method comprises allocating at least one diversity cluster of subcarriers to a first subscriber and allocating at least one coherence cluster to a second subscriber.

32 Claims, 7 Drawing Sheets

Related U.S. Application Data

13/230,625, filed on Sep. 12, 2011, now Pat. No. 8,964,719, which is a continuation of application No. 12/748,781, filed on Mar. 29, 2010, now Pat. No. 8,036,199, which is a continuation of application No. 11/931,926, filed on Oct. 31, 2007, now Pat. No. 7,715,358, which is a continuation of application No. 11/199,586, filed on Aug. 8, 2005, now Pat. No. 7,454,212, which is a continuation of application No. 09/738,086, filed on Dec. 15, 2000, now Pat. No. 6,947,748.

(51) Int. Cl.

| | | |
|---|---|---|
| *H04W 72/08* | (2009.01) | |
| *H04L 5/00* | (2006.01) | |
| *H04J 11/00* | (2006.01) | |
| *H04B 17/345* | (2015.01) | |
| *H04L 1/04* | (2006.01) | |
| *H04L 5/02* | (2006.01) | |
| *H04L 27/26* | (2006.01) | |
| *H04W 74/04* | (2009.01) | |
| *H04W 24/08* | (2009.01) | |
| *H04L 25/02* | (2006.01) | |

(52) U.S. Cl.
CPC *H04L 1/04* (2013.01); *H04L 5/006* (2013.01); *H04L 5/0007* (2013.01); *H04L 5/0037* (2013.01); *H04L 5/0046* (2013.01); *H04L 5/0048* (2013.01); *H04L 5/0064* (2013.01); *H04L 5/0073* (2013.01); *H04L 5/0082* (2013.01); *H04L 5/0094* (2013.01); *H04L 5/023* (2013.01); *H04L 25/0228* (2013.01); *H04L 27/2601* (2013.01); *H04L 27/2602* (2013.01); *H04W 24/08* (2013.01); *H04W 72/04* (2013.01); *H04W 72/042* (2013.01); *H04W 72/0406* (2013.01); *H04W 72/0453* (2013.01); *H04W 72/082* (2013.01); *H04W 72/085* (2013.01); *H04W 74/04* (2013.01); *H04L 5/0042* (2013.01); *H04L 25/0226* (2013.01)

(56) References Cited

U.S. PATENT DOCUMENTS

| | | |
|---|---|---|
| 4,670,889 A | 6/1987 | Hewitt et al. |
| 4,794,635 A | 12/1988 | Hess |
| 5,038,399 A | 8/1991 | Bruckert |
| 5,048,059 A | 9/1991 | Dent |
| 5,200,957 A | 4/1993 | Dahlin |
| 5,212,831 A | 5/1993 | Chuang et al. |
| 5,239,676 A | 8/1993 | Strawczynski et al. |
| 5,260,967 A | 11/1993 | Schilling |
| 5,267,261 A | 11/1993 | Blakeney, II et al. |
| 5,280,630 A | 1/1994 | Wang |
| 5,282,222 A | 1/1994 | Fattouche et al. |
| 5,291,475 A | 3/1994 | Bruckert |
| 5,319,634 A | 6/1994 | Bartholomew |
| 5,323,447 A | 6/1994 | Gillis et al. |
| 5,327,576 A | 7/1994 | Uddenfeldt et al. |
| 5,345,599 A | 9/1994 | Paulraj et al. |
| 5,410,538 A | 4/1995 | Roche et al. |
| 5,437,054 A | 7/1995 | Rappaport et al. |
| 5,444,697 A | 8/1995 | Leung et al. |
| 5,448,750 A | 9/1995 | Eriksson et al. |
| 5,471,647 A | 11/1995 | Gerlach et al. |
| 5,479,447 A | 12/1995 | Chow et al. |
| 5,491,837 A | 2/1996 | Haartsen |
| 5,492,837 A | 2/1996 | Naser-Kolahzadeh |
| 5,504,775 A | 4/1996 | Chouly et al. |
| 5,504,783 A | 4/1996 | Tomisato et al. |
| 5,507,008 A | 4/1996 | Kanai et al. |
| 5,507,034 A | 4/1996 | Bodin et al. |
| 5,515,378 A | 5/1996 | Roy, III et al. |
| 5,546,090 A | 8/1996 | Roy, III et al. |
| 5,548,582 A | 8/1996 | Brajal et al. |
| 5,555,268 A | 9/1996 | Fattouche et al. |
| 5,577,022 A | 11/1996 | Padovani |
| 5,581,548 A | 12/1996 | Ugland et al. |
| 5,586,148 A | 12/1996 | Furukawa et al. |
| 5,588,020 A | 12/1996 | Schilling |
| 5,590,156 A | 12/1996 | Carney |
| 5,592,490 A | 1/1997 | Barratt et al. |
| 5,598,417 A | 1/1997 | Crisler |
| 5,623,484 A | 4/1997 | Muszynski |
| 5,634,199 A | 5/1997 | Gerlach et al. |
| 5,642,353 A | 6/1997 | Roy, III et al. |
| 5,687,194 A | 11/1997 | Paneth et al. |
| 5,708,973 A | 1/1998 | Ritter |
| 5,726,978 A | 3/1998 | Frodigh et al. |
| 5,732,353 A | 3/1998 | Haartsen |
| 5,734,967 A | 3/1998 | Kotzin et al. |
| 5,764,699 A | 6/1998 | Needham et al. |
| 5,774,808 A | 6/1998 | Sarkioja et al. |
| 5,784,363 A | 7/1998 | Engstrom et al. |
| 5,793,759 A | 8/1998 | Rakib et al. |
| 5,796,722 A | 8/1998 | Kotzin et al. |
| 5,799,000 A | 8/1998 | Hoole |
| 5,819,168 A | 10/1998 | Golden et al. |
| 5,822,372 A | 10/1998 | Emami |
| 5,828,658 A | 10/1998 | Ottersten et al. |
| 5,838,673 A | 11/1998 | Ritz et al. |
| 5,839,074 A | 11/1998 | Plehn et al. |
| 5,848,358 A | 12/1998 | Forssen et al. |
| 5,854,981 A | 12/1998 | Wallstedt et al. |
| 5,862,487 A | 1/1999 | Fuji et al. |
| 5,867,478 A | 2/1999 | Baum et al. |
| 5,884,145 A | 3/1999 | Haartsen |
| 5,886,988 A | 3/1999 | Yun et al. |
| 5,887,245 A | 3/1999 | Lindroth et al. |
| 5,887,263 A | 3/1999 | Ishii |
| 5,909,436 A | 6/1999 | Engstrom et al. |
| 5,912,876 A | 6/1999 | H'Mimy |
| 5,912,931 A | 6/1999 | Matsumoto |
| 5,914,933 A | 6/1999 | Cimini et al. |
| 5,914,946 A | 6/1999 | Avidor et al. |
| 5,933,421 A | 8/1999 | Alamouti et al. |
| 5,943,375 A | 8/1999 | Veintimilla |
| 5,956,642 A | 9/1999 | Larsson et al. |
| 5,966,644 A | 10/1999 | Suzuki |
| 5,973,642 A | 10/1999 | Li et al. |
| 5,982,327 A | 11/1999 | Vook et al. |
| 5,982,760 A | 11/1999 | Chen |
| 5,991,273 A | 11/1999 | Abu-Dayya et al. |
| 5,991,331 A | 11/1999 | Chennakeshu et al. |
| 6,005,876 A | 12/1999 | Cimini, Jr. et al. |
| 6,006,075 A | 12/1999 | Smith et al. |
| 6,009,087 A | 12/1999 | Uchida et al. |
| 6,009,332 A | 12/1999 | Haartsen |
| 6,009,553 A | 12/1999 | Martinez et al. |
| 6,016,311 A | 1/2000 | Gilbert |
| 6,018,528 A | 1/2000 | Gitlin et al. |
| 6,023,622 A | 2/2000 | Plaschke et al. |
| 6,026,123 A | 2/2000 | Williams |
| 6,037,898 A | 3/2000 | Parish et al. |
| 6,038,450 A | 3/2000 | Brink et al. |
| 6,041,237 A | 3/2000 | Farsakh |
| 6,044,067 A | 3/2000 | Suzuki |
| 6,047,189 A | 4/2000 | Yun et al. |
| 6,052,594 A | 4/2000 | Chuang et al. |
| 6,061,568 A | 5/2000 | Dent |
| 6,064,339 A | 5/2000 | Wax et al. |
| 6,064,692 A | 5/2000 | Chow |
| 6,064,694 A | 5/2000 | Clark et al. |
| 6,067,290 A | 5/2000 | Paulraj et al. |
| 6,072,988 A | 6/2000 | Minegishi |
| 6,081,536 A | 6/2000 | Gorsuch |
| 6,085,114 A | 7/2000 | Gibbons |
| 6,091,717 A | 7/2000 | Honkasalo et al. |
| 6,091,955 A | 7/2000 | Aalto et al. |
| 6,097,771 A | 8/2000 | Foschini |

(56) References Cited

U.S. PATENT DOCUMENTS

| | | |
|---|---|---|
| 6,108,374 A | 8/2000 | Balachandran et al. |
| 6,108,565 A | 8/2000 | Scherzer |
| 6,111,919 A | 8/2000 | Yonge, III |
| 6,115,614 A | 9/2000 | Furukawa |
| 6,119,011 A | 9/2000 | Borst et al. |
| 6,122,260 A | 9/2000 | Liu et al. |
| 6,128,276 A | 10/2000 | Agee |
| 6,131,016 A | 10/2000 | Greenstein et al. |
| 6,141,565 A | 10/2000 | Feuerstein et al. |
| 6,141,567 A | 10/2000 | Youssefmir et al. |
| 6,144,652 A | 11/2000 | Avidor et al. |
| 6,144,654 A | 11/2000 | Ibanez-Meier et al. |
| 6,144,696 A | 11/2000 | Shively et al. |
| 6,144,711 A | 11/2000 | Raleigh et al. |
| 6,154,661 A | 11/2000 | Goldburg |
| 6,160,791 A | 12/2000 | Bohnke |
| 6,175,550 B1 | 1/2001 | van Nee |
| 6,192,026 B1 | 2/2001 | Pollack et al. |
| 6,198,928 B1 | 3/2001 | Keurulainen et al. |
| 6,208,663 B1 | 3/2001 | Schramm et al. |
| 6,212,242 B1 | 4/2001 | Smith et al. |
| 6,212,388 B1 | 4/2001 | Seo |
| 6,215,815 B1 | 4/2001 | Chen et al. |
| 6,215,827 B1 | 4/2001 | Balachandran et al. |
| 6,226,320 B1 | 5/2001 | Hakkinen et al. |
| 6,246,713 B1 | 6/2001 | Mattisson |
| 6,246,881 B1 | 6/2001 | Parantainen et al. |
| 6,253,063 B1 | 6/2001 | Cudak et al. |
| 6,253,094 B1 | 6/2001 | Schmutz |
| 6,259,686 B1 | 7/2001 | Blanc et al. |
| 6,276,297 B1 | 8/2001 | van den Berg et al. |
| 6,281,840 B1 | 8/2001 | Miyoshi et al. |
| 6,282,185 B1 | 8/2001 | Hakkinen et al. |
| 6,298,035 B1 | 10/2001 | Heiskala |
| 6,298,092 B1 | 10/2001 | Heath, Jr. et al. |
| 6,304,593 B1 | 10/2001 | Alouini et al. |
| 6,307,851 B1 | 10/2001 | Jung et al. |
| 6,314,082 B1 | 11/2001 | Malmgren |
| 6,327,314 B1 | 12/2001 | Cimini, Jr. et al. |
| 6,327,472 B1 | 12/2001 | Westroos et al. |
| 6,330,429 B1 | 12/2001 | He |
| 6,330,460 B1 | 12/2001 | Wong et al. |
| 6,334,047 B1 | 12/2001 | Andersson et al. |
| 6,347,091 B1 | 2/2002 | Wallentin et al. |
| 6,351,499 B1 | 2/2002 | Paulraj et al. |
| 6,351,643 B1 | 2/2002 | Haartsen |
| 6,359,867 B1 | 3/2002 | Vehmas |
| 6,359,923 B1 | 3/2002 | Agee et al. |
| 6,366,195 B1 | 4/2002 | Harel et al. |
| 6,377,631 B1 | 4/2002 | Raleigh |
| 6,377,632 B1 | 4/2002 | Paulraj et al. |
| 6,377,636 B1 | 4/2002 | Paulraj et al. |
| 6,385,462 B1 | 5/2002 | Baum et al. |
| 6,388,999 B1 | 5/2002 | Gorsuch et al. |
| 6,400,679 B1 | 6/2002 | Suzuki |
| 6,400,699 B1 | 6/2002 | Airy et al. |
| 6,404,783 B1 | 6/2002 | Cimini, Jr. et al. |
| 6,405,043 B1 | 6/2002 | Jensen et al. |
| 6,405,044 B1 | 6/2002 | Smith et al. |
| 6,405,048 B1 | 6/2002 | Haartsen |
| 6,411,186 B1 | 6/2002 | Lilleberg et al. |
| 6,415,153 B1 | 7/2002 | Liew |
| 6,424,836 B1 | 7/2002 | Gil et al. |
| 6,430,148 B1 | 8/2002 | Ring |
| 6,434,392 B1 | 8/2002 | Posti |
| 6,442,130 B1 | 8/2002 | Jones et al. |
| 6,445,916 B1 | 9/2002 | Rahman |
| 6,449,246 B1 | 9/2002 | Barton et al. |
| 6,452,981 B1 | 9/2002 | Raleigh et al. |
| 6,463,096 B1 | 10/2002 | Raleigh et al. |
| 6,463,295 B1 | 10/2002 | Yun |
| 6,463,296 B1 | 10/2002 | Esmailzadeh et al. |
| 6,470,044 B1 | 10/2002 | Kowalski |
| 6,473,418 B1 | 10/2002 | Laroia et al. |
| 6,473,467 B1 | 10/2002 | Wallace et al. |
| 6,477,158 B1 | 11/2002 | Take |
| 6,487,253 B1 | 11/2002 | Jones, IV et al. |
| 6,493,331 B1 | 12/2002 | Walton et al. |
| 6,496,490 B1 | 12/2002 | Andrews et al. |
| 6,501,785 B1 | 12/2002 | Chang et al. |
| 6,512,737 B1 | 1/2003 | Agee |
| 6,519,462 B1 | 2/2003 | Lu et al. |
| 6,526,281 B1 | 2/2003 | Gorsuch et al. |
| 6,529,488 B1 | 3/2003 | Urs et al. |
| 6,535,501 B1 | 3/2003 | Bohnke |
| 6,539,233 B1 | 3/2003 | Taketsugu et al. |
| 6,545,997 B1 | 4/2003 | Bohnke et al. |
| 6,546,249 B1 | 4/2003 | Imai et al. |
| 6,553,001 B1 | 4/2003 | Indira |
| 6,553,011 B1 | 4/2003 | Yan et al. |
| 6,553,234 B1 | 4/2003 | Florea |
| 6,556,557 B1 | 4/2003 | Cimini, Jr. et al. |
| 6,560,209 B1 | 5/2003 | Alamouti et al. |
| 6,563,786 B1 | 5/2003 | Van Nee |
| 6,567,374 B1 | 5/2003 | Bohnke et al. |
| 6,567,383 B1 | 5/2003 | Bohnke et al. |
| 6,567,387 B1 | 5/2003 | Dulin et al. |
| 6,574,476 B1 | 6/2003 | Williams |
| 6,584,330 B1 | 6/2003 | Ruuska |
| 6,587,696 B1 | 7/2003 | Ma |
| 6,600,772 B1 | 7/2003 | Zeira et al. |
| 6,600,776 B1 | 7/2003 | Alamouti et al. |
| 6,600,934 B1 | 7/2003 | Yun et al. |
| 6,606,296 B1 | 8/2003 | Kokkonen |
| 6,608,863 B1 | 8/2003 | Onizawa et al. |
| 6,609,039 B1 | 8/2003 | Schoen |
| 6,611,506 B1 | 8/2003 | Huang et al. |
| 6,615,024 B1 | 9/2003 | Boros et al. |
| 6,633,614 B1 | 10/2003 | Barton et al. |
| 6,647,078 B1 | 11/2003 | Thomas |
| 6,647,271 B1 | 11/2003 | Doi |
| 6,654,431 B1 | 11/2003 | Barton et al. |
| 6,654,612 B1 | 11/2003 | Avidor et al. |
| 6,657,949 B1 | 12/2003 | Jones, IV et al. |
| 6,674,732 B1 | 1/2004 | Boehnke et al. |
| 6,681,256 B1 | 1/2004 | Kuntze et al. |
| 6,690,944 B1 | 2/2004 | Lee et al. |
| 6,693,884 B1 | 2/2004 | Gutowski |
| 6,694,147 B1 | 2/2004 | Viswanath et al. |
| 6,699,784 B2 | 3/2004 | Xia et al. |
| 6,701,129 B1 | 3/2004 | Hashem et al. |
| 6,711,416 B1 | 3/2004 | Zhang |
| 6,721,159 B2 | 4/2004 | Takashige et al. |
| 6,721,569 B1 | 4/2004 | Hashem et al. |
| 6,726,297 B1 | 4/2004 | Uesugi et al. |
| 6,726,978 B2 | 4/2004 | Sehr |
| 6,741,861 B2 | 5/2004 | Bender et al. |
| 6,748,222 B1 | 6/2004 | Hashem et al. |
| 6,751,193 B1 | 6/2004 | Kudrimoti et al. |
| 6,751,261 B1 | 6/2004 | Olsson et al. |
| 6,751,444 B1 | 6/2004 | Meiyappan |
| 6,751,480 B2 | 6/2004 | Kogiantis et al. |
| 6,757,265 B1 | 6/2004 | Sebastian et al. |
| 6,760,882 B1 | 7/2004 | Gesbert et al. |
| 6,775,320 B1 | 8/2004 | Tzannes et al. |
| 6,781,974 B1 | 8/2004 | Tsumura |
| 6,782,037 B1 | 8/2004 | Krishnamoorthy et al. |
| 6,785,227 B1 | 8/2004 | Lu et al. |
| 6,788,349 B2 | 9/2004 | Wu et al. |
| 6,795,392 B1 | 9/2004 | Li et al. |
| 6,795,424 B1 | 9/2004 | Kapoor et al. |
| 6,801,513 B1 | 10/2004 | Gibbons et al. |
| 6,801,775 B1 | 10/2004 | Gibbons et al. |
| 6,816,452 B1 | 11/2004 | Maehata et al. |
| 6,826,240 B1 | 11/2004 | Thomas et al. |
| 6,834,045 B1 | 12/2004 | Lappetelainen et al. |
| 6,850,506 B1 | 2/2005 | Holtzman et al. |
| 6,862,272 B2 | 3/2005 | Dulin et al. |
| 6,865,237 B1 | 3/2005 | Boariu et al. |
| 6,868,277 B1 | 3/2005 | Cerwall et al. |
| 6,870,808 B1 | 3/2005 | Liu et al. |
| 6,870,826 B1 | 3/2005 | Ishizu |
| 6,873,612 B1 | 3/2005 | Steer et al. |
| 6,882,619 B1 | 4/2005 | Gerakoulis |

(56) References Cited

U.S. PATENT DOCUMENTS

| | | |
|---|---|---|
| 6,888,809 B1 | 5/2005 | Foschini et al. |
| 6,888,899 B2 | 5/2005 | Raleigh et al. |
| 6,891,792 B1 | 5/2005 | Cimini, Jr. et al. |
| 6,892,059 B1 | 5/2005 | Kim et al. |
| 6,904,030 B2 | 6/2005 | Lee et al. |
| 6,904,283 B2 | 6/2005 | Li et al. |
| 6,904,284 B2 | 6/2005 | Saito et al. |
| 6,907,244 B2 | 6/2005 | Santhoff et al. |
| 6,920,122 B1 | 7/2005 | Hanaoka et al. |
| 6,920,192 B1 | 7/2005 | Laroia et al. |
| 6,922,388 B1 | 7/2005 | Laroia et al. |
| 6,922,445 B1 | 7/2005 | Sampath et al. |
| 6,928,120 B1 | 8/2005 | Zhang |
| 6,937,557 B1 | 8/2005 | Sudo |
| 6,937,592 B1 | 8/2005 | Heath, Jr. et al. |
| 6,937,665 B1 | 8/2005 | Vandenameele |
| 6,944,120 B2 | 9/2005 | Wu et al. |
| 6,947,748 B2 | 9/2005 | Li et al. |
| 6,952,454 B1 | 10/2005 | Jalali et al. |
| 6,961,364 B1 | 11/2005 | Laroia et al. |
| 6,975,603 B1 | 12/2005 | Dicker et al. |
| 6,975,611 B1 | 12/2005 | Balachandran et al. |
| 6,985,432 B1 | 1/2006 | Hadad et al. |
| 6,985,433 B1 | 1/2006 | Laroia et al. |
| 6,985,434 B2 | 1/2006 | Wu et al. |
| 6,996,056 B2 | 2/2006 | Chheda et al. |
| 6,996,075 B2 | 2/2006 | Santhoff et al. |
| 6,996,100 B1 | 2/2006 | Haartsen |
| 7,010,048 B1 | 3/2006 | Shattil et al. |
| 7,020,072 B1 | 3/2006 | Li et al. |
| 7,031,753 B2 | 4/2006 | Hashem |
| 7,039,120 B1 | 5/2006 | Thoumy et al. |
| 7,047,011 B1 | 5/2006 | Wikman et al. |
| 7,051,268 B1 | 5/2006 | Sindhushayana et al. |
| 7,058,146 B2 | 6/2006 | Paulraj et al. |
| 7,062,246 B2 | 6/2006 | Owen |
| 7,062,294 B1 | 6/2006 | Rogard et al. |
| 7,062,295 B2 | 6/2006 | Yoshii et al. |
| 7,068,628 B2 | 6/2006 | Li et al. |
| 7,072,315 B1 | 7/2006 | Liu et al. |
| 7,072,410 B1 | 7/2006 | Monsen |
| 7,095,719 B1 | 8/2006 | Wilhelmsson et al. |
| 7,099,413 B2 | 8/2006 | Chuang et al. |
| 7,116,944 B2 | 10/2006 | Das et al. |
| 7,133,352 B1 | 11/2006 | Hadad |
| 7,133,380 B1 | 11/2006 | Winters et al. |
| 7,135,358 B2 | 11/2006 | Sugino et al. |
| 7,139,592 B2 | 11/2006 | Leifer et al. |
| 7,142,864 B2 | 11/2006 | Laroia et al. |
| 7,145,971 B2 | 12/2006 | Raleigh et al. |
| 7,146,172 B2 | 12/2006 | Li et al. |
| 7,180,877 B1 | 2/2007 | Benveniste |
| 7,203,191 B2 | 4/2007 | Garcia-Luna-Aceves et al. |
| 7,203,249 B2 | 4/2007 | Raleigh et al. |
| 7,209,745 B1 | 4/2007 | Sebastian et al. |
| 7,215,650 B1 | 5/2007 | Miller et al. |
| 7,224,741 B1 | 5/2007 | Hadad |
| 7,230,908 B2 | 6/2007 | Vanderaar et al. |
| 7,269,389 B2 | 9/2007 | Petrus et al. |
| 7,310,522 B2 | 12/2007 | Geile |
| 7,355,962 B2 | 4/2008 | Li et al. |
| 7,366,253 B2 | 4/2008 | Kim et al. |
| 7,373,151 B1 | 5/2008 | Ahmed |
| 7,376,172 B2 | 5/2008 | Laroia et al. |
| 7,379,506 B2 | 5/2008 | Boariu et al. |
| 7,379,742 B2 | 5/2008 | Li et al. |
| 7,450,604 B2 | 11/2008 | Gardner et al. |
| 7,454,212 B2 | 11/2008 | Li et al. |
| 7,489,934 B2 | 2/2009 | Li et al. |
| 7,509,138 B2 | 3/2009 | Shin et al. |
| 7,555,060 B2 | 6/2009 | Raleigh et al. |
| 7,573,850 B2 | 8/2009 | Li et al. |
| 7,573,851 B2 | 8/2009 | Xing et al. |
| 7,590,095 B2 | 9/2009 | Chen et al. |
| 7,650,152 B2 | 1/2010 | Li et al. |
| 7,664,188 B2 | 2/2010 | Raleigh et al. |
| 7,675,938 B2 | 3/2010 | Kolze |
| 7,706,315 B2 | 4/2010 | Vaneraar et al. |
| 7,715,358 B2 | 5/2010 | Li et al. |
| 7,720,468 B1 | 5/2010 | Hong et al. |
| 7,751,854 B2 | 7/2010 | Leifer et al. |
| 7,783,285 B2 | 8/2010 | Chater-Lea |
| 7,787,514 B2 | 8/2010 | Shattil |
| 7,787,872 B2 | 8/2010 | Minborg et al. |
| 7,826,560 B2 | 11/2010 | Raleigh et al. |
| 7,827,581 B1 | 11/2010 | Eiger et al. |
| 7,933,244 B2 | 4/2011 | Li et al. |
| 8,005,479 B2 | 8/2011 | Meiyappan |
| 8,014,781 B2 | 9/2011 | Ji et al. |
| 8,036,164 B1 | 10/2011 | Winters et al. |
| 8,036,199 B2 | 10/2011 | Li et al. |
| 8,036,307 B2 | 10/2011 | Raleigh et al. |
| 8,358,574 B2 | 1/2013 | Gerakoulis |
| 8,553,521 B2 | 10/2013 | Zhang et al. |
| 8,738,020 B2 | 5/2014 | Li et al. |
| 8,743,717 B2 | 6/2014 | Li et al. |
| 8,743,729 B2 | 6/2014 | Li et al. |
| 8,750,238 B2 | 6/2014 | Li et al. |
| 8,760,992 B2 | 6/2014 | Xing et al. |
| 8,767,702 B2 | 7/2014 | Li et al. |
| 8,797,970 B2 | 8/2014 | Xing et al. |
| 8,891,414 B2 | 11/2014 | Li et al. |
| 8,934,375 B2 | 1/2015 | Li et al. |
| 8,934,445 B2 | 1/2015 | Li et al. |
| 8,958,386 B2 | 2/2015 | Li et al. |
| 8,964,719 B2 | 2/2015 | Li et al. |
| 9,203,553 B1 | 12/2015 | Li et al. |
| 9,210,708 B1 | 12/2015 | Li et al. |
| 9,219,572 B2 | 12/2015 | Li et al. |
| 2001/0027113 A1 | 10/2001 | Hayashihara |
| 2001/0040089 A1 | 11/2001 | Hemingway et al. |
| 2001/0040880 A1 | 11/2001 | Chen et al. |
| 2002/0006120 A1 | 1/2002 | Suzuki et al. |
| 2002/0006167 A1 | 1/2002 | McFarland |
| 2002/0016173 A1 | 2/2002 | Hunzinger |
| 2002/0114269 A1 | 8/2002 | Onggosanusi et al. |
| 2002/0115468 A1 | 8/2002 | Haim |
| 2002/0154705 A1 | 10/2002 | Walton et al. |
| 2002/0160783 A1 | 10/2002 | Holtzman et al. |
| 2002/0181436 A1 | 12/2002 | Mueckenheim et al. |
| 2002/0183010 A1 | 12/2002 | Catreux et al. |
| 2002/0188723 A1 | 12/2002 | Choi et al. |
| 2002/0191535 A1 | 12/2002 | Sugiyama et al. |
| 2003/0003937 A1 | 1/2003 | Ohkubo et al. |
| 2003/0021245 A1 | 1/2003 | Haumonte et al. |
| 2003/0035491 A1 | 2/2003 | Walton et al. |
| 2003/0067890 A1 | 4/2003 | Goel et al. |
| 2003/0068984 A1 | 4/2003 | Shin et al. |
| 2003/0108089 A1 | 6/2003 | Lee et al. |
| 2003/0148738 A1 | 8/2003 | Das et al. |
| 2003/0165123 A1 | 9/2003 | Saunders |
| 2003/0169681 A1 | 9/2003 | Li et al. |
| 2003/0169824 A1 | 9/2003 | Chayat |
| 2003/0211831 A1 | 11/2003 | Xu et al. |
| 2004/0001429 A1 | 1/2004 | Ma et al. |
| 2004/0047309 A1 | 3/2004 | Barnes |
| 2004/0102207 A1 | 5/2004 | Wenzel |
| 2004/0131025 A1 | 7/2004 | Dohler et al. |
| 2004/0141548 A1 | 7/2004 | Shattil |
| 2004/0190484 A1 | 9/2004 | Shin et al. |
| 2005/0025099 A1 | 2/2005 | Heath et al. |
| 2005/0064908 A1 | 3/2005 | Boariu et al. |
| 2005/0088990 A1 | 4/2005 | Gibbons et al. |
| 2005/0163068 A1 | 7/2005 | Saifuddin |
| 2005/0185733 A1 | 8/2005 | Tolli et al. |
| 2005/0237989 A1 | 10/2005 | Ahn et al. |
| 2005/0286467 A1 | 12/2005 | Chang et al. |
| 2006/0007883 A1 | 1/2006 | Tong et al. |
| 2007/0280166 A1 | 12/2007 | Jung et al. |
| 2008/0031127 A1 | 2/2008 | Geile |
| 2008/0220776 A1 | 9/2008 | Tischer et al. |
| 2008/0248805 A1 | 10/2008 | Han et al. |
| 2009/0092037 A1 | 4/2009 | Hadad |
| 2010/0040089 A1 | 2/2010 | Cimini, Jr. et al. |

(56) References Cited

U.S. PATENT DOCUMENTS

| | | |
|---|---|---|
| 2010/0142553 A1 | 6/2010 | Kolze |
| 2010/0260134 A1 | 10/2010 | Heath, Jr. et al. |
| 2010/0303033 A1 | 12/2010 | Shahar et al. |
| 2011/0044394 A1 | 2/2011 | Wu et al. |
| 2011/0170446 A1 | 7/2011 | Li et al. |
| 2011/0222495 A1 | 9/2011 | Li et al. |
| 2011/0255577 A1 | 10/2011 | Agee et al. |
| 2011/0312367 A1 | 12/2011 | Meiyappan |
| 2014/0254494 A1 | 9/2014 | Clegg |
| 2014/0269609 A1 | 9/2014 | Li et al. |
| 2014/0328276 A1 | 11/2014 | Xing et al. |
| 2015/0016392 A1 | 1/2015 | Li et al. |
| 2015/0215062 A1 | 7/2015 | Li et al. |

FOREIGN PATENT DOCUMENTS

| | | |
|---|---|---|
| CN | 1187931 A | 6/1996 |
| CN | 1173265 | 2/1998 |
| CN | 1199298 A | 11/1998 |
| CN | 1240099 | 12/1999 |
| CN | 1242909 A | 1/2000 |
| CN | 1245623 | 2/2000 |
| CN | 1272991 A | 11/2000 |
| CN | 1470145 A | 1/2004 |
| CN | 1481633 A | 3/2004 |
| DE | 198 00 953 C1 | 7/1999 |
| EP | 0 283 683 A2 | 9/1988 |
| EP | 0 660 633 A2 | 6/1995 |
| EP | 0 719 003 A2 | 6/1996 |
| EP | 0 719 062 | 6/1996 |
| EP | 0 753 948 | 1/1997 |
| EP | 0 786 890 A2 | 7/1997 |
| EP | 0 978 962 A1 | 2/1998 |
| EP | 0 841 763 A1 | 5/1998 |
| EP | 0 869 647 A2 | 10/1998 |
| EP | 0 882 377 B1 | 12/1998 |
| EP | 0 923 262 A1 | 6/1999 |
| EP | 0 926 912 A2 | 6/1999 |
| EP | 0 929 202 A1 | 7/1999 |
| EP | 0 932 986 | 8/1999 |
| EP | 0 946 070 A2 | 9/1999 |
| EP | 0 955 736 A2 | 11/1999 |
| EP | 0 964 596 A2 | 12/1999 |
| EP | 0 975 097 A2 | 1/2000 |
| EP | 0 999 658 A2 | 5/2000 |
| EP | 1 001 566 A1 | 5/2000 |
| EP | 1 014 609 A1 | 6/2000 |
| EP | 1 021 882 B1 | 7/2000 |
| EP | 1 043 861 A1 | 10/2000 |
| EP | 1 047 209 A1 | 10/2000 |
| EP | 1 050 987 A1 | 11/2000 |
| EP | 1 094 644 A2 | 4/2001 |
| EP | 1 185 019 A2 | 3/2002 |
| FR | 2 777 407 A1 | 10/1999 |
| GB | 2 209 858 A | 5/1989 |
| GB | 2 309 858 A | 8/1997 |
| GB | 2 346 520 A | 8/2000 |
| GB | 2 392 065 | 2/2004 |
| JP | 1-317035 | 12/1989 |
| JP | 1990-141036 | 5/1990 |
| JP | 3-11561 B | 2/1991 |
| JP | 3-167924 | 7/1991 |
| JP | 1991-167924 | 7/1991 |
| JP | 6-029922 | 2/1994 |
| JP | 7-38943 | 2/1995 |
| JP | 7-170242 | 7/1995 |
| JP | 7-177569 | 7/1995 |
| JP | 7-183862 | 7/1995 |
| JP | 1995-183862 | 7/1995 |
| JP | 7-203531 | 8/1995 |
| JP | 7-222232 A | 8/1995 |
| JP | 7-240709 | 9/1995 |
| JP | 7-250368 A | 9/1995 |
| JP | 7-250374 | 9/1995 |
| JP | 7-264110 | 10/1995 |
| JP | 7-322219 A | 12/1995 |
| JP | 8-9456 A | 1/1996 |
| JP | 8-51463 | 2/1996 |
| JP | 8-54233 A | 2/1996 |
| JP | 8-65233 | 3/1996 |
| JP | 1996-132434 | 5/1996 |
| JP | 8-186509 | 7/1996 |
| JP | 8-223107 | 8/1996 |
| JP | 8-256103 | 10/1996 |
| JP | 8-265274 | 10/1996 |
| JP | 8-265832 | 10/1996 |
| JP | 8-288795 A | 11/1996 |
| JP | 8-288796 | 11/1996 |
| JP | 9-8770 A | 1/1997 |
| JP | 9-51394 | 2/1997 |
| JP | 9-55709 | 2/1997 |
| JP | 9-64804 | 3/1997 |
| JP | 9-167982 | 6/1997 |
| JP | 9-167990 | 6/1997 |
| JP | 9-321682 | 12/1997 |
| JP | 10-22889 | 1/1998 |
| JP | 10-503893 | 4/1998 |
| JP | 10-145854 A | 5/1998 |
| JP | 10-163994 A | 6/1998 |
| JP | 10-190621 A | 7/1998 |
| JP | 10-200474 | 7/1998 |
| JP | 10-209931 A | 8/1998 |
| JP | 10-247955 | 9/1998 |
| JP | 10-285233 | 10/1998 |
| JP | 10-303849 A | 11/1998 |
| JP | 11-27231 | 1/1999 |
| JP | 11-32028 A | 2/1999 |
| JP | 11-41138 | 2/1999 |
| JP | 11-55210 | 2/1999 |
| JP | 11-88244 A | 3/1999 |
| JP | 11-88288 A | 3/1999 |
| JP | 11-113049 A | 4/1999 |
| JP | 11-504169 A | 4/1999 |
| JP | 11-136179 A | 5/1999 |
| JP | 11-308195 | 5/1999 |
| JP | 11-163822 A | 6/1999 |
| JP | 11-196457 A | 7/1999 |
| JP | 11-205026 A | 7/1999 |
| JP | 11-508417 | 7/1999 |
| JP | 1999-205848 | 7/1999 |
| JP | 11-231033 | 8/1999 |
| JP | 11-234230 | 8/1999 |
| JP | 11-239115 A | 8/1999 |
| JP | 11-251986 A | 9/1999 |
| JP | 11-275047 A | 10/1999 |
| JP | 11-289211 A | 10/1999 |
| JP | 11-289212 A | 10/1999 |
| JP | 11-289213 A | 10/1999 |
| JP | 11-289285 A | 10/1999 |
| JP | 11-289578 | 10/1999 |
| JP | 11-298434 A | 10/1999 |
| JP | 11-308129 A | 11/1999 |
| JP | 11-308152 | 11/1999 |
| JP | 11-308153 | 11/1999 |
| JP | 11-308657 A | 11/1999 |
| JP | 11-312991 A | 11/1999 |
| JP | 11-313043 | 11/1999 |
| JP | 11-313299 | 11/1999 |
| JP | 11-331071 A | 11/1999 |
| JP | 11-346203 | 12/1999 |
| JP | 2000-13290 | 1/2000 |
| JP | 2000-13310 | 1/2000 |
| JP | 2000-13454 A | 1/2000 |
| JP | 2000-13842 A | 1/2000 |
| JP | 2000-22611 A | 1/2000 |
| JP | 2000-22660 | 1/2000 |
| JP | 2000-32565 A | 1/2000 |
| JP | 2000-40999 A | 2/2000 |
| JP | 2000-49663 | 2/2000 |
| JP | 2000-68975 | 3/2000 |
| JP | 2000-78062 | 3/2000 |
| JP | 2000-78111 A | 3/2000 |
| JP | 2000-78651 A | 3/2000 |

(56) References Cited

FOREIGN PATENT DOCUMENTS

| | | |
|---|---|---|
| JP | 2000-91973 | 3/2000 |
| JP | 2000-92009 | 3/2000 |
| JP | 2000-105888 A | 4/2000 |
| JP | 2000-114846 | 4/2000 |
| JP | 2000-115073 A | 4/2000 |
| JP | 2000-115834 A | 4/2000 |
| JP | 2000-138634 A | 5/2000 |
| JP | 2000-151484 A | 5/2000 |
| JP | 2000-174536 | 6/2000 |
| JP | 2000-183844 A | 6/2000 |
| JP | 2000-183849 A | 6/2000 |
| JP | 2000-196560 A | 7/2000 |
| JP | 2000-201134 A | 7/2000 |
| JP | 2000-209124 A | 7/2000 |
| JP | 2000-209145 | 7/2000 |
| JP | 2000-216748 A | 8/2000 |
| JP | 2000-216842 A | 8/2000 |
| JP | 2000-217145 | 8/2000 |
| JP | 2000-244442 A | 9/2000 |
| JP | 2000-252734 A | 9/2000 |
| JP | 2000-252863 A | 9/2000 |
| JP | 2000-269869 A | 9/2000 |
| JP | 2000-269926 A | 9/2000 |
| JP | 2000-278740 | 10/2000 |
| JP | 2000-286822 A | 10/2000 |
| JP | 2000-513180 A | 10/2000 |
| JP | 2000-312177 | 11/2000 |
| JP | 2000-315975 A | 11/2000 |
| JP | 2000-332724 A | 11/2000 |
| JP | 2000-341236 A | 12/2000 |
| JP | 2000-341247 A | 12/2000 |
| JP | 2001-077720 | 3/2001 |
| JP | 2001-238269 A | 8/2001 |
| JP | 2001-285192 A | 10/2001 |
| JP | 2002-505065 A | 2/2002 |
| JP | 2002-209124 | 7/2002 |
| JP | 2002-232936 | 8/2002 |
| JP | 2003-530010 | 10/2003 |
| JP | 3980478 B | 8/2004 |
| JP | 2004-527166 A | 9/2004 |
| JP | 2004-529524 | 9/2004 |
| JP | 4213466 B | 9/2004 |
| JP | 4201595 B | 1/2005 |
| JP | 5119070 B | 1/2013 |
| JP | 2013-55677 A | 3/2013 |
| KR | 1999-28244 | 4/1999 |
| KR | 10-2003-0015963 | 2/2003 |
| TW | 200420150 | 10/2004 |
| WO | WO 92/00590 A1 | 1/1992 |
| WO | WO 95/10144 | 4/1995 |
| WO | WO 96/00470 A1 | 1/1996 |
| WO | WO 96/00475 | 1/1996 |
| WO | WO 96/19055 A1 | 6/1996 |
| WO | WO 96/22662 A1 | 7/1996 |
| WO | WO 97/01256 A1 | 1/1997 |
| WO | WO 97/32441 | 9/1997 |
| WO | WO 97/45966 | 12/1997 |
| WO | WO 98/09381 | 3/1998 |
| WO | WO 98/15153 A1 | 4/1998 |
| WO | WO 98/16077 A2 | 4/1998 |
| WO | WO 98/24258 A2 | 6/1998 |
| WO | PCT/US97/23731 | 7/1998 |
| WO | WO 98/30047 A1 | 7/1998 |
| WO | WO 98/35463 | 8/1998 |
| WO | WO 98/37638 | 8/1998 |
| WO | WO 98/51030 | 11/1998 |
| WO | WO 98/59517 A1 | 12/1998 |
| WO | WO 99/30520 | 6/1999 |
| WO | WO 99/40689 | 8/1999 |
| WO | WO 99/41866 | 8/1999 |
| WO | WO 99/44257 | 9/1999 |
| WO | WO 99/57820 | 11/1999 |
| WO | WO 99/63691 | 12/1999 |
| WO | WO 99/65155 A | 12/1999 |
| WO | WO 00/79718 | 12/2000 |
| WO | WO 01/06689 | 1/2001 |
| WO | WO 01/99451 A1 | 12/2001 |
| WO | WO 02/31991 A2 | 4/2002 |
| WO | WO 02/33848 | 4/2002 |
| WO | WO 02/49305 A2 | 6/2002 |
| WO | WO 02/49385 A2 | 6/2002 |
| WO | WO 02/073831 | 9/2002 |
| WO | WO 2005/060132 | 6/2005 |

OTHER PUBLICATIONS

5:13-cv-1774, -1776, -1777, -1778, -1844, -2023, Defendants' Responsive Claim Construction Brief with Exhibits, Nov. 18, 2013, 324 pgs.

5:13-cv-1774, -1776, -1777, -1778, -1844, -2023, Plaintiff's Opening Claim Construction Brief with Exhibits, Oct. 22, 2013, 92 pgs.

5:13-cv-1774, -1776, -1777, -1778, -1844, -2023, Plaintiff's Reply Claim Construction Brief with Exhibits, Nov. 25, 2013, 56 pgs.

5:13-cv-1774, -1776, -1777, -1778, -1844, -2023, Transcript of Proceedings of the Official Electronic Sound Recording, U.S. District Court for the Northern District of California, the Honorable Paul S. Grewal presiding, Aug. 6, 2013, 6 pgs.

5:13-cv-1776, -1777, -1778, -1844, -2023, Expert Report of Michael Caloyannides Concerning Rebuttal to Expert Report of Thomas Fuja Regarding Validity of U.S. Pat. No. 6,947,748 and 7,454,212 filed by Plaintiff (Adaptix, Inc.), Non-Confidential Redacted Version, N.D. Cal., Aug. 27, 2014, 157 pgs.

6:12-cv-17, -20, -120, Defendants' Motion for Summary Judgment of Invalidity Based on Indefiniteness Under 35 U.S.C. §112(b), U.S. District Court for the Eastern District of Texas, Sep. 16, 2013, 18 pgs.

6:12-cv-17, -20, -120, Defendants' Reply in Support of Their Motion for Summary Judgment of Invalidity Based on Indefiniteness Under 35 U.S.C. §112(b), U.S. District Court for the Eastern District of Texas, Oct. 21, 2013, 11 pgs.

6:12-cv-17, -20, -120, Defendants' Responsive Claim Construction Brief will Exhibits, Aug. 9, 2013, 109 pgs.

6:12-cv-17, -20, -120, Plaintiff's Memorandum in Opposition to Defendants' Motion for Summary Judgment of Invalidity Based on Indefiniteness Under 35 U.S.C. §112(b), U.S. District Court for the Eastern District of Texas, Oct. 8, 2013, 24 pgs.

6:12-cv-17, -20, -120, Plaintiff's Opening Claim Construction Brief with Exhibits, Jul. 19, 2013, 112 pgs.

6:12-cv-17, -20, -120, Plaintiff's Reply Brief Claim Construction Brief, Aug. 19, 2013, 14 pgs.

6:12-cv-17, -20, -120, Plaintiff's Surreply in Opposition to Defendants' Motion for Summary Judgment of Invalidity Based on Indefiniteness Under 35 U.S.C. §112(b), U.S. District Court for the Eastern District of Texas, Nov. 1, 2013, 6 pgs.

6:12-cv-17, -20, -120, Joint Claim Construction and Prehearing Statement, Document No. 121-1, Exhibit A, Jun. 19, 2013, 11 pgs.

6:12-cv-17, -20, -120, Plaintiff's Opening Claim Construction Brief with Exhibits, Jan. 10, 2014, 145 pgs.

6:12-cv-17, -20, -120, Defendants' Responsive Claim Construction Brief with Exhibits, Feb. 3, 2014, 163 pgs.

6:12-cv-17, -20, -120, Plaintiff's Reply Claim Construction Brief with Exhibits, Feb. 18, 2014, 176 pgs.

6:12-cv-17, -20, -120, Memorandum Opinion and Order, U.S. District Court for the Eastern District of Texas, U.S. Magistrate Judge Caroline M. Craven, Mar. 12, 2014, 34 pgs.

6:12-cv-17, -20, -120, Expert Report of Thomas Fuja Regarding Invalidity of U.S. Pat. Nos. 6,947,748 and 7,454,212 filed by Defendants (AT&T Mobility LLC et al.), Non-Confidential Redacted Version, E.D. Tex., Jul. 7, 2014, 500 pgs.

6:12-cv-22, -122, -123, 6:13-cv-49, -50, 6:12-cv-369, Defendants' Responsive Claim Construction Brief with Exhibits, Dec. 20, 2013, 485 pgs.

6:12-cv-22, -122, -123, 6:13-cv-49, -50, 6:12-cv-369, Defendants' Sur-Reply Claim Construction Brief, Jan. 15, 2014, 7 pgs.

6:12-cv-22, -122, -123, 6:13-cv-49, -50, 6:12-cv-369, Plaintiff's Opening Construction Brief with Exhibits, Nov. 12, 2013, 154 pgs.

6:12-cv-22, -122, -123, 6:13-cv-49, -50, 6:12-cv-369, Plaintiff's Reply Claim Construction Brief with Exhibits, Jan. 15, 2014, 259 pgs.

(56) References Cited

OTHER PUBLICATIONS

6:12-cv-22, -122, -123, 6:13-cv-49, -50, 6:12-cv-369, Memorandum Opinion and Order, U.S. District Court for the Eastern District of Texas, U.S. Magistrate Judge Caroline M. Craven, Feb. 26, 2014, 112 pgs.
6:12-cv-22, -122, -123, -369; 6:13-cv-49, -50, Expert Report of Anthony Acampora Regarding Invalidity of U.S. Pat. Nos. 6,870,808; 6,904,283; and 7,146,172 filed by Defendants (Ericsson Inc. et al.), Non-Confidential Redacted by Ericsson ALU on Aug. 12, 2014, E.D. Tex., Jul. 28, 2014, 886 pgs.
6:12-cv-22, -122, -123, -369; 6:13-cv-49, -50, Rebuttal Expert Report of Jonathan Wells Regarding Validity of U.S. Pat. Nos. 6,870,808; 6,904,283; and 7,146,172 filed by Plaintiff (Adaptix, Inc.), Non-Confidential Redacted Version, E.D. Tex., Sep. 9, 2014, 182 pgs.
6:12-cv-22, -122, -123, Joint Claim Construction and Prehearing Statement with Exhibits, U.S. District Court for the Eastern District of Texas, Sep. 17, 2013, 97 pgs.
In the Matter of Certain Wireless Communications Base Stations and Components thereof, Complainant Adaptix, Inc.'s Motion to Terminate the Investigation Based on Withdrawal of the Complaint, Request for Suspension of the Procedural Schedule, and Request for Shortened Response Time, Investigation No. 337-TA-871, U.S. International Trade Commission, Dec. 3, 2013, 8 pgs.
In the Matter of Certain Wireless Communications Base Stations and Components thereof, Complainant Adaptix's Statement of Public Interest and Verified Complaint, Investigation No. 337-TA-871, U.S. International Trade Commission, Jan. 22, 2013, 34 pgs.
In the Matter of Certain Wireless Communications Base Stations and Components thereof, Order No. 35: Initial Determinaton Granting Motion to Terminate the Investigation in its Entirety, Investigation No. 337-TA-871, U.S. International Trade Commission, Dec. 13, 2013, 5 pgs.
In the Matter of Certain Wireless Communications Base Stations and Components thereof, Respondents' Motion for Leave to File a Corrected Notice of Prior Art, US International Trade Commission, Investigation No. 337-TA-871, May 30, 2013, 192 pgs.
In the Matter of Certain Wireless Communications Base Stations and Components thereof, Respondents' Notice of Prior Art, US International Trade Commission, Investigation No. 337-TA-871, May 14, 2013, 34 pgs.
In the Matter of Certain Wireless Communications Base Stations and Components thereof, Respondents' Supplemental Responses to Complainant's First Set of Interrogatories (Nos. 27, 38-45, and 53), Investigation No. 337-TA-871, May 24, 2013, 2604 pgs.
*Adaptix v. Clearwire*, Plaintiff's Second Amended Complaint, Civil Action No. 6:08-cv-460, Apr. 20, 2009, 13 pgs.
*Adaptix v. Clearwire*, Defendants' Invalidity Contentions Pursuant to Patent Rules 3-3 and 3-4, Civil Action No. 6:08-cv-460, Jul. 24, 2009, 31 pgs.
*Adaptix v. Motorola Mobility LLC and Cellco Partnership d/b/a Verizon Wireless*, Original Complaint for Patent Infringement, Civil Action No. 6:12cv016, Jan. 13, 2012, 7 pgs.
*Adaptix v. Motorola Mobility LLC and Cellco Partnership d/b/a Verizon Wireless*, Defendant Motorola Mobility, Inc.'s Answer, Affirmative Defenses, and Counterclaims to Plaintiff's Original Complaint, Civil Action No. 6:12-cv-00016 (LED), Mar. 12, 2012, 12 pgs.
*Adaptix v. Motorola Mobility LLC and Cellco Partnership d/b/a Verizon Wireless*, Plaintiff's Reply to Defendant Motorola Mobility, Inc.'s Counterclaims, Civil Action No. 6:12-cv-00016 (LED), Mar. 15, 2012, 4 pgs.
*Adaptix v. Motorola Mobility LLC and Cellco Partnership d/b/a Verizon Wireless*, Answer, Defenses, and Counterclaims of Cellco Partnership d/b/a Verizon Wireless, Civil Action No. 6:12cv016, Apr. 13, 2012, 10 pgs.
*Adaptix v. Motorola Mobility LLC, et al.*, Defendants' Invalidity Contentions Pursuant to Patent Rules 3-3 and 3-4, Civil Action Nos. 6:12-cv-016-LED, 6:12-cv-017-LED, 6:12-cv-019, 6:12-cv-020-LED, 6:12-cv-120-LED, 6:12-cv-121-LED, 6:12-cv-124-LED, 6:12-cv-125-LED, Jan. 10, 2013, 1,033 pgs.

*Adaptix v. Pantech Wireless, Inc. and Cellco Partnership d/b/a Verizon Wireless*, Original Complaint for Patent Infringement, Civil Action No. 6:12-cv-20, Jan. 13, 2012, 7 pgs.
*Adaptix v. Pantech Wireless, Inc. and Cellco Partnership d/b/a Verizon Wireless*, Defendant Pantech Wireless, Inc.'s Answer, Affirmative Defenses, and Counterclaims to Adaptix, Inc.'s Original Complaint, Civil Action No. 6:12-CV-00020-LED, Mar. 22, 2012, 12 pgs.
*Adaptix v. Pantech Wireless, Inc. and Cellco Partnership d/b/a Verizon Wireless*, Plaintiff's Reply to Defendant Pantech Wireless, Inc.'s Counterclaims, Civil Action No. 6:12-cv-00020 (LED), Mar. 26, 2012, 4 pgs.
*Adaptix v. Pantech Wireless, Inc. and Cellco Partnership d/b/a Verizon Wireless*, Answer, Defenses, and Counterclaims of Cellco Partnership d/b/a Verizon Wireless, Civil Action No. 6:12-cv-0020, Apr. 13, 2012, 10 pgs.
*Adaptix v. Pantech Wireless, Inc. and Cellco Partnership d/b/a Verizon Wireless*, Plaintiff's Reply to Counterclaims of Cellco Partnership d/b/a Verizon Wireless, Civil Action No. 6:12-cv-0020 (LED), May 2, 2012, 5 pgs.
*Adaptix v. Alcatel-Lucent USA, Inc. and AT&T, Inc., AT&T Mobility LLC, Cello Partnership d/b/a Verizon Wireless and Sprint Spectrum L.P.*, Original Complaint for Patent Infringement, Civil Action No. 6:12cv22, Jan. 13, 2012, 15 pgs.
*Adaptix v. Alcatel-Lucent USA, Inc. and AT&T, Inc., AT&T Mobility LLC, Cellco Partnership d/b/a Verizon Wireless and Sprint Spectrum L.P.*, Defendant Alcatel-Lucent USA, Inc.'s Answer and Affirmative Defenses, Civil Action No. 6:12-cv-0022, Mar. 12, 2012, 23 pgs.
*Adaptix v. Alcatel-Lucent USA, Inc. and AT&T Mobility LLC*, Defendant AT&T Mobility's Answer and Defenses, Civil Action No. 6:12-cv-0022, Mar. 26, 2012, 23 pgs.
*Adaptix v. Alcatel-Lucent USA, Inc. and AT&T Mobility LLC*, Defendants' Invalidity Contentions, Civil Action No. 6:12-cv-0022, Sep. 28, 2012, 20 pgs.
*Adaptix v. Alcatel-Lucent USA, Inc.*, Defendants' Invalidity Contentions for U.S. Pat. No. 6,904,283, Exhibit A-1 Corrected Claim Charts, Civil Action No. 6:12-CV-0022, Sep. 28, 2012, 1070 pgs.
*Adaptix v. Alcatel-Lucent USA, Inc. and AT&T Mobility LLC*, Defendants' Invalidity Contentions and Claim Charts, Civil Action No. 6:12-cv-0022, Sep. 28, 2012, 1192 pgs.
*Adaptix v. Alcatel-Lucent USA, Inc. and AT&T Mobility LLC*, Defendant Alcatel-Lucent USA, Inc.'s First Amended Answer, Affirmative Defenses, and Counterclaims, Civil Action No. 6:12-cv-0022, May 1, 2012, 29 pgs.
*Adaptix v. Alcatel-Lucent USA, Inc. and AT&T Mobility LLC*, Plaintiff's Reply to the First Amended Answer, Affirmative Defenses, and Counterclaims of Defendant Alcatel-Lucent USA, Inc., Civil Action No. 6:12-cv-0022 (LED), May 8, 2012, 6 pgs.
*Adaptix v. Cellco Partnership d/b/a Verizon Wireless, LG Electronics, Inc. and LG Electronics USA, Inc.*, Original Complaint for Patent Infringement, Civil Action No. 6:12cv120, Mar. 9, 2012, 49 pgs.
*Adaptix v. Cellco Partnership d/b/a Verizon Wireless, LG Electronics, Inc. and LG Electronics USA, Inc.*, Answer, Defenses, and Counterclaims of Cellco Partnership d/b/a Verizon Wireless, Civil Action No. 6:12-cv-0120, Apr. 13, 2012, 10 pgs.
*Adaptix v. Cellco Partnership d/b/a Verizon Wireless, LG Electronics, Inc. and LG Electronics USA, Inc.*, Plaintiff's Reply to Counterclaims of Defendant Cellco Partnership d/b/a Verizon Wireless, Civil Action No. 6:12-cv-0120 (LED), May 2, 2012, 5 pgs.
*Adaptix v. Cellco Partnership d/b/a Verizon Wireless, LG Electronics, Inc. and LG Electronics USA, Inc.*, Defendants LG Electronics, Inc. and LG Electronics USA, Inc.'s Answer to Plaintiff Adaptix, Inc.'s Complaint for Patent Infringement, Civil Action No. 6:12-CV-120, Jun. 1, 2012, 17 pgs.
*Adaptix v. Cellco Partnership d/b/a Verizon Wireless, LG Electronics, Inc. and LG Electronics USA, Inc.*, Plaintiff's Reply to the Counterclaims of Defendants LG Electronics, Inc. and LG Electronics USA, Inc., Civil Action No. 6:12-cv-00120 (LED), Jun. 6, 2012, 4 pgs.
*Adaptix v. Cellco Partnership d/b/a Verizion Wireless, HTC Corporation and HTC America, Inc.*, Original Complaint for Patent Infringement, Civil Action No. 6:12cv121, Mar. 9, 2012, 49 pgs.

(56) References Cited

OTHER PUBLICATIONS

*Adaptix v. Cello Partnership d/b/a Verizon Wireless, HTC Corporation and HTC America, Inc.*, Answer, Defenses, and Counterclaims of Cellco Partnership d/b/a Verizon Wireless, Civil Action No. 6:12-cv-0121, Apr. 13, 2012, 10 pgs.
*Adaptix v. Cello Partnership d/b/a Verizon Wireless, HTC Corporation and HTC America, Inc.*, Plaintiff's Reply to Counterclaims of Defendant Cellco Partnership d/b/a Verizon Wireless, Civil Action No. 6:12-cv-000121 (LED), May 2, 2012, 5 pgs.
*Adaptix v. Cello Partnership d/b/a Verizon Wireless, HTC Corporation and HTC America, Inc.*, Defendant HTC Corporation's Answer to Original Complaint, Civil Action No. 6:12-cv-00121-LED, Jun. 1, 2012, 8 pgs.
*Adaptix v. Cello Partnership d/b/a Verizon Wireless, HTC Corporation and HTC America, Inc.*, Defendant HTC America, Inc.'s Answer to Original Complaint, Civil Action No. 6:12-cv-00121-LED, Jun. 1, 2012, 8 pgs.
*Adaptix v. Alcatel-Lucent USA, Inc. and Cellco Partnership d/b/a Verizon Wireless*, Original Complaint for Patent Infringement, Civil Action No. 6:12cv122, Mar. 9, 2012, 110 pgs.
*Adaptix v. Alcatel-Lucent USA, Inc. and Cellco Partnership d/b/a Verizon Wireless*, Defendant Alcatel-Lucent USA, Inc.'s Answer and Affirmative Defenses, Civil Action No. 6:12-cv-0122, Apr. 10, 2012, 19 pgs.
*Adaptix v. Alcatel-Lucent USA, Inc. and Cellco Partnership d/b/a Verizon Wireless*, Answer, Defenses, and Counterclaims of Cellco Partnership d/b/a Verizon Wireless, Civil Action No. 6:12-cv-0122, Apr. 13, 2012, 15 pgs.
*Adaptix v. Alcatel-Lucent USA, Inc. and Cellco Partnership d/b/a Verizon Wireless*, Plaintiff's Reply to Counterclaims of Defendant Cellco d/b/a Verizon Wireless, Civil Action No. 6:12-cv-0122 (LED), May 2, 2012, 6 pgs.
*Adaptix v. Alcatel-Lucent USA, Inc. and Cellco Partnership d/b/a Verizon Wireless*, Defendants' Invalidity Contentions with Exhibits, Civil Action No. 6:12-cv-0122, Aug. 5, 2013, 10,324 pgs.
*Adaptix v. Alcatel-Lucent USA, Inc. and Sprint Spectrum L.P.*, Original Complaint for Patent Infringement, Civil Action No. 6:12cv123, Mar. 9, 2012, 110 pgs.
*Adaptix v. Alcatel-Lucent USA, Inc. and Sprint Spectrum L.P.*, Defendant Alcatel-Lucent USA, Inc.'s Answer and Affirmative Defenses, Civil Action No. 6:12-cv-0123, Apr. 10, 2012, 19 pgs.
*Adaptix v. Alcatel-Lucent USA, Inc. and Sprint Spectrum L.P.*, Defendant Sprint Spectrum L.P.'s Answer and Affirmative Defenses, Civil Action No. 6:12-cv-0123, Apr. 30, 2012, 15 pgs.
*Adaptix v. Alcatel-Lucent USA, Inc. and Sprint Spectrum L.P.*, Defendants' Invalidity Contentions, Civil Action No. 6:12-cv-0123, Aug. 5, 2013, 18 pgs.
*Adaptix v. Alcatel-Lucent USA, Inc. and Sprint Spectrum L.P.*, Defendants' Invalidity Contentions with Exhibits, Civil Action No. 6:12-cv-0123, Aug. 5, 2013, 10,551 pgs.
*Adaptix v. Apple, Inc. and Cellco Partnership d/b/a Verizon Wireless*, Original Complaint for Patent Infringement, Civil Action No. 6:12cv124, Mar. 9, 2012, 50 pgs.
*Adaptix v. Apple, Inc. and Cellco Partnership d/b/a Verizon Wireless*, Answer, Defenses, and Counterclaims of Cellco Partnership d/b/a Verizon Wireless, Civil Action No. 6:12-cv-0124, Apr. 13, 2012, 10 pgs.
*Adaptix v. Apple, Inc. and Cellco Partnership d/b/a Verizon Wireless*, Plaintiff's Reply to Counterclaims of Defendant Cellco Partnership d/b/a Verizon Wireless, Civil Action No. 6:12-cv-000124 (LED), May 2, 2012, 5 pgs.
*Adaptix v. Apple, Inc. and Cellco Partnership d/b/a Verizon Wireless*, Apple Inc.'s Answer, Defenses, and Counterclaims to Plaintiff's Original Complaint for Patent Infringement, Civil Action No. 6:12-cv-0124, May 24, 2012, 11 pages.
*Adaptix v. Apple, Inc., and AT&T, Inc., and AT&T Mobility LLC*, Original Complaint for Patent Infringement; Civil Action No. 6:12cv125, Mar. 9, 2012, 50 pgs.

*Adaptix v. Apple, Inc. and AT&T Mobility LLC*, Defendant AT&T Mobility LLC's Answer to Adaptix, Inc.'s Original Complaint, Civil Action No. 6:12-cv-00125-LED, May 24, 2012, 9 pgs.
*Adaptix v. Apple, Inc., AT&T, Inc. and AT&T Mobility LLC*, Apple Inc.'s Answer, Defenses, and Counterclaims to Plaintiff's Original Complaint for Patent Infringement, Civil Action No. 6:12-cv-0125, May 24, 2012, 11 pgs.
*Adaptix v. AT&T Mobility LLC, LG Electronics, Inc., and LG Electronics USA, Inc.*, First Amended Complaint for Patent Infringement, Civil Action No. 6:12cv17, Mar. 9, 2012, 49 pgs.
*Adaptix v. AT&T Mobility LLC, LG Electronics, Inc., and LG Electronics USA, Inc.*, Defendant AT&T Mobility LLC's Answer to Plaintiff Adaptix, Inc.'s First Amended Complaint for Patent Infringement, Civil Action No. 6:12-cv-17, May 10, 2012, 12 pgs.
*Adaptix v. AT&T Mobility LLC, LG Electronics, Inc., and LG Electronics USA, Inc.*, Defendants LG Electronics, Inc. and LG Electronics USA, Inc.'s Answer to Plaintiff Adaptix, Inc.'s First Amended Complaint for Patent Infringement, Civil Action No. 6:12-cv-17, Jun. 1, 2012, 17 pgs.
*Adaptix v. AT&T Mobility LLC, LG Electronics, Inc., and LG Electronics USA, Inc.*, Plaintiff's Reply to the Counterclaims of Defendants LG Electronics, Inc. and LG Electronics USA, Inc.'s, Civil Action No. 6:12-cv-00017 (LED), Jun. 6, 2012, 4 pgs.
*Adaptix v. AT&T Mobility LLC, HTC Corporation, and HTC America, Inc.*, First Amended Complaint for Patent Infringement, Civil Action No. 6:12CV019, Mar. 9, 2012, 49 pgs.
*Adaptix v. AT&T Mobility LLC, HTC Corporation, and HTC America, Inc.*, Defendant AT&T Mobility LLC's Answer to Adaptix, Inc.'s First Amended Complaint, Civil Action No. 6:12-cv-00019 (LED), May 10, 2012, 9 pgs.
*Adaptix v. AT&T Mobility LLC, HTC Corporation, and HTC America, Inc.*, Defendant HTC America, Inc.'s Answer to First Amended Complaint, Civil Action No. 6:12-cv-00019-LED, Jun. 1, 2012, 8 pgs.
*Adaptix v. AT&T Mobility LLC, HTC Corporation, and HTC America, Inc.*, Defendant HTC Corporation's Answer to First Amended Complaint, Civil Action No. 6:12-cv-00019-LED, Jun. 1, 2012, 8 pgs.
*Adaptix v. Nokia Siemens Networks US, LLC, Lightsguared, Inc., and Lightsquared GP, Inc.*, Original Complaint for Patent Infringement, Civil Action No. 6:12cv21, Jan. 13, 2012, 11 pgs.
*Adaptix v. Nokia Siemens Networks US, LLC, Lightsguared, Inc., and Lightsquared GP, Inc.*, Plaintiff's Notice of Dismissal, Civil Action No. 6:12-cv-00021, Jun. 5, 2012, 3 pgs.
*Adaptix v. Nokia Siemens Networks US, LLC and T-Mobile USA, Inc.*, Original Complaint for Patent Infringement, Civil Action No. 6:12-cv-318, May 11, 2012, 111 pgs.
*Adaptix v. Nokia Siemens Networks US, LLC and T-Mobile USA, Inc.*, Plaintiff's Notice of Dismissal, Civil Action No. 6:12-cv-00318, Jun. 5, 2012, 2 pgs.
*Adaptix v. T-Mobile USA, Inc.*, Original Complaint for Patent Infringement, Civil Action No. 6:12-cv-369, Jun. 5, 2012, 109 pgs.
*Adaptix v. T-Mobile USA, Inc.*, Defendant T-Mobile USA, Inc.'s Answer and Counterclaims to Plaintiff's Complaint, Civil Action No. 6:12-cv-369-LED, Dec. 21, 2012, 11 pgs.
*Adaptix v. T-Mobile USA, Inc.*, Plaintiff's Reply to Defendant T-Mobile, Inc.'s Counterclaims, Civil Action No. 6:12-cv-00369 (LED), Dec. 31, 2012, 4 pgs.
*Adaptix v. Apple, Inc., AT&T, Inc., and AT&T Mobility LLC*, Original Complaint for Patent Infringement, Civil Action No. 6:13-cv-28, Jan. 4, 2013, 48 pgs.
*Adaptix, Inc. v. Ericsson Inc. et al.*, Defendants' Invalidity Contentions, Civil Action No. 6:13-cv-49, -50; Aug. 5, 2013, 13,133 pgs.
5:13-cv-1774, -1776, -1777, -1778, -1884, -2023, Defendants' First Amended Invalidity Contentions Pursuant to Patent Local Rules 3-3 and 3-4 with Exhibits, Jan. 15, 2014, 1,034 pgs.
5:13-cv-1774, -1776, -1777, -1778, -1884, -2023, Defendants' Second Amended Invalidity Contentions Pursuant to Patent Local Rules 3-3, 3-4, and 3-6, Apr. 25, 2014, 83 pgs.
*Adaptix, Inc. v. BlackBerry Ltd. et al.*, Plaintiff's Disclosure of Asserted Claims and Infringement Contentions, with Exhibit A, Civil Action No. 6:13-cv-434, Feb. 19, 2014, 108 pgs.

(56) References Cited

OTHER PUBLICATIONS

*Adaptix, Inc.* v. *BlackBerry Ltd. et al.*, Plaintiff's Disclosure of Asserted Claims and Infringement Contentions, with Exhibit B, Civil Action No. 6:13-cv-434, Feb. 19, 2014, 160 pgs.
*Adaptix, Inc.* v. *Huawei Tech. Co. Ltd., et al.*, Memorandum Opinion and Order, Civil Action Nos. 6:13-cv-438, -439, -440, -441, -443, -444, -445, -446, E.D. Tex., Sep. 19, 2014, 24 pgs.
*Adaptix, Inc.* v. *Sony Mobile Communications, Inc. et al.*, Plaintiff's Disclosure of Asserted Claims and Infringement Contentions, with Exhibit A, Civil Action No. 6:13-cv-442, Feb. 19, 2014, 107 pgs.
*Adaptix, Inc.* v. *Sony Mobile Communications, Inc. et al.*, Plaintiff's Disclosure of Asserted Claims and Infringement Contentions, with Exhibit B, Civil Action No. 6:13-cv-442, Feb. 19, 2014, 159 pgs.
*Adaptix, Inc.* v. *NEC Casio, et al.*, Redacted Defendants' Invalidity Contentions, with Exhibits, Civil Action Nos. 6:13-cv-585, -778, -922, E.D. Tex., Sep. 8, 2014, 1284 pgs.
*Adaptix, Inc.* v. *BlackBerry Ltd. et al.*, Joint Motion for Dismissal, Civil Action Nos. 5:14-cv-01380, -01386, -01387-PSG, N.D. Cal., Oct. 24, 2014, 5 pgs.
*Adaptix, Inc.* v. *BlackBerry Ltd. et al.*, Order Granting Joint Motion for Dismissal, Civil Action Nos. 5:14-cv-01380, -01386, -01387-PSG, N.D. Cal., Oct. 24, 2014, 2 pgs.
*Adaptix, Inc.* v. *Ericsson Inc. et al.*, Defendants' Invalidity Contentions, with Exhibits, Civil Action No. 6:14-cv-501, -502, -503, Jan. 30, 2015, 11563 pgs.
*Adaptix, Inc.* v. *HTC Corporation, et al.*, Redacted Defendants' Invalidity Contentions, Civil Action Nos. 5:14-cv-2359, -2360, -2894, -2895, N.D. Cal., Dec. 5, 2014, 48 pgs.
*Blackberry Corporation* v. *Adaptix, Inc.*, Petition for Inter Partes Review of U.S. Pat. No. 6,947,748, with Exhibits, IPR2014-01406, P.T.A.B., Aug. 28, 2014, 1422 pgs.
*Blackberry Corporation* v. *Adaptix, Inc.*, Declaration of Zygmunt J. Haas, Ph.D. Under 37 C.F.R. § 1.68 regarding U.S. Pat. No. 6,947,748, IPR2014-01406, P.T.A.B., Aug. 26, 2014, 95 pgs.
*Blackberry Corporation* v. *Adaptix, Inc.*, Petition for Inter Partes Review of U.S. Pat. No. 7,454,212, with Exhibits, IPR2014-01408, P.T.A.B., Aug. 28, 2014, 1264 pgs.
*Blackberry Corporation* v. *Adaptix, Inc.*, Declaration of Zygmunt J. Haas, Ph.D. Under 37 C.F.R. § 1.68 regarding U.S. Pat. No. 7,454,212, IPR2014-01408, P.T.A.B., Aug. 26, 2014, 123 pgs.
*Sony Mobile Communications (USA) Inc.* v. *Adaptix, Inc.*, Petition for Inter Partes Review of U.S. Pat. No. 6,947,748, with Exhibits, IPR2014-01524, P.T.A.B., Sep. 19, 2014, 1535 pgs.
*Sony Mobile Communications (USA) Inc.* v. *Adaptix, Inc.*, Declaration of Professor Robert Akl, D.Sc., IPR2014-01524, P.T.A.B., Sep. 19, 2014, 107 pgs.
*Sony Mobile Communications (USA) Inc.* v. *Adaptix, Inc.*, (Corrected Exhibit 1009), Declaration of Professor Robert Akl, D.Sc., IPR2014-01524, P.T.A.B., Sep. 19, 2014, 107 pgs.
*Sony Mobile Communications (USA) Inc.* v. *Adaptix, Inc.*, Replacement Petition for Inter Partes Review of U.S. Pat. No. 6,947,748, IPR2014-01524, P.T.A.B., Sep. 19, 2014, 65 pgs.
*Sony Mobile Communications (USA) Inc.* v. *Adaptix, Inc.*, Corrected Petition for Inter Partes Review of U.S. Pat. No. 6,947,748, with Corrected Exhibit 1009, IPR2014-01524, P.T.A.B., Oct. 3, 2014, 173 pgs.
*Sony Mobile Communications (USA) Inc.* v. *Adaptix, Inc.*, Patent Owner Submission of Preliminary Response (with exhibits), IPR2014-01525, Jan. 12, 2015, 1236 pgs.
*Sony Mobile Communications (USA) Inc.* v. *Adaptix, Inc.*, Petition for Inter Partes Review of U.S. Pat. No. 7,454,212, with Exhibits, IPR2014-01525, P.T.A.B., Sep. 19, 2014, 1225 pgs.
*Sony Mobile Communications (USA) Inc.* v. *Adaptix, Inc.*, Declaration of Professor Robert Akl, D.Sc., IPR2014-01525, P.T.A.B., Sep. 19, 2014, 100 pgs.
*Sony Mobile Communications (USA) Inc.* v. *Adaptix, Inc.*, Corrected Petition for Inter Partes Review of U.S. Pat. No. 7,454,212, IPR2014-01525, P.T.A.B., Oct. 3, 2014, 67 pgs.
*Sony Mobile Communications (USA) Inc.* v. *Adaptix, Inc.*, Patent Owner Submission of Preliminary Response (with exhibits), IPR2014-01525, Jan. 12, 2015, 1242 pgs.
*Kyocera Corporation* v. *Adaptix, Inc.*, Petition for Inter Partes Review of U.S. Pat. No. 6,947,748, with Exhibits, IPR2015-00319, P.T.A.B., Nov. 26, 2014, 386 pgs.
*Kyocera Corporation* v. *Adaptix, Inc.*, Declaration of Dr. Nicholas Bambos in Support of Petition for Inter Partes Review of U.S. Pat. No. 6,947,748, IPR2015-00319, P.T.A.B., Nov. 26, 2014, 60 pgs.
*Kyocera Corporation* v. *Adaptix, Inc.*, Patent Owner Submission of Preliminary Response (with exhibits), IPR2015-00319, Mar. 11, 2015, 1,222 pgs.
*Kyocera Corporation* v. *Adaptix, Inc.*, Petition for Inter Partes Review of U.S. Pat. No. 7,454,212, with Exhibits, IPR2015-00318, P.T.A.B., Nov. 26, 2014, 440 pgs.
*Kyocera Corporation* v. *Adaptix, Inc.*, Declaration of Dr. Nicholas Bambos in Support of Petition for Inter Partes Review of U.S. Pat. No. 7,454,212, IPR2015-00318, P.T.A.B., Nov. 26, 2014, 73 pgs.
*Kyocera Corporation* v. *Adaptix, Inc.*, Patent Owner Submission of Preliminary Response (with exhibits), IPR2015-00318, Mar. 11, 2015; 1,238 pgs.
*ZTE Corporation* v. *Adaptix, Inc.*, Petition for Inter Partes Review of U.S. Pat. No. 6,947,748, with Exhibits, IPR2015-01185, P.T.A.B., May 8, 2015, 1504 pgs.
*ZTE Corporation* v. *Adaptix, Inc.*, Declaration of Tim A. Williams, Ph.D in Support of Petition for Inter Partes Review of U.S. Pat. No. 6,947,748, IPR2015-01185, P.T.A.B., May 7, 2015, 75 pgs.
*ZTE Corporation* v. *Adaptix, Inc.*, Petition for Inter Partes Review of U.S. Pat. No. 7,454,212, IPR2015-01184, with Exhibits, P.T.A.B., May 8, 2015, 1503 pgs.
*ZTE Corporation* v. *Adaptix, Inc.*, Declaration of Tim A. Williams, Ph.D in Support of Petition for Inter Partes Review of U.S. Pat. No. 7,454,212, IPR2015-01184, P.T.A.B., May 7, 2015, 75 pgs.
*ZTE* v. *Adaptix, Inc.*, Chinese Invalidation Proceeding Case No. 2015051900547580 regarding corresponding Chinese Patent No. ZL 01817199.0, Request for Invalidation filed by ZTE, Apr. 21, 2015, 219 pgs.
*ZTE* v. *Adaptix, Inc.*, Chinese Invalidation Proceeding Case No. 2015051900547580 regarding corresponding Chinese Patent No. ZL 01817199.0, Supplemental Reasons and Evidence filed by ZTE, Jun. 3, 2015, 142 pgs.
*Adaptix Inc.* v. *Huawei Japan*, Japanese Litigation Case No. 28418 regarding corresponding Japanese Patent Nos. 3980478 and 4213466, Complaint filed by Plaintiff (Adaptix) dated Oct. 5, 2012, 31 pgs.
*Adaptix Inc.* v. *Huawei Japan*, Japanese Litigation Case No. 28418 regarding corresponding Japanese Patent Nos. 3980478 and 4213466, Description of Evidence 1 filed by Defendant (Huawei) dated May 21, 2013, 2 pgs.
*Adaptix Inc.* v. *Huawei Japan*, Japanese Litigation Case No. 28418 regarding corresponding Japanese Patent Nos. 3980478 and 4213466, Description of Evidence 2 filed by Defendant (Huawei) dated Jul. 31, 2013, 2 pgs.
*Adaptix Inc.* v. *Huawei Japan*, Japanese Litigation Case No. 28418 regarding corresponding Japanese Patent Nos. 3980478 and 4213466, Description of Evidence 3 filed by Defendant (Huawei) dated Aug. 7, 2013, 3 pgs.
*Adaptix Inc.* v. *Huawei Japan*, Japanese Litigation Case No. 28418 regarding corresponding Japanese Patent Nos. 3980478 and 4213466, Description of Evidence 4 filed by Defendant (Huawei) dated Dec. 25, 2013, 2 pgs.
*Adaptix Inc.* v. *Huawei Japan*, Japanese Litigation Case No. 28418 regarding corresponding Japanese Patent Nos. 3980478 and 4213466, Description of Evidence 1 filed by Plaintiff (Adaptix) dated Nov. 21, 2012, 2 pgs.
*Adaptix Inc.* v. *Huawei Japan*, Japanese Litigation Case No. 28418 regarding corresponding Japanese Patent Nos. 3980478 and 4213466, Description of Evidence 2 filed by Plaintiff (Adaptix) dated Jan. 9, 2013, 2pgs.
*Adaptix Inc.* v. *Huawei Japan*, Japanese Litigation Case No. 28418 regarding corresponding Japanese Patent Nos. 3980478 and 4213466, Description of Evidence 3 filed by Plaintiff (Adaptix) dated Mar. 15, 2013, 12 pgs.

(56) References Cited

OTHER PUBLICATIONS

*Adaptix Inc.* v. *Huawei Japan*, Japanese Litigation Case No. 28418 regarding corresponding Japanese Patent Nos. 3980478 and 4213466, Description of Evidence 4 filed by Plaintiff (Adaptix) dated Jul. 31, 2013, 3 pgs.
*Adaptix Inc.* v. *Huawei Japan*, Japanese Litigation Case No. 28418 regarding corresponding Japanese Patent Nos. 3980478 and 4213466, Description of Evidence 5 filed by Plaintiff (Adaptix) dated Dec. 25, 2013, 2 pgs.
*Adaptix Inc.* v. *Huawei Japan*, Japanese Litigation Case No. 28418 regarding corresponding Japanese Patent Nos. 3980478 and 4213466, Description of Evidence 6 filed by Plaintiff (Adaptix) dated Dec. 25, 2013, 2 pgs.
*Adaptix Inc.* v. *Huawei Japan*, Japanese Litigation Case No. 28418 regarding corresponding Japanese Patent Nos. 3980478 and 4213466, Preparatory Document 1 filed by Defendant (Huawei) dated Dec. 14, 2012, 14 pgs.
*Adaptix Inc.* v. *Huawei Japan*, Japanese Litigation Case No. 28418 regarding corresponding Japanese Patent Nos. 3980478 and 4213466, Preparatory Document 2 filed by Defendant (Huawei) dated Jan. 9, 2013, 3 pgs.
*Adaptix Inc.* v. *Huawei Japan*, Japanese Litigation Case No. 28418 regarding corresponding Japanese Patent Nos. 3980478 and 4213466, Preparatory Document 3 filed by Defendant (Huawei) dated Jan. 16, 2013, 8 pgs.
*Adaptix Inc.* v. *Huawei Japan*, Japanese Litigation Case No. 28418 regarding corresponding Japanese Patent Nos. 3980478 and 4213466, Preparatory Document 4 filed by Defendant (Huawei) dated Mar. 15, 2013, 5 pgs.
*Adaptix Inc.* v. *Huawei Japan*, Japanese Litigation Case No. 28418 regarding corresponding Japanese Patent Nos. 3980478 and 4213466, Preparatory Document 5 filed by Defendant (Huawei) dated May 21, 2013, 18 pgs.
*Adaptix Inc.* v. *Huawei Japan*, Japanese Litigation Case No. 28418 regarding corresponding Japanese Patent Nos. 3980478 and 4213466, Preparatory Document 6 filed by Defendant (Huawei) dated Jul. 31, 2013, 70 pgs.
*Adaptix Inc.* v. *Huawei Japan*, Japanese Litigation Case No. 28418 regarding corresponding Japanese Patent Nos. 3980478 and 4213466, Prepatory Document 7 filed by Defendant (Huawei) dated Aug. 7, 2013, 68 pgs.
*Adaptix Inc.* v. *Huawei Japan*, Japanese Litigation Case No. 28418 regarding corresponding Japanese Patent Nos. 3980478 and 4213466, Preparatory Document 8 filed by Defendant (Huawei) dated Oct. 18, 2013, 22 pgs.
*Adaptix Inc.* v. *Huawei Japan*, Japanese Litigation Case No. 28418 regarding corresponding Japanese Patent Nos. 3980478 and 4213466, Preparatory Document 9 filed by Defendant (Huawei) dated Oct. 24, 2013, 6 pgs.
*Adaptix Inc.* v. *Huawei Japan*, Japanese Litigation Case No. 28418 regarding corresponding Japanese Patent Nos. 3980478 and 4213466, Preparatory Document 10 filed by Defendant (Huawei) dated Dec. 25, 2013, 31 pgs.
*Adaptix Inc.* v. *Huawei Japan*, Japanese Litigation Case No. 28418 regarding corresponding Japanese Patent Nos. 3980478 and 4213466, Preparatory Document 11 filed by Defendant (Huawei) dated Dec. 25, 2013, 25 pgs.
*Adaptix Inc.* v. *Huawei Japan*, Japanese Litigation Case No. 28418 regarding corresponding Japanese Patent Nos. 3980478 and 4213466, Preparatory Document 1 filed by Plaintiff (Adaptix) dated Jan. 9, 2013, 10 pgs.
*Adaptix Inc.* v. *Huawei Japan*, Japanese Litigation Case No. 28418 regarding corresponding Japanese Patent Nos. 3980478 and 4213466, Preparatory Document 2 filed by Plaintiff (Adaptix) dated Mar. 15, 2013, 35 pgs.
*Adaptix Inc.* v. *Huawei Japan*, Japanese Litigation Case No. 28418 regarding corresponding Japanese Patent Nos. 3980478 and 4213466, Preparatory Document 3 filed by Plaintiff (Adaptix) dated Jul. 31, 2013, 58 pgs.

*Adaptix Inc.* v. *Huawei Japan*, Japanese Litigation Case No. 28418 regarding corresponding Japanese Patent Nos. 3980478 and 4213466, Preparatory Document 4 filed by Plaintiff (Adaptix) dated Jul. 31, 2013, 15 pgs.
*Adaptix Inc.* v. *Huawei Japan*, Japanese Litigation Case No. 28418 regarding corresponding Japanese Patent Nos. 3980478 and 4213466, Preparatory Document 5 filed by Plaintiff (Adaptix) dated Oct. 18, 2013, 55 pgs.
*Adaptix Inc.* v. *Huawei Japan*, Japanese Litigation Case No. 28418 regarding corresponding Japanese Patent Nos. 3980478 and 4213466, Preparatory Document 6 filed by Plaintiff (Adaptix) dated Oct. 18, 2013, 33 pgs.
*Adaptix Inc.* v. *Huawei Japan*, Japanese Litigation Case No. 28418 regarding corresponding Japanese Patent Nos. 3980478 and 4213466, Preparatory Document 7 filed by Plaintiff (Adaptix) dated Dec. 2013, 74 pgs.
*Adaptix Inc.* v. *Huawei Japan*, Japanese Litigation Case No. 28418 regarding corresponding Japanese Patent Nos. 3980478 and 4213466, Preparatory Document 8 filed by Plaintiff (Adaptix) dated Dec. 25, 2013, 7 pgs.
*Adaptix Inc.* v. *Huawei Japan*, Japanese Litigation Case No. 28418 regarding corresponding Japanese Patent Nos. 3980478 and 4213466, Written Reply filed by Defendant (Huawei) dated Nov. 1, 2012, 2 pgs.
*Adaptix Inc.* v. *Huawei*, Japanese Litigation Case No. 28418 regarding corresponding Japanese Patent Nos. 3980478 and 4213466, Plaintiff's (Adaptix) Response to Defendant's (Huawei) Dec. 25, 2013 Invalidity Contention Brief, Feb. 28, 2014, 23 pgs.
*Adaptix Inc.* v. *Huawei*, Japanese Litigation Case No. 28418 regarding corresponding Japanese Patent Nos. 3980478 and 4213466, List of Supporting Documents (cited in Plaintiff's Response to Defendant's Dec. 25, 2013 Invalidity Contention of Feb. 28, 2014) filed by Plaintiff (Adaptix), Feb. 28, 2014, 2 pgs.
*Adaptix Inc.* v. *Huawei*, Japanese Litigation Case No. 28418 regarding corresponding Japanese Patent Nos. 3980478 and 4213466, Defendant's (Huawei) Response to Plaintiff's (Adaptix) Dec. 25, 2013 Infringement Contention Brief, Feb. 28, 2014, 18 pgs.
*Adaptix Inc.* v. *Huawei*, Japanese Litigation Case No. 28418 regarding corresponding Japanese Patent Nos. 3980478 and 4213466, Defendant's (Huawei) Response to Plaintiff's (Adaptix) Jul. 31, 2013 and Dec. 25, 2013 Infringement Contention Briefs, Feb. 28, 2014, 14 pgs.
*Adaptix Inc.* v. *Huawei*, Japanese Litigation Case No. 28418 regarding corresponding Japanese Patent Nos. 3980478 and 4213466, Defendant's (Huawei) Invalidity Contention Brief, Feb. 28, 2014, 82 pgs.
*Adaptix Inc.* v. *Huawei*, Japanese Litigation Case No. 28418 regarding corresponding Japanese Patent Nos. 3980478 and 4213466, List of Non-Prior Art Documents (cited in Defendant's Response to Plaintiff's Jul. 31, 2013 and Dec. 25, 2013 Infringement Contentions Briefs of Feb. 28, 2014) filed by Defendant (Huawei), Feb. 28, 2014, 2 pgs.
*Adaptix Inc.* v. *Huawei*, Japanese Litigation Case No. 28418 regarding corresponding Japanese Patent Nos. 3980478 and 4213466, List of Prior Art Documents (cited in Defendant's Invalidity Contention Brief of Feb. 28, 2014) filed by Defendant (Huawei), Feb. 28, 2014, 2 pgs.
*Adaptix Inc.* v. *Huawei Japan*, Japanese Litigation Case No. 28418 regarding corresponding Japanese Patent Nos. 3980478 and 4213466, Amendment to the List of Supporting Documents of Dec. 25, 2013 submitted by Plaintiff (Adaptix), Apr. 16, 2014, 3 pgs.
*Adaptix Inc.* v. *Huawei Japan*, Japanese Litigation Case No. 28418 regarding corresponding Japanese Patent Nos. 3980478 and 4213466, Plaintiff's (Adaptix) Rebuttal to Defendant's (Huawei) Feb. 28, 2014 Invalidity Contention Brief, Apr. 30, 2014, 27 pgs.
*Adaptix Inc.* v. *Huawei Japan*, Japanese Litigation Case No. 28418 regarding corresponding Japanese Patent Nos. 3980478 and 4213466, Defendant's (Huawei) Invalidity Contention Brief, Apr. 30, 2014, 23 pgs.
*Adaptix Inc.* v. *Huawei Japan*, Japanese Litigation Case No. 28418 regarding corresponding Japanese Patent No. 3980478 and 4213466, List of Non-Prior Art Document filed by Defendant (Huawei), Apr. 30, 2014, 1 pg.

(56) References Cited

OTHER PUBLICATIONS

*Adaptix Inc.* v. *Huawei Japan*, Japanese Litigation Case No. 28418 regarding corresponding Japanese Patent Nos. 3980478 and 4213466, Plaintiff's (Adaptix) Response to Defendant's (Huawei) Invalidity Contention Brief, Jul. 11, 2014, 13 pgs.
*Adaptix Inc.* v. *Huawei Japan*, Japanese Litigation Case No. 28418 regarding corresponding Japanese Patent Nos. 3980478 and 4213466, Defendant's (Huawei) Invalidity Contention Brief, Jul. 11, 2014, 15 pgs.
*Adaptix Inc.* v. *Huawei Japan*, Japanese Litigation Case No. 28418 regarding corresponding Japanese Patent Nos. 3980478 and 4213466, List of Non-Prior Art/Prior Art Documents cited in Defendant's (Huawei) Invalidity Contention Brief, Jul. 11, 2014, 2 pgs.
*Adaptix Inc.* v. *Huawei Japan*, Japanese Litigation Case No. 28418 regarding corresponding Japanese Patent Nos. 3980478 and 4213466, Defendant's (Huawei) Invalidity Contention Brief, Aug. 29, 2014, 11 pgs.
*Adaptix Inc.* v. *ZTE Japan*, Japanese Litigation Case No. 31440 regarding corresponding Japanese Patent Nos. 3980478 and 4213466, Complaint filed by Plaintiff (Adaptix) dated Nov. 6, 2012, 33 pgs.
*Adaptix Inc.* v. *ZTE Japan*, Japanese Litigation Case No. 31440 regarding corresponding Japanese Patent Nos. 3980478 and 4213466, Description of Evidence 1 filed by Defendant (ZTE) dated Jun. 17, 2013, 9 pgs.
*Adaptix Inc.* v. *ZTE Japan*, Japanese Litigation Case No. 31440 regarding corresponding Japanese Patent Nos. 3980478 and 4213466, Description of Evidence 2 filed by Defendant (ZTE) dated Dec. 16, 2013, 3 pgs.
*Adaptix Inc.* v. *ZTE Japan*, Japanese Litigation Case No. 31440 regarding corresponding Japanese Patent Nos. 3980478 and 4213466, Description of Evidence 1 filed by Plaintiff (Adaptix) dated Nov. 21, 2012, 2 pgs.
*Adaptix Inc.* v. *ZTE Japan*, Japanese Litigation Case No. 31440 regarding corresponding Japanese Patent Nos. 3980478 and 4213466, Description of Evidence 2 filed by Plaintiff (Adaptix) dated Feb. 22, 2013, 2 pgs.
*Adaptix Inc.* v. *ZTE Japan*, Japanese Litigation Case No. 31440 regarding corresponding Japanese Patent Nos. 3980478 and 4213466, Description of Evidence 3 filed by Plaintiff (Adaptix) dated Apr. 12, 2013, 12 pgs.
*Adaptix Inc.* v. *ZTE Japan*, Japanese Litigation Case No. 31440 regarding corresponding Japanese Patent Nos. 3980478 and 4213466, Description of Evidence 4 filed by Plaintiff (Adaptix) dated Sep. 10, 2013, 3 pgs.
*Adaptix Inc.* v. *ZTE Japan*, Japanese Litigation Case No. 31440 regarding corresponding Japanese Patent Nos. 3980478 and 4213466, Preparatory Document 1 filed by Defendant (ZTE) dated Jun. 17, 2013, 14 pgs.
*Adaptix Inc.* v. *ZTE Japan*, Japanese Litigation Case No. 31440 regarding corresponding Japanese Patent Nos. 3980478 and 4213466, Preparatory Document 2 filed by Defendant (ZTE) dated Jun. 17, 2013, 71 pgs.
*Adaptix Inc.* v. *ZTE Japan*, Japanese Litigation Case No. 31440 regarding corresponding Japanese Patent Nos. 3980478 and 4213466, Preparatory Document 3 filed by Defendant (ZTE) dated Jun. 17, 2013, 59 pgs.
*Adaptix Inc.* v. *ZTE Japan*, Japanese Litigation Case No. 31440 regarding corresponding Japanese Patent Nos. 3980478 and 4213466, Preparatory Document 4 filed by Defendant (ZTE) dated Dec. 16, 2013, 21 pgs.
*Adaptix Inc.* v. *ZTE Japan*, Japanese Litigation Case No. 31440 regarding corresponding Japanese Patent Nos. 3980478 and 4213466, Preparatory Document 5 filed by Defendant (ZTE) dated Dec. 16, 2013, 6 pgs.
*Adaptix Inc.* v. *ZTE Japan*, Japanese Litigation Case No. 31440 regarding corresponding Japanese Patent Nos. 3980478 and 4213466, Preparatory Document 6 filed by Defendant (ZTE) dated Dec. 16, 2013, 27 pgs.
*Adaptix Inc.* v. *ZTE Japan*, Japanese Litigation Case No. 31440 regarding corresponding Japanese Patent Nos. 3980478 and 4213466, Preparatory Document 7 filed by Defendant (ZTE) dated Dec. 16, 2013, 28 pgs.
*Adaptix Inc.* v. *ZTE Japan*, Japanese Litigation Case No. 31440 regarding corresponding Japanese Patent Nos. 3980478 and 4213466, Preparatory Document 8 filed by Defendant (ZTE) dated Dec. 16, 2013, 38 pgs.
*Adaptix Inc.* v. *ZTE Japan*, Japanese Litigation Case No. 31440 regarding corresponding Japanese Patent Nos. 3980478 and 4213466, Preparatory Document 9 filed by Defendant (ZTE) dated Dec. 16, 2013, 82 pgs.
*Adaptix Inc.* v. *ZTE Japan*, Japanese Litigation Case No. 31440 regarding corresponding Japanese Patent Nos. 3980478 and 4213466, Preparatory Document 1 filed by Plaintiff (Adaptix) dated Apr. 12, 2013, 34 pgs.
*Adaptix Inc.* v. *ZTE Japan*, Japanese Litigation Case No. 31440 regarding corresponding Japanese Patent Nos. 3980478 and 4213466, Preparatory Document 2 filed by Plaintiff (Adaptix) dated Sep. 10, 2013, 42 pgs.
*Adaptix Inc.* v. *ZTE Japan*, Japanese Litigation Case No. 31440 regarding corresponding Japanese Patent Nos. 3980478 and 4213466, Preparatory Document 3 filed by Plaintiff (Adaptix) dated Sep. 10, 2013, 17 pgs.
*Adaptix Inc.* v. *ZTE Japan*, Japanese Litigation Case No. 31440 regarding corresponding Japanese Patent Nos. 3980478 and 4213466, Preparatory Document 4 filed by Plaintiff (Adaptix) dated Sep. 10, 2013, 27 pgs.
*Adaptix Inc.* v. *ZTE Japan*, Japanese Litigation Case No. 31440 regarding corresponding Japanese Patent Nos. 3980478 and 4213466, Preparatory Document 5 filed by Plaintiff (Adaptix) dated Sep. 10, 2013, 29 pgs.
*Adaptix Inc.* v. *ZTE Japan*, Japanese Litigation Case No. 31440 regarding corresponding Japanese Patent Nos. 3980478 and 4213466, Written Reply filed by Defendant (ZTE) dated Feb. 18, 2013, 5 pgs.
*Adaptix Inc.* v. *ZTE Japan*, Japanese Litigation Case No. 31440 regarding corresponding Japanese Patent Nos. 3980478 and 4213466, Plaintiff's (Adaptix) Infringement Contention Brief, Feb. 28, 2014, 76 pgs.
*Adaptix Inc.* v. *ZTE Japan*, Japanese Litigation Case No. 31440 regarding corresponding Japanese Patent Nos. 3980478 and 4213466, Plaintiff's (Adaptix) Response to Defendant's (ZTE) Dec. 16, 2013 Invalidity Contention Brief, Feb. 28, 2014, 89 pgs.
*Adaptix Inc.* v. *ZTE Japan*, Japanese Litigation Case No. 31440 regarding corresponding Japanese Patent Nos. 3980478 and 4213466, List of Supporting Documents (cited in Plaintiff's Infringement Contention Brief of Feb. 28, 2014) filed by Plaintiff (Adaptix), Feb. 28, 2014, 4 pgs.
*Adaptix Inc.* v. *ZTE Japan*, Japanese Litigation Case No. 31440 regarding corresponding Japanese Patent Nos. 3980478 and 4213466, Plaintiff's (Adaptix) Clarification on Infringement Contention Brief of Feb. 28, 2014, Mar. 20, 2014, 20 pgs.
*Adaptix Inc.* v. *ZTE Japan*, Japanese Litigation Case No. 31440 regarding corresponding Japanese Patent Nos. 3980478 and 4213466, List of Supporting Document (cited in Plaintiff's Clarification on Infringement Contention Brief filed on Feb. 28, 2014) filed by Plaintiff (Adaptix), Mar. 20, 2014, 2 pgs.
*Adaptix Inc.* v. *ZTE Japan*, Japanese Litigation Case No. 31440 regarding corresponding Japanese Patent Nos. 3980478 and 4213466, Defendant's (ZTE) Non-Infringement Contention and Claim Construction Brief, May 8, 2014, 32 pgs.
*Adaptix Inc.* v. *ZTE Japan*, Japanese Litigation Case No. 31440 regarding corresponding Japanese Patent Nos. 3980478 and 4213466, Defendant's (ZTE) Invalidity Contention and Claim Construction Brief, May 8, 2014, 45 pgs.
*Adaptix Inc.* v. *ZTE Japan*, Japanese Litigation Case No. 31440 regarding corresponding Japanese Patent Nos. 3980478 and 4213466, List of Non-Prior Art Documents cited in Defendant's (ZTE) May 8, 2014, 2 pgs.

(56) References Cited

OTHER PUBLICATIONS

*Adaptix Inc.* v. *ZTE Japan*, Japanese Litigation Case No. 31440 regarding corresponding Japanese Patent Nos. 3980478 and 4213466, Plaintiff's (Adaptix) Petition for Document Production, May 16, 2014, 3 pgs.

*Adaptix Inc.* v. *ZTE Japan*, Japanese Litigation Case No. 31440 regarding corresponding Japanese Patent Nos. 3980478 and 4213466, Plaintiff's (Adaptix) Invalidity Contention Brief, Jul. 18, 2014, 43 pgs.

*Adaptix Inc.* v. *ZTE Japan*, Japanese Litigation Case No. 31440 regarding corresponding Japanese Patent Nos. 3980478 and 4213466, List of Supporting Documents cited in Plaintiff's (Adaptix) Invalidity Contention Brief, Jul. 18, 2014, 2 pgs.

*Adaptix Inc.* v. *ZTE Japan*, Japanese Litigation Case No. 31440 regarding corresponding Japanese Patent Nos. 3980478 and 4213466, Defendant's (ZTE) Invalidity Contention Brief, Sep. 2, 2014, 50 pgs.

*Adaptix Inc.* v. *ZTE Japan*, Japanese Litigation Case No. 31440 regarding corresponding Japanese Patent Nos. 3980478 and 4213466, List of Prior Art/Non-Prior Art Documents cited in the Defendant's Invalidity Contention Brief, Sep. 2, 2014, 2 pgs.

*Adaptix Inc.* v. *Ericsson Japan*, Japanese Litigation Case No. 1149 regarding corresponding Japanese Patent Nos. 3980478 and 4213466, Complaint filed by Plaintiff (Adaptix) dated Jan. 18, 2013, 24 pgs.

*Adaptix Inc.* v. *Ericsson Japan*, Japanese Litigation Case No. 1149 regarding corresponding Japanese Patent Nos. 3980478 and 4213466, Correction of Complaint filed by Plaintiff (Adaptix) dated Jan. 24, 2013, 2 pgs.

*Adaptix Inc.* v. *Ericsson Japan*, Japanese Litigation Case No. 1149 regarding corresponding Japanese Patent Nos. 3980478 and 4213466, Correction of Preparatory Document 1 filed by Plaintiff (Adaptix) dated Jul. 30, 2013, 2 pgs.

*Adaptix Inc.* v. *Ericsson Japan*, Japanese Litigation Case No. 1149 regarding corresponding Japanese Patent Nos. 3980478 and 4213466, Description of Evidence 1 filed by Plaintiff (Adaptix) dated Jan. 24, 2013, 2 pgs.

*Adaptix Inc.* v. *Ericsson Japan*, Japanese Litigation Case No. 1149 regarding corresponding Japanese Patent Nos. 3980478 and 4213466, Description of Evidence 2 filed by Plaintiff (Adaptix) dated Jul. 19, 2013, 12 pgs.

*Adaptix Inc.* v. *Ericsson Japan*, Japanese Litigation Case No. 1149 regarding corresponding Japanese Patent Nos. 3980478 and 4213466, Description of Evidence 3 filed by Plaintiff (Adaptix) dated Dec. 13, 2013, 3 pgs.

*Adaptix Inc.* v. *Ericsson Japan*, Japanese Litigation Case No. 1149 regarding corresponding Japanese Patent Nos. 3980478 and 4213466, Preparatory Document 1 filed by Defendant (Ericsson) dated May 10, 2013, 10 pgs.

*Adaptix Inc.* v. *Ericsson Japan*, Japanese Litigation Case No. 1149 regarding corresponding Japanese Patent Nos. 3980478 and 4213466, Preparatory Document 2 filed by Defendant (Ericsson) dated Sep. 30, 2013, 26 pgs.

*Adaptix Inc.* v. *Ericsson Japan*, Japanese Litigation Case No. 1149 regarding corresponding Japanese Patent Nos. 3980478 and 4213466, Preparatory Document 1 filed by Plaintiff (Adaptix) dated Jul. 19, 2013, 79 pgs.

*Adaptix Inc.* v. *Ericsson Japan*, Japanese Litigation Case No. 1149 regarding corresponding Japanese Patent Nos. 3980478 and 4213466, Preparatory Document 2 filed by Plaintiff (Adaptix) dated Jul. 19, 2013, 16 pgs.

*Adaptix Inc.* v. *Ericsson Japan*, Japanese Litigation Case No. 1149 regarding corresponding Japanese Patent Nos. 3980478 and 4213466, Preparatory Document 3 filed by Plaintiff (Adaptix) dated Dec. 13, 2013, 65 pgs.

*Adaptix Inc.* v. *Ericsson Japan*, Japanese Litigation Case No. 1149 regarding corresponding Japanese Patent Nos. 3980478 and 4213466, Written Reply filed by Defendant (Ericsson) dated Feb. 26, 2013, 2 pgs.

*Adaptix Inc.* v. *Ericsson Japan*, Japanese Litigation No. 1149 regarding corresponding Japanese Patent Nos. 3980478 and 4213466, Defendant's (Ericsson) Non-Infringement Contention and Invalidity Contention Briefs, Feb. 28, 2014, 38 pgs.

*Adaptix Inc.* v. *Ericsson Japan*, Japanese Litigation No. 1149 regarding corresponding Japanese Patent Nos. 3980478 and 4213466, List of Non-Prior Art/Prior Art Documents (cited in Defendant's Non-Infringement Contention and Invalidity Contentions Briefs on Feb. 28, 2014) filed by Defendant (Ericsson), Feb. 28, 2014, 2 pgs.

*Adaptix Inc.* v. *Ericsson Japan*, Japanese Litigation No. 1149 regarding corresponding Japanese Patent Nos. 3980478 and 4213466, Plantiff's (Adaptix) Answer to Defendant's Inquiry and Rebuttal to Defendant's Feb. 28, 2014 Invalidity Contentions, May 9, 2014, 45 pgs.

*Adaptix Inc.* v. *Ericsson Japan*, Japanese Litigation No. 1149 regarding corresponding Japanese Patent Nos. 3980478 and 4213466, Defendant's (Ericsson) Request for Dismissal Alleging Plaintiff's Failure to Make Infringement and Invalidity Contentions, Jul. 25, 2014, 35 pgs.

*Adaptix Inc.* v. *Ericsson Japan*, Japanese Litigation No. 1149 regarding corresponding Japanese Patent Nos. 3980478 and 4213466, List of Prior Art and Non-Prior Art Documents cited in Defendant's (Ericsson) Request for Dismissal, Jul. 25, 2014, 2 pgs.

*Adaptix Inc.* v. *Huawei Japan*, Japanese Litigation Case No. 17915 regarding corresponding Japanese Patent No. 4201595, Complaint filed by Plaintiff (Adaptix) dated Jul. 8, 2013, 34 pgs.

*Adaptix Inc.* v. *Huawei Japan*, Japanese Litigation Case No. 17915 regarding corresponding Japanese Patent No. 4201595, Description of Evidence 1 filed by Plaintiff (Adaptix) dated Jul. 22, 2013, 4 pgs.

*Adaptix Inc.* v. *Huawei Japan*, Japanese Litigation Case No. 17915 regarding corresponding Japanese Patent No. 4201595, Description of Evidence 2 filed by Plaintiff (Adaptix) dated Aug. 12, 2013, 2 pgs.

*Adaptix Inc.* v. *Huawei Japan*, Japanese Litigation Case No. 17915 regarding corresponding Japanese Patent No. 4201595, Description of Evidence 3 filed by Plaintiff (Adaptix) dated Nov. 22, 2013, 4 pgs.

*Adaptix Inc.* v. *Huawei Japan*, Japanese Litigation Case No. 17915 regarding corresponding Japanese Patent No. 4201595, Preparatory Document 1 filed by Plaintiff (Adaptix) dated Nov. 22, 2013, 39 pgs.

*Adaptix Inc.* v. *Huawei Japan*, Japanese Litigation Case No. 17915 regarding corresponding Japanese Patent No. 4201595, Written Reply filed by Defendant (Huawei) dated Oct. 15, 2013, 10 pgs.

*Adaptix Inc.* v. *Huawei Japan*, Japanese Litigation Case No. 17915 regarding corresponding Japanese Patent No. 4201595, Claim Construction/ Infringement Brief filed by Defendant (Huawei) dated Jan. 27, 2014, 23 pgs.

*Adaptix Inc.* v. *Huawei Japan*, Japanese Litigation Case No. 17915 regarding corresponding Japanese Patent No. 4201595, List of Non-Prior Art Documents (cited in Claim Construction/Infringement Brief of Jan. 27, 2014) filed by Defendant (Huawei) dated Jan. 27, 2014, 2 pgs.

*Adaptix Inc.* v. *Huawei Japan*, Japanese Litigation Case No. 17915 regarding corresponding Japanese Patent No. 4201595, Plaintiff's (Adaptix) Infringement Contention Brief, Mar. 10, 2014, 95 pgs.

*Adaptix Inc.* v. *Huawei Japan*, Japanese Litigation Case No. 17915 regarding corresponding Japanese Patent No. 4201595, List of Supporting Documents (cited in Plaintiff's Infringement Contention of Mar. 10, 2014) filed by Plaintiff (Adaptix), Mar. 10, 2014, 5 pgs.

*Adaptix Inc.* v. *Huawei Japan*, Japanese Litigation Case No. 17915 regarding corresponding Japanese Patent No. 4201595, Plaintiff's (Adaptix) Petition to Add a Damage Claim, May 16, 2014, 4 pgs.

*Adaptix Inc.* v. *Huawei Japan*, Japanese Litigation Case No. 17915 regarding corresponding Japanese Patent No. 4201595, Defendant's (Huawei) Invalidity Contention Brief, May 30, 2014, 41 pgs.

*Adaptix Inc.* v. *Huawei Japan*, Japanese Litigation Case No. 17915 regarding corresponding Japanese Patent No. 4201595, List of Prior Art/Non-Prior Art Documents cited in Invalidity Contention Brief submitted by Defendant (Huawei), May 30, 2014, 2 pgs.

*Adaptix Inc.* v. *Huawei Japan*, Japanese Litigation Case No. 17915 regarding corresponding Japanese Patent No. 4201595, Plaintiff's (Adaptix) Rebuttal to Defendant's (Huawei) Invalidity Contention Brief , Jul. 28, 2014, 23 pgs.

*Adaptix Inc.* v. *Huawei Japan*, Japanese Litigation Case No. 17915 regarding corresponding Japanese Patent No. 4201595, List of Non-

(56) References Cited

OTHER PUBLICATIONS

Prior Art Documents cited in Plaintiff's (Adaptix) Rebuttal and Infringement Contention Brief, Jul. 28, 2014, 6 pgs.
*Adaptix Inc.* v. *ZTE Japan*, Japanese Litigation Case No. 19919 regarding corresponding Japanese Patent No. 4201595, Complaint filed by Plaintiff (Adaptix) dated Jul. 29, 2013, 34 pgs.
*Adaptix Inc.* v. *ZTE Japan*, Japanese Litigation Case No. 19919 regarding corresponding Japanese Patent No. 4201595, Correction of Complaint filed by Plaintiff (Adaptix) dated Aug. 21, 2013, 2 pgs.
*Adaptix Inc.* v. *ZTE Japan*, Japanese Litigation Case No. 19919 regarding corresponding Japanese Patent No. 4201595, Description of Evidence 1 filed by Defendant (ZTE) dated Nov. 25, 2013, 2 pgs.
*Adaptix Inc.* v. *ZTE Japan*, Japanese Litigation Case No. 19919 regarding corresponding Japanese Patent No. 4201595, Description of Evidence 2 filed by Defendant (ZTE) dated Jan. 17, 2014, 4 pgs.
*Adaptix Inc.* v. *ZTE Japan*, Japanese Litigation Case No. 19919 regarding corresponding Japanese Patent No. 4201595, Description of Evidence 1 filed by Plaintiff (Adaptix) dated Aug. 7, 2013, 4 pgs.
*Adaptix Inc.* v. *ZTE Japan*, Japanese Litigation Case No. 19919 regarding corresponding Japanese Patent No. 4201595, Description of Evidence 2 filed by Plaintiff (Adaptix) dated Jan. 17, 2014, 3 pgs.
*Adaptix Inc.* v. *ZTE Japan*, Japanese Litigation Case No. 19919 regarding corresponding Japanese Patent No. 4201595, Preparatory Document 1 filed by Defendant (ZTE) dated Jan. 17, 2014, 10 pgs.
*Adaptix Inc.* v. *ZTE Japan*, Japanese Litigation Case No. 19919 regarding corresponding Japanese Patent No. 4201595, Preparatory Document 2 filed by Defendant (ZTE) dated Jan. 17, 2014, 159 pgs.
*Adaptix Inc.* v. *ZTE Japan*, Japanese Litigation Case No. 19919 regarding corresponding Japanese Patent No. 4201595, Preparatory Document 1 filed by Plantiff (Adaptix) dated Jan. 17, 2014, 73 pgs.
*Adaptix Inc.* v. *ZTE Japan*, Japanese Litigation Case No. 19919 regarding corresponding Japanese Patent No. 4201595, Written Reply filed by Defendant (ZTE) dated Nov. 25, 2013, 34 pgs.
*Adaptix Inc.* v. *ZTE Japan*, Japanese Litigation Case No. 19919 regarding corresponding Japanese Patent No. 4201595, Plaintiff's (Adaptix) Response to Defendant's (ZTE) Jan. 17, 2014 Invalidity Contention Brief, Mar. 28, 2014, 67 pgs.
*Adaptix Inc.* v. *ZTE Japan*, Japanese Litigation Case No. 19919 regarding corresponding Japanese Patent No. 4201595, Defendant's (ZTE) Non-Infringement Contention Brief, Mar. 28, 2014, 25 pgs.
*Adaptix Inc.* v. *ZTE Japan*, Japanese Litigation Case No. 19919 regarding corresponding Japanese Patent No. 4201595, Defendant's (ZTE) Invalidity Contention Brief, Mar. 28, 2014, 46 pgs.
*Adaptix Inc.* v. *ZTE Japan*, Japanese Litigation Case No. 19919 regarding corresponding Japanese Patent No. 4201595, List of Non-Prior Art/Prior Art Documents (cited in Defendant's Invalidity Contention Brief of Mar. 28, 2014) filed by Defendant (ZTE), Mar. 28, 2014, 3 pgs.
*Adaptix Inc.* v. *ZTE Japan*, Japanese Litigation Case No. 19919 regarding corresponding Japanese Patent No. 4201595, Plaintiff's (Adaptix) Petition to Add a Damage Claim, May 16, 2014, 3 pgs.
*Adaptix Inc.* v. *ZTE Japan*, Japanese Litigation Case No. 19919 regarding corresponding Japanese Patent No. 4201595, Plaintiff's (Adaptix) Response to Defendant's (ZTE) Invalidity Contention Brief, May 30, 2014, 21 pgs.
*Adaptix Inc.* v. *ZTE Japan*, Japanese Litigation Case No. 19919 regarding corresponding Japanese Patent No. 4201595, Defendant's (ZTE) Invalidity Contention Brief, May 30, 2014, 88 pgs.
*Adaptix Inc.* v. *ZTE Japan*, Japanese Litigation Case No. 19919 regarding corresponding Japanese Patent No. 4201595, List of Prior Art/Non-Prior Art Documents cited in Invalidity Contention Brief submitted by Defendant (ZTE), May 30, 2014, 2 pgs.
*Adaptix Inc.* v. *ZTE Japan*, Japanese Litigation Case No. 19919 regarding corresponding Japanese Patent No. 4201595, Plaintiff's (Adaptix) Rebuttal to Defendant's (ZTE) Invalidity Contention Brief, Jul. 31, 2014, 55 pgs.
*Adaptix Inc.* v. *ZTE Japan*, Japanese Litigation Case No. 19919 regarding corresponding Japanese Patent No. 4201595, List of Supporting Documents cited in Plaintiff's (Adaptix) Rebuttal and Infringement Contention Brief, Jul. 31, 2014, 5 pgs.
*Adaptix Inc.* v. *ZTE Japan*, Japanese Litigation Case No. 19919 regarding corresponding Japanese Patent No. 4201595, List of Prior Art and Non-Prior Art Documents cited in Defendant's (ZTE) Rebuttal and Invalidity Contention Brief, Jul. 31, 2014, 33 pgs.
*Adaptix Inc.* v. *ZTE Japan*, Japanese Litigation Case No. 19919 regarding corresponding Japanese Patent No. 4201595, List of Prior Art and Non-Prior Art Documents cited in Defendant's (ZTE) Rebuttal and Invalidity Contention Brief, Jul. 31, 2014, 2 pgs.
*Adaptix Inc.* v. *ZTE Japan*, Japanese Litigation Case No. 19919 regarding corresponding Japanese Patent No. 4201595, Plaintiff's (Adaptix) Invalidity Contention Brief, Oct. 10, 2014, 22 pgs.
*Adaptix Inc.* v. *ZTE Japan*, Japanese Litigation Case No. 19919 regarding corresponding Japanese Patent No. 4201595, Defendant's (ZTE) Invalidity Contention Brief, Oct. 10, 2014, 65 pgs.
*Adaptix Inc.* v. *Kyocera*, Japanese Litigation Case No. 22141 regarding corresponding Japanese Patent No. 4201595, Complaint filed by Plantiff (Adaptix) dated Aug. 21, 2013, 35 pgs.
*Adaptix Inc.* v. *Kyocera*, Japanese Litigation Case No. 22141 regarding corresponding Japanese Patent No. 4201595, Description of Evidence 1 filed by Plaintiff (Adaptix) dated Aug. 21, 2013, 4 pgs.
*Adaptix Inc.* v. *Kyocera*, Japanese Litigation Case No. 22141 regarding corresponding Japanese Patent No. 4201595, Preparatory Document 1 filed by Defendant (Kyocera) dated Dec. 6, 2013, 13 pgs.
*Adaptix Inc.* v. *Kyocera*, Japanese Litigation Case No. 22141 regarding corresponding Japanese Patent No. 4201595, Written Reply filed by Defendant (Kyocera) dated Oct. 2, 2013, 2 pgs.
*Adaptix Inc.* v. *Kyocera*, Japanese Litigation Case No. 22141 regarding corresponding Japanese Patent No. 4201595, Claim Construction/ Infringement Brief filed by Plaintiff (Adaptix) dated Jan. 31, 2014, 86 pgs.
*Adaptix Inc.* v. *Kyocera*, Japanese Litigation Case No. 22141 regarding corresponding Japanese Patent No. 5119070, Supplemental Claim Construction/ Infringement Brief filed by Plaintiff (Adaptix) dated Jan. 31, 2014, 32 pgs.
*Adaptix Inc.* v. *Kyocera*, Japanese Litigation Case No. 22141 regarding corresponding Japanese Patent No. 5119070, List of Non-Prior Art/Prior Art Documents (cited in Supplemental Claim Construction/ Infringement Brief of Jan. 31, 2014) filed by Plaintiff (Adaptix) dated Jan. 31, 2014, 4 pgs.
*Adaptix Inc.* v. *Kyocera*, Japanese Litigation Case No. 22141 regarding corresponding Japanese Patent No. 4201595, Claim Construction/ Infringement Brief filed by Defendant (Kyocera) dated Feb. 10, 2014, 6 pgs.
*Adaptix Inc.* v. *Kyocera*, Japanese Litigation Case No. 22141 regarding corresponding Japanese Patent No. 4201595, Plaintiff's (Adaptix) Clarification on Infringement Contention Brief of Jan. 31, 2014, Mar. 13, 2014, 11 pgs.
*Adaptix Inc.* v. *Kyocera*, Japanese Litigation Case No. 22141 regarding corresponding Japanese Patent No. 4201595, List of Supporting Document (cited in Plaintiff's Clarification on Infringement Contention Brief of Mar. 13, 2014) filed by Plaintiff (Adaptix), Mar. 13, 2014, 2 pgs.
*Adaptix Inc.* v. *Kyocera*, Japanese Litigation Case No. 22141 regarding corresponding Japanese Patent No. 4201595, Defendant's (Kyocera) Denial of Infringement, May 13, 2014, 64 pgs.
*Adaptix Inc.* v. *Kyocera*, Japanese Litigation Case No. 22141 regarding corresponding Japanese Patent No. 4201595, List of Non-Prior Art Documents cited in Defendant's Denial of Infringement, May 13, 2014, 3 pgs.
*Adaptix Inc.* v. *Kyocera*, Japanese Litigation Case No. 22141 regarding corresponding Japanese Patent No. 4201595, Plaintiff's (Adaptix) Withdrawal of Subject Matters added in Supplemental Claim Construction Brief, May 16, 2014, 1 pg.
*Adaptix Inc.* v. *Kyocera*, Japanese Litigation Case No. 22141 regarding corresponding Japanese Patent No. 4201595, Plaintiff's (Adaptix) Petition to Add a Damage Claim, May 16, 2014, 4 pgs.
*Adaptix Inc.* v. *LG Electronics*, Japanese Litigation Case No. 23278 regarding corresponding Japanese Patent No. 4201595, Complaint filed by Plaintiff (Adaptix) dated Sep. 2, 2013, 35 pgs.
*Adaptix Inc.* v. *LG Electronics*, Japanese Litigation Case No. 23278 regarding corresponding Japanese Patent No. 4201595, Description of Evidence 1 filed by Defendant (LG Electronics) dated Dec. 6, 2013, 2 pgs.

(56) References Cited

OTHER PUBLICATIONS

*Adaptix Inc.* v. *LG Electronics*, Japanese Litigation Case No. 23278 regarding corresponding Japanese Patent No. 4201595, Description of Evidence 1 filed by Plaintiff (Adaptix) dated Sep. 2, 2013, 5 pgs.
*Adaptix Inc.* v. *LG Electronics*, Japanese Litigation Case No. 23278 regarding corresponding Japanese Patent No. 4201595, Preparatory Document 1 filed by Defendant (LG Electronics) dated Dec. 6, 2013, 48 pgs.
*Adaptix Inc.* v. *LG Electronics*, Japanese Litigation Case No. 23278 regarding corresponding Japanese Patent No. 4201595, Written Reply filed by Defendant (LG Electronics) dated Oct. 10, 2013, 2 pgs.
*Adaptix Inc.* v. *LG Electronics*, Japanese Litigation Case No. 23278 regarding corresponding Japanese Patent No. 4201595, Invalidity Contention/Claim Construction Brief filed by Defendant (LG Electronics) dated Feb. 10, 2014, 27 pgs.
*Adaptix Inc.* v. *LG Electronics*, Japanese Litigation Case No. 23278 regarding corresponding Japanese Patent No. 4201595, List of Non-Prior Art/Prior Art Documents (cited in Invalidity Contention/Claim Construction Brief of Feb. 10, 2014) filed by Defendant (LG Electronics) dated Feb. 10, 2014, 3 pgs.
*Adaptix Inc.* v. *LG Electronics*, Japanese Litigation Case No. 23278 regarding corresponding Japanese Patent No. 4201595, Claim Construction/ Infringement Brief filed by Plaintiff (Adaptix) dated Feb. 10, 2014, 92 pgs.
*Adaptix Inc.* v. *LG Electronics*, Japanese Litigation Case No. 23278 regarding corresponding Japanese Patent No. 5119070, Supplemental Claim Construction/ Infringement Brief filed by Plaintiff (Adaptix) dated Feb. 10, 2014, 32 pgs.
*Adaptix Inc.* v. *LG Electronics*, Japanese Litigation Case No. 23278 regarding corresponding Japanese Patent No. 5119070, List of Non-Prior Art/Prior Art Documents (cited in Supplemental Claim Construction/Infringement Brief of Feb. 10, 2014 filed by Plaintiff (Adaptix) dated Feb. 10, 2014, 4 pgs.
*Adaptix Inc.* v. *LG Electronics*, Japanese Litigation Case No. 23278 regarding corresponding Japanese Patent Nos. 4201595 and 5119070, Defendant's (LG) Procedural Objection to Plaintiff's (Adaptix) Supplemental Claim Construction/Infringement Brief of Feb. 10, 2014, Feb. 17, 2014, 2 pgs.
*Adaptix Inc.* v. *LG Electronics*, Japanese Litigation Case No. 23278 regarding corresponding Japanese Patent Nos. 4201595 and 5119070, Defendant's (LG) Invalidity Contention Brief, Apr. 17, 2014, 4 pgs.
*Adaptix Inc.* v. *LG Electronics*, Japanese Litigation Case No. 23278 regarding corresponding Japanese Patent No. 4201595 and 5119070, Plaintiff's (Adaptix) Rebuttal to Defendant's (LG) Feb. 10, 2014 Invalidity Contention Brief, Apr. 23, 2014, 23 pgs.
*Adaptix Inc.* v. *LG Electronics*, Japanese Litigation Case No. 23278 regarding corresponding Japanese Patent Nos. 4201595 and 5119070, Plaintiff's (Adaptix) Withdrawal of Previous Allegation of Infringement for JP Patent No. 51190790 added on Feb. 10, 2014 Brief, Apr. 28, 2014, 1 pg.
*Adaptix Inc.* v. *LG Electronics*, Japanese Litigation Case No. 23278 regarding corresponding Japanese Patent Nos. 4201595 and 5119070, Plaintiff's (Adaptix) Petition to Add a Damage Claim, Apr. 28, 2014, 4 pgs.
*Adaptix Inc.* v. *LG Electronics*, Japanese Litigation Case No. 23278 regarding corresponding Japanese Patent Nos. 4201595 and 5119070, Defendant's (LG) Invalidity Contention Brief, Jun. 30, 2014, 22 pgs.
*Adaptix Inc.* v. *LG Electronics*, Japanese Ligation Case No. 23278 regarding corresponding Japanese Patent Nos. 4201595 and 5119070, List of Non-Prior Art/Prior Art Documents cited in Defendant's (LG) Invalidity Contention Brief, Jul. 1, 2014, 3 pgs.
*Adaptix Inc.* v. *LG Electronics*, Japanese Litigation Case Nos. 23278 and 10769 regarding corresponding Japanese Patent Nos. 4201595 and 5119070, Plaintiff's (Adaptix) Response to Defendant's Invalidity Contention Brief, Sep. 12, 2014, 26 pgs.
*Adaptix Inc.* v. *LG Electronics*, Japanese Litigation Case No. 10769 regarding corresponding Japanese Patent Nos. 4201595 and 5119070, Complaint filed by Plaintiff (Adaptix) regarding Infringement of JP Patent Nos. 4201595 and 5119070, Apr. 30, 2014, 120 pgs.
*Adaptix Inc.* v. *LG Electronics*, Japanese Litigation Case No. 10769 regarding corresponding Japanese Patent Nos. 4201595 and 5119070, List of Supporting Documents cited in Complaint submitted by Plaintiff (Adaptix), Apr. 30, 2014, 7 pgs.
*Adaptix Inc.* v. *LG Electronics*, Japanese Litigation Case No. 10769 regarding corresponding Japanese Patent Nos. 4201595 and 5119070, Amended Complaint filed by Plaintiff (Adaptix), May 15, 2014, 2 pgs.
*Adaptix Inc.* v. *LG Electronics*, Japanese Litigation Case No. 10769 regarding corresponding Japanese Patent Nos. 4201595 and 5119070, List of Supporting Documents cited in Amended Complaint submitted by Plaintiff (Adaptix), May 15, 2014, 2 pgs.
*Adaptix Inc.* v. *LG Electronics*, Japanese Litigation Case No. 10769 regarding corresponding Japanese Patent Nos. 4201595 and 5119070, Defendant's (LG) Invalidity Contention Brief regarding Japanese Patent No. 4201595, Jul. 4, 2014, 29 pgs.
*Adaptix Inc.* v. *LG Electronics*, Japanese Litigation Case No. 10769 regarding corresponding Japanese Patent Nos. 4201595 and 5119070, Defendant's (LG)'s Invalidity Contention Brief regarding Japanese Patent No. 5119070, Jul. 4, 2014, 46 pgs.
*Adaptix Inc.* v. *LG Electronics*, Japanese Litigation Case No. 10769 regarding corresponding Japanese Patent Nos. 4201595 and 5119070, List of Non-Prior Art/Prior Art Documents cited in Defendant's Infringement and Invalidity Contention Briefs, Jul. 4, 2014, 3 pgs.
*Adaptix Inc.* v. *LG Electronics*, Japanese Litigation Case No. 10769 regarding corresponding Japanese Patent Nos. 4201595 and 5119070, Plaintiff's (Adaptix) Rebuttal to Defendant's (LG) Invalidity Contention Brief, Sep. 12, 2014, 57 pgs.
*Adaptix Inc.* v. *ZTE Japan*, Japanese Litigation Case No. 12187 regarding corresponding Japanese Patent Nos. 4201595 and 5119070, Complaint filed by Plaintiff (Adaptix), May 16, 2014, 119 pgs.
*Adaptix Inc.* v. *ZTE Japan*, Japanese Litigation Case No. 12187 regarding corresponding Japanese Patent Nos. 4201595 and 5119070, List of Supporting Documents cited in Complaint filed by Plaintiff (Adaptix), May 16, 2014, 6 pgs.
*Adaptix Inc.* v. *Huawei Japan*, Japanese Litigation Case No. 12188 regarding corresponding Japanese Patent Nos. 4201595 and 5119070, Complaint filed by Plaintiff (Adaptix), May 16, 2014, 120 pgs.
*Adaptix Inc.* v. *Huawei Japan*, Japanese Litigation Case No. 12188 regarding corresponding Japanese Patent Nos. 4201595 and 5119070, List of Supporting Documents cited in Complaint filed by Plaintiff (Adaptix), May 16, 2014, 8 pgs.
*Adaptix Inc.* v. *Apple Japan*, Japanese Litigation Case No. 12198 regarding corresponding Japanese Patent Nos. 4201595 and 5119070, Complaint filed by Plaintiff (Adaptix), May 16, 2014, 119 pgs.
*Adaptix Inc.* v. *Apple Japan*, Japanese Litigation Case No. 12198 regarding corresponding Japanese Patent Nos. 4201595 and 5119070, List of Supporting Documents cited in Complaint filed by Plaintiff (Adaptix), May 16, 2014, 6 pgs.
*Adaptix Inc.* v. *Apple Japan*, Japanese Litigation Case No. 12198 regarding corresponding Japanese Patent No. 4201595 and 5119070, Defendant's (Apple) Response to Plaintiff's (Adaptix) Complaint, Jun. 17, 2014, 2 pgs.
*Adaptix Inc.* v. *Kyocera*, Japanese Litigation Case No. 12199 regarding corresponding Japanese Patent Nos. 4201595 and 5119070, Complaint filed by Plaintiff (Adaptix), May 16, 2014, 119 pgs.
*Adaptix Inc.* v. *Kyocera*, Japanese Litigation Case No. 12199 regarding corresponding Japanese Patent No. 4201595 and 5119070, List of Supporting Documents cited in Complaint filed by Plaintiff (Adaptix), May 16, 2014, 6 pgs.
*Adaptix Inc.* v. *Ericsson*, Japanese Litigation Case No. 24183 regarding corresponding Japanese Patent No. 4031707, Defendant's (Ericsson) Invalidity Contention Brief, May 8, 2015, 37 pgs.
*Adaptix Inc.* v. *Ericsson*, Japanese Litigation Case No. 24183 regarding corresponding Japanese Patent No. 4031707, List of Prior Art/Non-Prior Art Documents cited in the Defendant's (Ericsson) Infringement and Invalidity Contention Briefs, May 8, 2015, 2 pgs.

(56) References Cited

OTHER PUBLICATIONS

*Adaptix Inc.* v. *Fujitsu*, Japanese Litigation Case No. 26079 regarding corresponding Japanese Patent No. 4031707, Defendant's (Fujitsu) Invalidity Contention Brief, May 8, 2015, 28 pgs.
*Adaptix Inc.* v. *Fujitsu*, Japanese Litigation Case No. 26079 regarding corresponding Japanese Patent No. 4031707, List of Prior Art Documents cited in the Defendant's (Fujitsu) Invalidity Contention Brief, May 8, 2015, 2 pgs.
*Adaptix Inc.* v. *Fujitsu*, Japanese Litigation Case No. 29107 regarding corresponding Japanese Patent No. 5606611, Plaintiff's (Adaptix) Complaint, Nov. 4, 2014, 60 pgs.
*Adaptix Inc.* v. *Fujitsu*, Japanese Litigation Case No. 29107 regarding corresponding Japanese Patent No. 5606611, List of Prior Art/Non-Prior Art Documents cited in Plaintiff's (Adaptix) Complaint, Nov. 4, 2014, 4 pgs.
Demand (JPO) filed by ZTE dated May 10, 2013 relating to Japanese Invalidation Trial No. 2013-800082 regarding corresponding Japanese Patent No. 3980478, 71 pgs.
Written Reply (JPO) filed by Adaptix dated Sep. 3, 2013 relating to Japanese Invalidation Trial No. 2013-800082 regarding corresponding Japanese Patent No. 3980478, 27 pgs.
*ZTE Japan* v. *Adaptix Inc.*, Japanese Invalidation Trial No. 2013-800082 regarding corresponding Japanese Patent No. 3980478, ZTE's Rebuttal to Adaptix's Sep. 3, 2013 Written Reply, Feb. 5, 2014, 19 pgs.
*ZTE Japan* v. *Adaptix Inc.*, Japanese Invalidation Trial No. 2013-800082 regarding corresponding Japanese Patent No. 3980478, Adaptix's Summary of Oral Proceedings, May 27, 2014, 26 pgs.
*ZTE Japan* v. *Adaptix Inc.*, Japanese Invalidation Trial No. 2013-800082 regarding corresponding Japanese Patent No. 3980478, ZTE's Summary of Oral Proceedings, May 27, 2014, 37 pgs.
*ZTE Japan* v. *Adaptix Inc.*, Japanese Invalidation Trial No. 2013-800082 regarding corresponding Japanese Patent No. 3980478, Favorable Trial Decision issued by Trial Examiner Upholding Patentability of Japanese Patent No. 3980478, Aug. 22, 2014, 49 pgs.
Demand (JPO) filed by ZTE dated May 10, 2013 relating to Japanese Invalidation Trial No. 2013-800083 regarding corresponding Japanese Patent No. 4213466, 59 pgs.
Written Reply (JPO) filed by Adaptix dated Sep. 5, 2013 relating to Japanese Invalidation Trial No. 2013-800083 regarding corresponding Japanese Patent No. 4213466, 35 pgs.
Written Statement (JPO) filed by ZTE dated Jan. 21, 2014 relating to Japanese Invalidation Trial No. 2013-800083 regarding corresponding Japanese Patent No. 4213466, 54 pgs.
Written Statement for Oral Presentation (JPO) filed by Adaptix dated Jan. 21, 2014 relating to Japanese Invalidation Trial No. 2013-800083 regarding corresponding Japanese Patent No. 4213466, 49 pgs.
Written Statement for Oral Presentation (JPO) filed by ZTE dated Jan. 21, 2014 relating to Japanese Invalidation Trial No. 2013-800083 regarding corresponding Japanese Patent No. 4213466, 25 pgs.
*ZTE Japan* v. *Adaptix Inc.*, Japanese Invalidation Trial No. 2013-800083 regarding corresponding Japanese Patent No. 4213466, Petition for Further Consideration filed by Adaptix, Mar. 7, 2014, 6 pgs.
*ZTE Japan* v. *Adaptix Inc.*, Japanese Invalidation Trial No. 2013-800083 regarding corresponding Japanese Patent No. 4213466, Notice of Finalization of Trial Examination in favor of Adaptix issued by Trial Examiner-in-Chief, Mar. 6, 2014, 1 pg.
*ZTE Japan* v. *Adaptix Inc.*, Japanese Invalidation Trial No. 2013-800083 regarding corresponding Japanese Patent No. 4213466, Favorable Trial Decision issued by Trial Examiner upholding patentability of Japanese Patent No. 4213466, Mar. 28, 2014, 70 pgs.
Demand (JPO) filed by Huawei dated Jul. 31, 2013 relating to Japanese Invalidation Trial No. 2013-800141 regarding corresponding Japanese Patent No. 3980478, 70 pgs.
Written Reply (JPO) filed by Adaptix dated Nov. 18, 2013 relating to Japanese Invalidation Trial No. 2013-800141 regarding corresponding Japanese Patent No. 3980478, 46 pgs.

*Huawei* v. *Adaptix Inc.*, Japanese Invalidation Trial No. 2013-800141 regarding corresponding Japanese Patent No. 3980478, Huawei's Rebuttal to Adaptix's Nov. 18, 2013 Written Reply, Jan. 29, 2014, 61 pgs.
*Huawei* v. *Adaptix Inc.*, Japanese Invalidation Trial No. 2013-800141 regarding corresponding Japanese Patent No. 3980478, Amendment to Translation of Citations filed by Huawei, Mar. 7, 2014, 13 pgs.
*Huawei* v. *Adaptix Inc.*, Japanese Invalidation Trial No. 2013-800141 regarding corresponding Japanese Patent No. 3980478, Adaptix's Summary of Oral Proceedings, Jun. 2, 2014, 14 pgs.
*Huawei* v. *Adaptix Inc.*, Japanese Invalidation Trial No. 2013-800141 regarding corresponding Japanese Patent No. 3980478, Huawei's Summary of Oral Proceedings, Jun. 2, 2014, 3 pgs.
*Huawei* v. *Adaptix Inc.*, Japanese Invalidation Trial No. 2013-800141 regarding corresponding Japanese Patent No. 3980478, Huawei's Additional Summary of Oral Proceedings, Jun. 10, 2014, 9 pgs.
*Huawei* v. *Adaptix Inc.*, Japanese Invalidation Trial No. 2013-800141 regarding corresponding Japanese Patent No. 3980478, Summary of Hearing issued by Trial Examiner-in-Chief, Jun. 18, 2014, 2 pgs.
*Huawei* v. *Adaptix Inc.*, Japanese invalidation Trial No. 2013-800141 regarding corresponding Japanese Patent No. 3980478, Favorable Trial Decision issued by Trial Examiner Upholding Patentability of Japanese Patent No. 3980478, Aug. 25, 2014, 36 pgs.
Demand (JPO) filed by Huawei dated Aug. 7, 2013 relating to Japanese Invalidation Trial No. 2013-800147 regarding corresponding Japanese Patent No. 4213466, 67 pgs.
Written Reply (JPO) filed by Adaptix dated Nov. 27, 2013 relating to Japanese Invalidation Trial No. 2013-800147 regarding corresponding Japanese Patent No. 4213466, 34 pgs.
*Huawei* v. *Adaptix Inc.*, Japanese Invalidation Trial No. 2013-800147 regarding corresponding Japanese Patent No. 4213466, Amendment to Translation of Citations filed by Huawei, Mar. 4, 2014, 13 pgs.
*Huawei* v. *Adaptix Inc.*, Japanese Invalidation Trial No. 2013-800147 regarding corresponding Japanese Patent No. 4213466, Summary of Written Statement for Oral Presentation filed by Adaptix, Apr. 8, 2014, 18 pgs.
*Huawei* v. *Adaptix Inc.*, Japanese Invalidation Trial No. 2013-800147 regarding corresponding Japanese Patent No. 4213466, Summary of Written Statement for Oral Presentation filed by Huawei, Apr. 8, 2014, 44 pgs.
*Huawei* v. *Adaptix Inc.*, Japanese Invalidation Trial No. 2013-800147 regarding corresponding Japanese Patent No. 4213466, Amendment to Translation of Citations filed by Huawei, Apr. 15, 2014, 7 pgs.
*Huawei* v. *Adaptix Inc.*, Japanese Invalidation Trial No. 2013-800147 regarding corresponding Japanese Patent No. 4213466, Favorable Trial Decision issued by Trial Examiner upholding patentability of Japanese Patent No. 4213466, Jun. 17, 2014, 79 pgs (with partial translation).
Demand (JPO) filed by ZTE dated Dec. 18, 2013 relating to Japanese Invalidation Trial No. 2013-800235 regarding corresponding Japanese Patent No. 3980478, 77 pgs.
*ZTE Japan* v. *Adaptix Inc.*, Japanese Invalidation Trial No. 2013-800235 regarding corresponding Japanese Patent No. 3980478, Written Reply filed by Adaptix, Apr. 17, 2014, 39 pgs.
*ZTE Japan* v. *Adaptix Inc.*, Japanese Invalidation Trial No. 2013-800235 regarding corresponding Japanese Patent No. 3980478, ZTE's Response to Adaptix's Written Reply, May 30, 2014, 19 pgs.
*ZTE Japan* v. *Adaptix Inc.*, Japanese Invalidation Trial No. 2013-800235 regarding corresponding Japanese Patent No. 3980478, Inquiry issued by Japanese Patent Office, Jun. 16, 2014, 2 pgs.
*ZTE Japan* v. *Adaptix Inc.*, Japanese Invalidation Trial No. 2013-800235 regarding corresponding Japanese Patent No. 3980478, Adaptix's Summary of Written Statement for Oral Presentation, Aug. 26, 2014, 34 pgs.
*ZTE Japan* v. *Adaptix Inc.*, Japanese Invalidation Trial No. 2013-800235 regarding corresponding Japanese Patent No. 3980478, ZTE's Summary of Written Statement for Oral Presentation, Aug. 26, 2014, 5 pgs.
*ZTE Japan* v. *Adaptix Inc.*, Japanese Invalidation Trial No. 2013-800235 regarding corresponding Japanese Patent No. 3980478, ZTE's Additional Written Statement, Sep. 24, 2014, 5 pgs.

(56) References Cited

OTHER PUBLICATIONS

*ZTE Japan v. Adaptix Inc.*, Japanese Invalidation Trial No. 2013-800235 regarding corresponding Japanese Patent No. 3980478, Adaptix's Response to ZTE's Additional Written Statement, Oct. 8, 2014, 2 pgs.
*ZTE Japan v. Adaptix Inc.*, Japanese Invalidation Trial No. 2014-800008 regarding corresponding Japanese Patent No. 4201595, Demand filed by ZTE, Jan. 16, 2014, 140 pgs.
*ZTE Japan v. Adaptix Inc.*, Japanese Invalidation Trial No. 2014-800008 regarding corresponding Japanese Patent No. 4201595, Written Reply filed by Adaptix, May 26, 2014, 72 pgs.
*ZTE Japan v. Adaptix Inc.*, Japanese Invalidation Trial No. 2014-800008 regarding corresponding Japanese Patent No. 4201595, Adaptix's Summary of Written Statement for Oral Presentation, Sep. 16, 2014, 60 pgs.
*ZTE Japan v. Adaptix Inc.*, Japanese Invalidation Trial No. 2014-800008 regarding corresponding Japanese Patent No. 4201595, ZTE's Summary of Written Statement for Oral Presentation, Sep. 16, 2014, 60 pgs.
*Huawei v. Adaptix Inc.*, Japanese Invalidation Trial No. 2014-800074 regarding corresponding Japanese Patent No. 3980478, Demand filed by Huawei, May 13, 2014, 65 pgs.
*Huawei v. Adaptix Inc.*, Japanese Invalidation Trial No. 2014-800074 regarding corresponding Japanese Patent No. 3980478, Adaptix's Written Reply, Sep. 2, 2014, 25 pgs.
*Huawei v. Adaptix Inc.*, Japanese Invalidation Trial No. 2014-800092 regarding corresponding Japanese Patent No. 4201595, Demand filed by Huawei, Jun. 2, 2014, 42 pgs.
*Huawei v. Adaptix Inc.*, Japanese Invalidation Trial No. 2014-800092 regarding corresponding Japanese Patent No. 4201595, Adaptix's Written Reply, Sep. 18, 2014, 30 pgs.
*NEC v. Adaptix Inc.*, Japanese Invalidation Trial No. 2014-800156 regarding corresponding Japanese Patent No. 5435681, Demand filed by NEC, Sep. 12, 2014, 31 pgs.
*NEC v. Adaptix Inc.*, Japanese Invalidation Trial No. 2014-800156 regarding corresponding Japanese Patent No. 5435681, Written Reply filed by Adaptix, Jan. 13, 2015, 34 pgs.
*NEC v. Adaptix Inc.*, Japanese Invalidation Trial No. 2014-800156 regarding corresponding Japanese Patent No. 5435681, Summary of Presentation for Oral Hearing filed by Adaptix, Mar. 31, 2015, 14 pgs.
*NEC v. Adaptix Inc.*, Japanese Invalidation Trial No. 2014-800156 regarding corresponding Japanese Patent No. 5435681, Summaly of Presentation for Oral Presentation filed by NEC, Mar. 31, 2015, 12 pgs.
Amendment (JPO) dated Jul. 28, 2008 for JP 2002-550747, 3 pgs.
Amendment (USPTO) for U.S. Appl. No. 09/685,977 Sep. 2, 2004, 15 pgs.
Amendment (USPTO) for U.S. Appl. No. 09/837,701 on Jul. 27, 2004, 13 pgs.
Appeal Brief of U.S. Appl. No. 11/199,586 (issued as U.S. Pat. No. 7,454,212), pp. 15-16, Oct. 2007, 2 pgs.
Register for JP 3980478 B dated Aug. 27, 2012 submitted in Japanese Litigation Case No. 1149, 21 pgs.
Register for JP 3980478 B dated Aug. 27, 2012 submitted in Japanese Litigation Case No. 28418, 1 pg.
Register for JP 3980478 B dated Aug. 27, 2012 submitted in Japanese Litigation Case No. 31440, 1 pg.
Register for JP 4201595 B dated Aug. 1, 2013 submitted in Japanese Litigation Case No. 17915, 1 pg.
Register for JP 4201595 B dated Aug. 1, 2013 submitted in Japanese Litigation Case No. 22141, 1 pg.
Register for JP 4201595 B dated Aug. 1, 2013 submitted in Japanese Litigation Case No. 23278, 1 pg.
Register for JP 4201595 B dated Jun. 21, 2013 submitted in Japanese Litigation Case No. 17915, 1 pg.
Register for JP 4201595 B dated Jun. 21, 2013 submitted in Japanese Litigation Case No. 19919, 2 pgs.
Register for JP 4201595 B dated Apr. 24, 2014 submitted in Japanese Litigation Case No. 10769, 1 pg.
Register for JP 4213466 B dated Aug. 27, 2012 submitted in Japanese Litigation Case No. 1149, 1 pg.
Register for JP 4213466 B dated Aug. 27, 2012 submitted in Japanese Litigation Case No. 28418, 1 pg.
Register for JP 4213466 B dated Aug. 27, 2012 submitted in Japanese Litigation Case No. 31440, 1 pg.
Register for JP 5119070 B dated Apr. 24, 2014 submitted in Japanese Litigation Case No. 10769, 1 pg.
Demand of Trial (JPO) dated Jul. 28, 2008 for JP 2002-550747, 5 pgs.
Notice of Final Refusal (JPO) dated Apr. 21, 2008 for JP 2002-550747, 2 pgs.
Office Action (JPO) dated May 14, 2007 for JP 2002-550747, 7 pgs (with English translation).
Prosecution History (JPO) of JP 4213466 (English translation), Filing date of Dec. 20, 2013, 43 pgs.
Remarks (JPO) dated Aug. 21, 2007 for JP 2002-550747, 2 pgs.
Remarks (USPTO) for U.S. Appl. No. 09/837,701 dated Jul. 27, 2004, 13 pgs.
3rd Generation Partnership Project, 3GPP TR 21.801 V8.1.0, pp. 7 and 36, Mar. 2008, 6 pgs.
3rd Generation Partnership Project, 3GPP TR 21.801 V8.1.0, p. 36, Mar. 2008, 4 pgs.
3rd Generation Partnership Project, 3GPP TR 21.801 V10.1.2, pp. 7 and 36, Sep. 2011, 6 pgs.
3rd Generation Partnership Project, 3GPP TS 36.201 V8.3.0, pp. 7-8, Mar. 2009, 6 pgs.
3rd Generation Partnership Project, 3GPP TS 36.201 V10.0.0, pp. 7-8, Dec. 2010, 4 pgs.
3rd Generation Partnership Project, 3GPP TS 36.211 V10.5.0, pp. 52, 58, 60, 62, 73, 86, Jun. 2012,15 pgs.
3rd Generation Partnership Project, 3GPP TS 36.211 V10.5.0, pp. 52, 56-60, 73-74, and 86-87, Jun. 2012, 14 pgs.
3rd Generation Partnership Project, 3GPP TS 36.211 V10.5.0, pp. 73-75, Jun. 2012, 4 pgs.
3rd Generation Partnership Project, 3GPP TS 36.211 V10.5.0, pp. 86-87, Jun. 2012, 3 pgs.
3rd Generation Partnership Project, 3GPP TS 36.211 V8.9.0, pp. 45-46 and 65-66, Dec. 2009, 11 pgs.
3rd Generation Partnership Project, 3GPP TS 36.211 V8.9.0, pp. 46, 51-53, and 65, Dec. 2009, 11 pgs.
3rd Generation Partnership Project, 3GPP TS 36.211 V8.9.0, pp. 46, 51-53, and 65-66, Dec. 2009, 9 pgs.
3rd Generation Partnership Project, 3GPP TS 36.211 V8.9.0, p. 66, Dec. 2009, 3 pgs.
3rd Generation Partnership Project, 3GPP TS 36.211 V8.9.0, pp. 45-46, 65, and 67, Dec. 2009, 9 pgs.
3rd Generation Partnership Project, 3GPP TS 36.212 V10.5.0, pp. 54-55 and 23, Mar. 2012, 7 pgs.
3rd Generation Partnership Project, 3GPP TS 36.212 V10.5.0, p. 56, Mar. 2012, 3 pgs.
3rd Generation Partnership Project, 3GPP TS 36.212 V8.3.0, pp. 25-26, May 2008, 3 pgs.
3rd Generation Partnership Project, 3GPP TS 36.212 V8.3.0, pp. 36-37 and 22, May 2008, 6 pgs.
3rd Generation Partnership Project, 3GPP TS 36.212 V8.3.0, p. 38, May 2008, 3 pgs.
3rd Generation Partnership Project, 3GPP TS 36.213 V10.5.0, pp. 18, 30, 43, 63, 66, and 79, Mar. 2012, 13 pgs.
3rd Generation Partnership Project, 3GPP TS 36.213 V10.5.0, pp. 26, 28-30, 46-62, and 65, Mar. 2012, 36 pgs.
3rd Generation Partnership Project, 3GPP TS 36.213 V10.5.0, pp. 28-29, Mar. 2012, 3 pgs.
3rd Generation Partnership Project, 3GPP TS 36.213 V10.5.0, pp. 46-51, Mar. 2012, 11 pgs.
3rd Generation Partnership Project, 3GPP TS 36.213 V10.5.0, pp. 51-62, Mar. 2012, 17 pgs.
3rd Generation Partnership Project, 3GPP TS 36.213 V10.5.0, pp. 63-65, Mar. 2012, 4 pgs.
3rd Generation Partnership Project, 3GPP TS 36.213 V8.8.0, pp. 21, 23, 37-47, and 49, Sep. 2009, 24 pgs.
3rd Generation Partnership Project, 3GPP TS 36.213 V8.8.0, pp. 23, 34-35, and 37-49, Sep. 2009, 29 pgs.

(56) References Cited

OTHER PUBLICATIONS

3rd Generation Partnership Project, 3GPP TS 36.213 V8.8.0, pp. 33-34, 36-40, and 47-48, Sep. 2009, 15 pgs.
3rd Generation Partnership Project, 3GPP TS 36.213 V8.8.0, pp. 34-35, 37-42, and 48, Sep. 2009, 14 pgs.
3rd Generation Partnership Project, 3GPP TS 36.213 V8.8.0, pp. 37-47, Sep. 2009, 19 pgs.
3rd Generation Partnership Project, 3GPP TS 36.213 V8.8.0, pp. 36-40, Sep. 2009, 6 pgs.
3rd Generation Partnership Project, 3GPP TS 36.300 V10.5.0, pp. 18-19, 41, 46-47, 49, 54, 89-91, 115-116, and 157, Sep. 2011, 32 pgs.
3rd Generation Partnership Project, 3GPP TS 36.300 V10.5.0, p. 22, Sep. 2011, 3 pgs.
3rd Generation Partnership Project, 3GPP TS 36.300 V10.5.0, pp. 54, 89, and 91-92, Sep. 2011, 10 pgs.
3rd Generation Partnership Project, 3GPP TS 36.300 V8.12.0, pp. 15, 26, 31, 33-34, 37-38, 67-69, 76, and 115, Mar. 2010, 30 pgs.
3rd Generation Partnership Project, 3GPP TS 36.300 V8.12.0, p. 19, Mar. 2010, 3 pgs.
3rd Generation Partnership Project, 3GPP TS 36.300 V8.12.0, pp. 37-38 and 67-69, Mar. 2010, 10 pgs.
3rd Generation Partnership Project, 3GPP TS 36.331 V10.12.0, p. 168, Dec. 2013, 3 pgs.
3rd Generation Partnership Project, 3GPP TS 36.401 V10.4.0, p. 10, Jun. 2012, 3 pgs.
3rd Generation Partnership Project, 3GPP TS 36.420 V10.2.0, pp. 6 and 8, Sep. 2011, 4 pgs.
3rd Generation Partnership Project, 3GPP TS 36.423 V8.9.0, pp. 10-16, Mar. 2010, 10 pgs.
3rd Generation Partnership Project, 3GPP TS 36.423 V8.9.0, pp. 16 and 48, Mar. 2010, 7 pgs.
3rd Generation Partnership Project, 3GPP TS 36.423 V10.5.0, pp. 11-19, Mar. 2012, 12 pgs.
3rd Generation Partnership Project, 3GPP TS 36.423 V10.5.0, pp. 18 and 59, Mar. 2012, 7 pgs.
3rd Generation Partnership Project, 3GPP TS 36.423 V10.5.0, p. 90, Mar. 2012, 2 pgs.
Abdul-Haleem et al., "Aggressive Fuzzy Distributed Dynamic Channel Assignment Algorithm," IEEE International Conference on Communications, pp. 423-427, Jun. 1995, 5 pgs.
Acampora, "Wireless ATM: A Perspective on Issues and Prospects," IEEE Personal Communications, vol. 3, No. 4, pp. 8-17, Aug. 1996, 10 pgs.
Adachi et al, "Coherent Multicode DS-CDMA Mobile Radio Access," IEICE Trans. Commun., vol. E79-B, No. 9, pp. 1316-1325, Sep. 1996, 10 pgs.
Adaptix, "Adaptix Selects Maxim to Power New SX-Series Mobile WiMAX Terminals," Business Wire, 15:01:00, Jan. 8, 2007, 2 pgs.
Ahmed et al., "An Adaptive Array Processor with Robustness and Broad-Band Capabilities," IEEE Trans. on Antennas and Propagation, vol. AP-32, No. 9, pp. 944-950, Sep. 1984, 7 pgs.
Ahmed et al., "Broadband Adaptive Array Processing," IEEE Proceedings, vol. 130, Pt. F, No. 5, pp. 433-440, Aug. 1983, 8 pgs.
Alexiou et al., "Downlink Capacity Enhancement by Employing SDMA in GSM," Sensor Array and Multichannel Signal Processing Workshop, 2000, Proceedings of the 2000 IEEE, pp. 413-417, Mar. 16-17, 2000, 5 pgs.
Alouini, Mohamed-Slim et al., "An Adaptive Modulation Scheme for Simultaneous Voice and Data Transmission Over Fading Channels," IEEE, Dec. 1997, 32 pgs.
Alouini et al., "An Adaptive Modulation Scheme for Simultaneous Voice and Data Transmission over Fading Channels," IEEE. J. on Selected Areas Comm., vol. 17, No. 5, pp. 837-850, May 1999, 14 pgs.
American Heritage Dictionary of the English Language, Fourth Edition, Houghton Mifflin Company, p. 1578, Apr. 2006, 3 pgs.
American Heritage Dictionary, Second College Edition, p. 78, 1982, 3 pgs.
Anderson et al., "Adaptive Antennas for GSM and TDMA Systms," Personal Communications, IEEE, pp. 74-86, Jun. 1999, 13 pgs.
Anderson et al., "Ericsson/Mannesmann GSM Field-Trials with Adaptive Antennas," 3 Vehicular Technology Conference, 1997, IEEE 47th, pp. 1587-1591, May 4-7, 1997, 5 pgs.
Anderson et al., "GSM/TDMA Adaptive Antenna Field-Trial Results," 2 Antennas and Propagation Society International Symposium 1999, IEEE, pp. 1108-1111, Jul. 11-16, 1999, 4 pgs.
Anderson et al., "Technology and Transceiver Architecture Considerations for Adaptive Antennas," ETSI STC SMG2#24 Tdoc SMG2 400/97, pp. 1-6, Dec. 1997, 6 pgs.
Andrews et al., "Fundamentals of WiMAX: Understanding Broadband Wireless Networking," Prentice Hall, p. 303, Feb. 2007, 4 pgs.
Applebaum, "Adaptive Arrays," IEEE Trans. Ant. Prop., vol. AP-24, No. 5, Sep. 1976, 14 pgs.
Armstrong, Jean et al., "Polynomial Cancellation Coding of OFDM to Reduce Intercarrier Interference Due to Doppler Spread," IEEE 0-7803-4894-9/98, pp. 2771-2776, Nov. 1998, 6 pgs.
Arvelo, "Physical Layer DSP Design of a Wireless Gigabit/s Indoor LAN," May 2000, 165 pgs.
"Ascend," Huawei Webpage, May 9, 2013, 8 pgs.
Astely et al., "Spatial Signature Estimation for Uniform Linear Arrays with Unknown Receiver Gains and Phases," IEEE Transactions on Signal Processing, vol. 47, No. 8, pp. 2128-2138, Aug. 1999, 11 pgs.
Asztely et al., "A Generalized Array Manifold Model for Local Scattering in Wireless Communications," 1997 IEEE Int'l Conf. on Acoustics, Speech, and Signal processing, vol. 5, pp. 4021-4024, Apr. 21, 1997, 4 pgs.
Authoritative Dictionary of IEEE Standard Terms, Seventh Edition, IEEE Standards Information Network/IEEE Press, pp. 1017-1018, Dec. 2000, 41 pgs.
Balachandran, Krishna, "Channel Quality Estimation and Rate Adaptation for Cellular Mobile Radio," IEEE Journal on Selected Areas in Communications, vol. 17, No. 7, pp. 1244-1256, Jul. 1, 1999, 13 pgs.
Bana et al., "Space Division Multiple Access (SMDA) for Robust Ad hoc Vehicle Communication Networks," IEEE 4th Int'l Conf. on Intelligent Transportation Systems, pp. 1-6, Aug. 2001, 6 pgs.
Bana, "Real-Time Vehicle Location with Desired Accuracy," IEEE 4th Int'l Conf. on Intelligent Transportation Systems, Aug. 2001, 6 pgs.
Bang et al., "A Coarse Frequency Offset Estimation in an OFDM System Using the Concept of the Coherence Phase Bandwidth," IEEE 0-7803-6283-7, pp. 1135-1139, Jun. 2000, 5 pgs.
"Base Stations," Ericsson Webpage, available at www.ericsson.com/ourportfolio/products/base-stations, Nov. 20, 2012, 2 pgs.
Bender et al., "CDMA/HDR: A Bandwidth-Efficient High-Speed Wireless Data Service for Nomadic Users," IEEE Communications Magazine, pp. 70-87, Jul. 2000, 19 pgs.
Black's Law Dictionary, Seventh Edition, p. 100, Aug. 1999, 2 pgs.
Blogh, J.S. et al., "Dynamic Channel Allocation Techniques Using Adaptive Modulation and Adaptive Antennas," IEEE VTC, Sep. 1999, 5 pgs.
Blum et al., "Improved Space-time coding for MIMO-OFDM Wireless Communications," IEEE Trans. on Communications, pp. 1873-1878, Nov. 2001, 6 pgs.
Blum et al., "Improved Techniques for 4 transmit and 4 receive antenna MIMO-OFDM," Spring IEEE Vehicular Technology Conference, pp. 1298-1303, May 2001, 5 pgs.
Bonek et al., "Space Division Multiple Access (SDMA): An Editorial Introduction," Wireless Personal Communications, vol. 11, p. 1, Oct. 1999, 1 pg.
Broadband Radio Access Networks (BRAN), "Inventory of Broadband Radio Technologies and Techniques," ETSI Technical Report, TR 101 173, V1.1.1, DTR/BRAN-030001, May 1998, 41 pgs.
Buckley, "Spatial/Spectral Filtering with Linearly Constrained Minimum Variance Beamformers," IEEE Trans. on Acoustics, Speech, and Signal Processing, vol. ASSP-35, No. 3, pp. 249-266, Mar. 1987, 18 pgs.
Burr, A.G., "Wide-band Channel Model Using a Spatial Model," 1998 IEEE 5th International Symposium on Spread Spectrum Techniques and Applications, IEEE, pp. 255-257, Sep. 2-4, 1998, 3 pgs.
Businessnetwork.jp Webpage, available at businessnetwork.jp/tabid/65/artid/2136/page/2/Default.aspx, Feb. 21, 2013, 2 pgs.

(56) References Cited

OTHER PUBLICATIONS

Cao et al., "Efficient distributed channel allocation for cellular networks," Computer Communications, pp. 950-961, May 2000, 13 pgs.
Casas, "OFDM for Data Communication Over Mobile Radio FM-Channels-Part I: Analysis and Experimental Results," IEEE Trans. Commun., vol. 39, No. 5, pp. 783-793, May 1991, 11 pgs.
Catreux et al., "Simulation Results for an Interference-Limited Multiple-Input Multiple-Output Cellular System," IEEE Communication Letters, vol. 4, No. 11, pp. 334-336, Nov. 2000, 4 pgs.
Chang, "Synthesis of Band-Limited Orthogonal Signals for Multichannel Data Transmission," Bell Sys. Tech. Jour., vol. 45, pp. 1775-1796, Dec. 1996, 22 pgs.
Chen, "Joint Sub-carrier, Bit, and Power Allocation Algorithms for OFDM-based Multi-user Systems," 1999, 45 pgs.
Cheng and Verdu, "Gaussian Multiaccess Channels with ISI: Capacity Region and Multiuser Water-Filling," IEEE Trans. Info. Theory, vol. 39, No. 3, pp. 773-785, May 1993, 13 pgs.
Chinese Office Action issued for 01817199.0 dated Apr. 22, 2005, 10 pgs.
Chow, J. et al., "A Discrete Multitone Transceiver System for HDSL Applications," IEEE Journal on Selected Areas in Communications, vol. 9, No. 6, pp. 895-908, Aug. 1991, 14 pgs.
Chuang and Sollenberger, "Beyond 3G: Wideband Wireless Data Access Based on OFDM and Dynamic Packet Assignment," IEEE Communications Magazine, vol. 38, No. 7, pp. 78-87, Jul. 2000, 10 pgs.
Chuang and Sollenberger, "Spectrum Resource Allocation for Wireless Packet Access with Application to Advanced Cellular Internet Service," IEEE Journal on Selected Areas in Communications, vol. 16, No. 6, pp. 820-829, Aug. 1998, 10 pgs.
Chuang et al., "A Pilot Based Dynamic Channel Assignment Scheme for Wireless Access TDMA/FDMA Systems," Universal Personal Communications 1993, Personal Communications: Gateway to the 21st Century Conference Record., 2nd Int'l Conference on (vol. 2), ISBN 0-7803-1396-8, pp. 706-712 vol. 2, Oct. 12, 1993, 7 pgs.
Chuang et al., "Dynamic frequency hopping in cellular systems with network assisted resource allocation," IEEE, VTC2000, pp. 2459-2463, May 2000, 5 pgs.
Chuang et al., "High-Speed Wireless Data Access Based on Combining EDGE with Wideband OFDM," IEEE Communications Magazine, pp. 92-98, Nov. 1999, 7 pgs.
Chuang et al., "OFDM Based High-Speed Wireless Access for Internet Applications," 11th IEEE International Symposium on Personal Indoor and Mobile Radio Communications, vol. 2, pp. 797-803, Sep. 2000, 7 pgs.
Chuang, et al., "Power Control for Dynamic Packet Assignment in Advanced Cellular Internet Service," IEEE VTC '98, pp. 1750-1754, May 1998, 5 pgs.
Chuang et al., "Wideband Wireless Data Access Based on OFDM and Dynamic Packet Assignment," IEEE 0-7803-5668-3/99, Sep. 21, 1999, 5 pgs.
Chuang, "An OFDM-based System with Dynamic Packet Assignment and Interference Suppression for Advanced Cellular Internet Service," IEEE Global Telecommunications Conference, vol. 2, pp. 974-979, Nov. 1998, 6 pgs.
Cimini, Jr., et al., "Advanced Cellular Internet Service (ACIS)," IEEE Communications Magazine, pp. 150-159, Oct. 1998, 10 pgs.
Cimini et al., "Clustered OFDM with transmitter diversity and coding," IEEE, 0-7803-3336-5/96, pp. 703-707, Nov. 1996, 5 pgs.
Cimini et al., "OFDM with Diversity and Coding for High-Bit-Rate Mobile Data Applications," Mobile Multimedia Communications, pp. 247-254, 1997, 8 pgs.
Cimini, Jr., "Analysis and Simulation of a Digital Mobile Channel Using Orthogonal Frequency Division Multiplexing," IEEE Trans. Commun., vol. COM-33, No. 7, pp. 665-675, Jul. 1985, 11 pgs.
Czylwik, Adreas, "Adaptive OFDM for Wideband Radio Channels," IEEE 0-7803-3336-5/96, pp. 713-718, Nov. 1996, 6 pgs.

Daisuke Takeda et al., "Orthogonal Multi-code OFDM-DS/CDMA Using Partial Bandwidth Transmission," Technical Report of IEICE RCS97-160, NII—Electronic Library Service, published Nov. 1997 [Translated], 7 pgs.
Dam et al., "Performance Evaluation of Adaptive Antenna Base Stations in a Commercial GSM Network," Vehicular Technology Conference, 1999, IEEE 50th, pp. 47-51, Sep. 19-22, 1999, 5 pgs.
Dong et al., "Distributed Dynamic Carrier Allocations in Mobile Cellular Networks: Search vs. Update," IEEE, Proceedings of the 17th International Conference on Distributed Computing Systems, pp. 108-115, May 1997, 8 pgs.
Hattori et al., "All about 3G Evolution: LTE Mobile Broadband System Technology," Maruzen Corporation, pp. 318-329, Dec. 25, 2009, 8 pgs.
Despins et al., "Compound Strategies of Coding, Equalization, and Space Diversity for Wide-Band TDMA Indoor Wireless Channels," IEEE Trans. on Vehicular Technology, vol. 41, No. 4, pp. 369-379, Nov. 1992, 11 pgs.
"Dictionary of Science and Engineering," 3rd Edition, IPC Inter Press Corporation, pp. 716 and 718, Dec. 20, 1994, 5 pgs.
"Dictionary of Science and Engineering," 3rd Edition, IPC Inter Press Corporation, p. 1176, Dec. 20, 1994, 3 pgs.
"Dictionary of Telecommunication Network Terms," edited by Ikeda et al., published by Shuwa System, pp. 157-158, Jun. 2001, 3 pgs.
"Dictionary of Terms Radiowaves & Telecommunications," 5th Edition, published by DenkiTsuShin ShinKou Kai, pp. 374-375, Aug. 1992, 3 pgs.
Dimou, "Interference Management within 3GPP LTE Advanced—Part II," Ericsson Research, Feb. 25, 2013, 4 pgs.
Doufexi et al., "A Comparison of HIPERLAN/2 and IEEE 802.11a Physical and MAC Layers," IEEE 0-7803-6684-0/00, pp. 14-20, Oct. 2000, 7 pgs.
Electronics Information Communication Society of Japan, "IEICE Dictionary of Electronics, Information and Communication Terms," Corona Publishing Co., Ltd., pp. 132-133, Jul. 9, 1999, 3 pgs.
English translation of Japanese Office Action for Application No. 2002-550683, dispatched May 7, 2007, 2 pgs.
English translation of Japanese Office Action for Application No. 2002-550747, dispatched May 21, 2007, 4 pgs.
English translation of Japanese Office Action issued for Japanese Application No. 2004-551,367, Dated Mar. 4, 2008, 2 pgs.
English Translation of the Office Action issued for Chinese Patent Application No. 200610081062.5, Dated Apr. 3, 2009, 7 pgs.
Engstrom et al., "A system for Test of Mulitaccess Methods based on OFDM," IEEE 44th Vehicular Technology Conference, vol. 3, pp. 1843-1845, Jun. 1994, 3 pgs.
Er, "On the Limiting Solution of Quadratically Constrained Broad-Band Beam Formers," IEEE Trans. on Signal Proc., vol. 41, No. 1, pp. 418-419, Jan. 1993, 2 pgs.
Ericson et al., "Evaluation ot Mixed Service Ability for Competitive Third Generation Multiple Access Technologies," IEEE 0-7803-3659-3/97, pp. 1356-1369, May 1997, 4 pgs.
Ericsson Webpage, pp. 1-3, 3 pgs.
Eriksson, "Capacity Improvement by Adaptive Channel Allocation," IEEE Global Telecomm. Conf, pp. 1355-1359, Nov. 28-Dec. 1, 1988, 5 pgs.
ETSI ETS 300 744, Digital Video Broadcasting (DVB); Framing structure, channel coding and modulation for digital Terrestrial television (DVB-T), Mar. 1997, 48 pages.
ETSI SMG2, SMG2 TD 8/96, "A Multi-Carrier Air Interface Based on OFDM," ETSI, published Mar. 1, 1996, "TD 8/96," 7 pgs.
ETSI SMG2 Adhoc on UMTS Tdoc SMG2 UMTS 16/97, "Procedure for the definition of the UMTS Terrestrial Radio Access," SMG2, pp. 1-2, Jan. 14, 1997, 2 pgs.
ETSI SMG2 Plenary Tdoc SMG2 301/97, "Beta Concept Group Status Report," Beta Concept Group, pp. 1-2, Oct. 1997, 2 pgs.
ETSI SMG2 UMTS Ad hoc #3 Annex 1, "ETSI Sub Technical Committee SMG2 Special Mobile Group Meeting Report 3rd SMG2 Ad hoc on UMTS held in Rennes, France," ETSI Sub Technical Committee SMG2 Special Mobile Group, pp. 1-15, Aug. 1997, 15 pgs.
ETSI SMG2 UMTS ad hoc #3 Annex 2,"Proposal for changes of ETR04.02," CSEM/Pro Telecom, Ericsson, France Telecom CNET, Nokia, Siemens AG, Vodafone, pp. 1-12, Aug. 1997, 12 pgs.

(56) References Cited

OTHER PUBLICATIONS

ETSI SMG2 UMTS ad hoc #4 Tdoc SMG2 146/97, "Statement from Beta/Gamma meeting," Beta and Gamma chairmen, p. 1, Nov. 1997, 1 pg.
ETSI SMG2 UMTS Ad-hoc #1 Annex 1 Tdoc SMG2 UMTS 02x/97, "Draft High level requirements relevant for the definition of the UMTS Terrestrial Radio Access UTRA concept," SMG2, pp. 1-4, 1997, 4 pgs.
ETSI SMG2 UMTS Ad-hoc #1 Annex 2, "Draft Meeting report for SMG2 Adhoc meeting in Le Mans, Jan. 13-15, 1997," pp. 1-8, Jan. 1997, 8 pgs.
ETSI SMG2 UMTS Ad-hoc #1 Annex 3 Tdoc 17/97, "Proposed time schedule for UMTS Terrestrial Radio Access definition," SMG2, pp. 1-8, Jan. 14, 1997, 8 pgs.
ETSI SMG2 UMTS Ad-hoc #1 Annex 4, "ODMA," SMG2, pp. 1-9, Jun. 23, 1997, 9 pgs.
ETSI SMG2 UMTS Ad-hoc meeting #4 Tdoc SMG2 UMTS 133/97, "Telia's Evaluation of Access Proposals," Telia, pp. 1-9, Nov. 1997, 9 pgs.
ETSI SMG2 UMTS Ad-Hoc Tdoc 89/97, "Proposed Concept Group Work Schedule," UMTS Concept Group Co-ordination Committee, pp. 1-2, Aug. 1997, 2 pgs.
ETSI STC SMG2#21 Tdoc SMG2 58/97, "Proposed UTRA Concept Grouping," p. 1, Mar. 1997, 1 pg.
ETSI SMG2#22 Tdoc SMG2 120/97, "Common Workplan of SMG2 UTRA Concept Groups," NEC Technologies (UK) Ltd., pp. 1-2, May 1997, 2 pgs.
ETSI SMG2#22, Tdoc SMG2 179/97, "Proposal for OFDM Concept Group," ETSI, Lucent Technologies, Sony International (Europe) GmbH, Telia Research, May 12, 1997, "TD 179/97," 2 pgs.
ETSI STC SMG2 ad hoc No. 4 on UMTS Tdoc SMG2 UMTS 110/97, "Draft Agenda," SMG2, p. 1, Nov. 1997, 1 pg.
ETSI STC SMG2 ad hoc No. 4 on UMTS Tdoc SMG2 130/97, "Draft Report of ETSI SMG2 UMTS ad hoc No. 4, Nov. 17-21, 1997 in Helsinki," pp. 1-30, Nov. 1997, 30 pgs.
ETSI STC SMG2 Tdoc SMG2 263/96, "Status of WI" Mobile Assisted Frequency Allocation, Ericsson, p. 1, Dec. 1996, 1 pg.
ETSI STC SMG2#20 SMG2 TD XXX/96, "BDMA and its applicability as UMTS access scheme," Sony Deutschland GmbH, pp. 1-25, Dec. 1996, 25 pgs.
ETSI STC SMG2#20 Tdoc SMG2 261/96, "Decisions outside SMG relating to UMTS air interface," Lucent Technologies, p. 1, Dec. 1996, 1 pg.
ETSI STC SMG2#20 Tdoc SMG2 269/96, "Improvements to MS Measurement Reports," One2one, pp. 1-3, Dec. 1996, 3 pgs.
ETSI STC SMG2#22, TDoc SMG2 180/97, "Description of Telias OFDM Based Proposal," ETSI, published May 1997, "TD 180/97," 22 pgs.
ETSI SMG2#23 Tdoc SMG2 318/97, "Achieving Forward Handover with the UTRA," BT, pp. 1-2, Sep. 1997, 2 pgs.
ETSI STC SMG2#23, SMG2 TD 299/97, "OFDMA Evaluation Report, The Multiple Access Scheme Proposal for the UMTS Terrestrial Radio Air Interface (UTRA), Part 1—System Description Performance Evaluation," OFDMA (Beta) Concept Group, Oct. 1, 1997, "TD 299/97," 47 pgs.
ETSI STC SMG2#24, TD ETSI STC SMG#24, TD 399/97, ETSI, published Dec. 1997, "TD 399/97," 9 pgs.
ETSI STC SMG2#24 SMG2 TD 412/97, "Management Summary of the Beta concept group," OFDMA (Beta) Concept Group, pp. 1-2, Dec. 1997, 2 pgs.
ETSI STC SMG2#24 SMG2 TD 436/97, "Summary of the concept description of the Beta concept," OFDMA (Beta) Concept Group, pp. 2-5, Dec. 1997, 4 pgs.
ETSI STC SMG2#24, SMG2 TD 432/97, "OFDMA (Beta) Concept Group," ETSI, published Dec. 1997, "TD 432/97," 6 pgs.
ETSI STC SMG2#24 SMG2 TD 4445/97 "Annex for the OFDMA Evaluation Report," OFDMA (Beta) Concept Group, pp. 1-4, Dec. 1997, 4 pgs.
ETSI STC SMG2#24 Tdoc SMG2 330/97, "Draft Agenda," SMG2, pp. 1-2, Dec. 1997, 2 pgs.

ETSI STC SMG2#24 Tdoc SMG2 371/97 "Draft Summary of the UTRA defnition procedure in SMG2" SMG2 chairman, pp. 1-3, Dec. 1997, 3 pgs.
ETSI STC SMG2#24 Tdoc SMG 401/97 "Antenna Duplexing and Switching in UMTS Terminals" Philips Consumer Communications, pp. 1-4, Nov. 1997, 4 pgs.
ETSI STC SMG2#24 Tdoc SMG2 402a, "Introduction of SDMA component into UMTS radio interface," Philips Consumer Communications, pp. 1-4, Dec. 1997, 9 pgs.
ETSI STC SMG2#24 Tdoc SMG2 443/97, "Summary of the UTRA definition procedure in SMG2," SMG2, pp. 1-3, Dec. 1997, 3 pgs.
ETSI UMTS ad hoc meeting #4 SMG2 UMTS Tdoc 135/97, "GSM Reference configuration for capacity comparison with UTRA concepts," T-Mobil, Mannesmann Mobilfunk, Omnitel, Orange, France Telecom CNET, pp. 1-2, Nov. 1997, 2 pgs.
ETSI SMG meeting No. 24, Concept Group Beta, "OFDMA Evaluation Report—The Multiple Access Scheme Proposal for the UMTS Terrestrial Radio Air Interface (UTRA)," Tdoc/SMG 896/97, Madrid, Spain, Dec. 1997, 114 pgs.
ETSI SMG meeting No. 24, Concept Group Beta, "OFDMA (Orthogonal Frequency Division Multiplex Access) System Description Performance Evaluation," Tdoc/SMG 896/97, Madrid, Spain, Dec. 15-19, 1997, 71 pgs.
ETSI SMG2, "A Conceptual Study of OFDM-based Multiple Access Schemes, Part 1: Air Interface Requirements; Part 2: Channel Estimation in the Uplink," Telia Research, pp. 1-14, May 22, 1996, 14 pgs.
ETSI SMG2, "A Conceptual Study of OFDM-based Multiple Access Schemes, Part 4: Tracking of Time and Frequency Offset," Telia Research, pp. 1-12, Dec. 1996, 12 pgs.
ETSI SMG2, "A Conceptual Study of OFDM-based Multiple Access Schemes, Part 5: Preliminary Study of OFDM spectral efficiency," Telia Research, pp. 1-9, Dec. 1996, 10 pgs.
ETSI TS 136 101 V8.23.0 (3GPP TS 36.101 V8.23.0 Release 8), "LTE; Evolved Universal Terrestrial Radio Access (E-UTRA); User Equipment (UE) radio transmission and reception," Jan. 2014, 175 pgs.
ETSI/STC SMG2 (97) "ETSI Sub Technical Committee SMG2 Special Mobile Group Meeting Report 24th SMG2 Plenary meeting held in Cork, IRL," p. 1-42, Dec. 1997, 42 pgs.
ETSI/STC SMG2 (97), "ETSI Sub Technical Committee SMG2 Special Mobile Group Meeting Report 24th SMG2 Plenary meeting held in Cork, IRL," pp. 1-43, Dec. 1997, 43 pgs.
European Office Action from Application No. 01 986 165.7, Dated Mar. 29, 2007, 5 pgs.
European Telecommunications Standards Institute ("ETSI"), "Universal Mobile Telecommunications System (UMTS), UMTS Terrestrial Radio Access (UTRA), Concept Evaluation (UMTS 30.06 version 3.0.0)," TR 101 146 V3.0.0, Dec. 1997, 689 pgs.
Extended European Search Report issued for European Application No. 08105483.5, Jan. 21, 2009, 8 pgs.
Extended European Search Report issued for European Application No. 05826452.4, Apr. 23, 2010, 6 pgs.
Excerpts from IEEE Communications Magazine, vol. 38 No. 7, including "CDMA/HDR: A Bandwidth-Efficient High-Speed Wireless Data Service for Nomadic Users" by Paul Bender et al. and "Beyond 3G: Wideband Wireless Data Access Based on OFDM and Dynamic Packet Assignment" by Chuang and Sollenberger, Jul. 2000, 22 pgs.
Falk, "Prolog to Adaptive Multicarrier Modulation: A Convenient Framework for Time-Frequency Processing in Wireless Communications, An Introduction to the paper by Keller and Hanzo," Proceedings of the IEEE, vol. 88, No. 5, pp. 609-610, May 2000, 2 pgs.
Farsakh et al., "Application of Space Division Multiple Access to Mobile Radio," 2 IEEE International Symposium on Personal, Indoor, and Mobile Radio Communications, pp. 736-739, Sep. 18-23, 1994, 4 pgs.
Farsakh, C. et al., "Maximizing the SDMA Mobile Radio Capacity Increase by DOA Sensitive Channel Allocation," Wireless Personal Communications, Kluwer Academic Publishers, NL, vol. 11, No. 1, XP000835062, ISSN: 0929-6212, pp. 63-76, Oct. 1999, 14 pgs.

(56) References Cited

OTHER PUBLICATIONS

Farsakh, Christof and Nossek, Josef A., "A Real Time Downlink Channel Allocation Scheme for an SDMA Mobile Radio System," IEEE 0-7803-3692-5/96, pp. 1216-1220, Oct. 1996, 5 pgs.
Farsakh, Christof and Nossek, Josef A., "Channel Allocation and Downlink Beamforming in an SDMA Mobile Radio System," IEEE 0-7803-3002-1/95, pp. 687-691, Sep. 1995, 5 pgs.
Farsakh, Christof and Nossek, Josef A., "On the Mobile Radio Capacity Increase through SDMA," Accessing, Transmission, Networking Proceedings, pp. 293-297, Feb. 1998, 5 pgs.
Farsakh et al., "Spatial Covariance Based Downlink Beamforming in an SDMA Mobile Radio System," IEEE Trans. on Communications, vol. 46, No. 11, pp. 1497-1506, Nov. 1998, 10 pgs.
Fazel, "Narrow-Band Interference Rejection in Orthogonal Multi-Carrier Spread-Spectrum Communications," Record, 1994 Third Annual International Conference on 55 Universal Personal Communications, IEEE, pp. 46-50, Sep. 1994, 5 pgs.
Fitton et al., "A Comparison of RMS Delay Spread and Coherence Bandwidth for Characterization of Wideband Channels," The Institution of Electrical Engineers (IEE), Savoy Place, London, pp. 9/1-9/6, Oct. 1996, 6 pgs.
Fitton et al., "The Impact of System Bandwidth on a Frequency Hopped Channel," Antennas and Propagation, Conference Publication No. 407, pp. 140-143, Apr. 4-7, 1995, 4 pgs.
Forssen et al., "Adaptive Antenna Arrays for GSM900/DCS1800," Proc. IEEE 44th Vehicular Technology Conference, pp. 605-609, Jun. 1994, 5 pgs.
Foschini, Gerard J., "Layered Space-Time Architecture for Wireless Communication in a Fading Environment When Using Multi-Element Antennas," Bell Labs Technical Journal, Lucent Technologies, pp. 41-59, Autumn 1996, 19 pgs.
Foschini et al., "On Limits of Wireless Communications in a Fading Environment when Using Multiple Antennas," Wireless Personal Communications vol. 6, No. 3, Kluwer Academic Publishers, pp. 311-335, Mar. 1998, 26 pgs.
Foschini et al., "Simplified Processing for High Spectral Efficiency Wireless Communication Employing Multi-Element Arrays," IEEE Journal on Selected Areas in Communications, vol. 17, No. 11, pp. 184-1852, Nov. 1999, 13 pgs.
Frullone et al., "PRMA Performance in Cellular Environments with Self-Adaptive Channel Allocation Strategies," IEEE Transactions on Vehicular Technology, vol. 45, No. 4, pp. 657-665, Nov. 1996, 10 pgs.
Fuhl et al., "Capacity Enhancement and BER in a Combined SDMA/TDMA System," IEEE 46th Conf. on Vehicular Technology, vol. 3, pp. 1481-1485, Apr. 1996, 5 pgs.
Fuhl et al., "Unified Channel Model for Mobile Radio Systems with Smart Antennas," 145 Radar, Sonar and Navigation, IEEE Proceedings, pp. 32-41, Feb. 1998, 10 pgs.
Gans et al., "Co-Channel Interference in High Capacity Fixed Wireless Loops (FWL)," Electronics Letters, vol. 35, No. 17, pp. 1422-1424, Aug. 19, 1999, 3 pgs.
Ghosh et al., "Fundamentals of LTE," Prentice Hall, pp. 21, 53-58, and 138-142, Sep. 2010, 15 pgs.
Glossary of Technical Terms in Japanese Industrial Standards, 5th Edition, Japanese Standards Association, p. 111, Mar. 30, 2001, 3 pgs.
"Glossary of Technical Terms in Japanese Industrial Standards," 5th Edition, Japanese Standards Association, p. 1629, Mar. 30, 2001, 3 pgs.
Godara, "Applications of Antenna Arrays to Mobile Communications, Part I: Performance Improvement, Feasibility, and System Considerations," Proc. IEEE, vol. 85, No. 7, pp. 1031-1060, Jul. 1997, 30 pgs.
Godara, "Applications of Antenna Arrays to Mobile Communications, Part II: Beam-Forming and Direction-of-Arrival Considerations," Proc. IEEE, vol. 85, No. 8, pp. 1195-1245, Aug. 1997, 51 pgs.
Goldburg et al., "The Impacts of SDMA on PCS System Design," IEEE Int'l Conf. on Universal Personal Communications 1994, pp. 242-246, Sep. 1994, 5 pgs.

Golden et al., "Detection Algorithm and Initial Laboratory Results Using V-BLAST Space-Time Communication Architecture," Electronics Letters, vol. 35, No. 1, Jan. 7, 1999, 2 pgs.
Goldsmith et al., "Adaptive Coded Modulation for Fading Channels," IEEE Transactions on Communications, vol. 46, No. 5, pp. 595-602, May 1998, 8 pgs.
Goldsmith et al., "Variable-Rate Variable-Power MQAM for Fading Channels," IEEE Transactions on Communications, vol. 45, No. 10, pp. 1218-1230, Oct. 1997, 13 pgs.
Goodman, "Second Generation Wireless Information Networks," IEEE Trans. of Veh. Tech., vol. 40, No. 2, pp. 366-374, May 1991, 9 pgs.
Goransson et al., "Advanced Antenna Systems for WCDMA: Link and System Level Results," 11th Annual Symposium on Person, Indoor and Mobile Radio Communications 2000, IEEE, pp. 62-66, Sep. 18, 2000, 5 pgs.
Gourgue, F., "Air Interface of the Future European Fully Digital Trunk Radio System," Institute of Electrical and Electronics Engineers Personal Communication—Freedom through Wireless Technology, Secaucus, NJ, USA (Proceedings of Vehicular Technology Conference), 1993 IEEE, pp. 714-716, May 18-20, 1993, 5 pgs.
Grant et al., "Per-Antenna-Rate-Control (PARC) in Frequency Selective Fading SIC-GRAKE Receiver," IEEE 60th Vehicular Technology Conference, Fall 2004, pp. 1458-1462, Sep. 26-29, 2004, 5 pgs.
Grunheid, R. et al., "Adaptive Modulation and Multiple Access for the OFDM Transmission Technique," Wireless Personal Communications 13:5-13, 2000, Kluwer Academic Publishers, XP000894156, ISSN: 0929-6212, pp. 5-13, May 2000, 9 pgs.
Gupta et al., "Distributed Dynamic Channel Allocation in Mobile Networks: Combining Search and Update," 1999 IEEE International Performance, Computing and Communications Conference, pp. 120-126, Feb. 1999, 7 pgs.
Haardt, "Unitary ESPRIT: How to Obtain Increased Estimation Accuracy with a Reduced Computational Burden," IEEE Trans. on Signal Proceeding, vol. 43, No. 5, pp. 1232-1242, May 1995, 11 pgs.
Hac et al., "Dynamic Channel Assignment in Wireless Communication Networks," International Journal of Network Management, pp. 38-60, Jan. 1, 1999, 23 pgs.
Hadad et al., "Initial OFDM/OFDMA PHY proposal for the 802.16.3 BWA," IEEE 802.16 Broadband Wireless Access Working Group, IEEE 802.16.3c-00/33, Oct. 30, 2000, 20 pgs.
Hadad et al., "Initial OFDMA/OFDMA PHY proposal for the 802.16.3 BWA," IEEE 802.16.3c-00/34, Oct. 30, 2000, 21 pgs.
Haeiwa et al., "OFDM Technologies and Their Applications," Corona Publishing Co., Ltd., pp. 92-93, Sep. 17, 2010, 2 pgs.
Hagerman et al., "Adaptive Antennas in IS-136 Systems," 3 Vehicular Technology Conference, 1998, IEEE 48th, pp. 2282-2286, May 18-21, 1998, 5 pgs.
Hagerman et al., "Evaluation of Novel Multi-Beam Antenna Configurations for TDMA (IS-136) Systems," Vehicular Technology Conference, 1999 IEEE 49th, pp. 653-657, May 16, 1999, 5 pgs.
Hanaro et al., "Performance of Dynamic Channel Assignment Methods in Cellular Systems Using Beam Tilting and Adaptive Array," Proc. IEEE Vehicular Technology Conf., vol. 4, pp. 2092-2095, Sep. 1999, 4 pgs.
Harada et al., "Super 3G (LTE) System Summary and Experimental Results," pp. 15-21, Nov. 2008, 7 pgs.
Hattori et al., "All about 3G Evolution: LTE Mobile Broadband System Technology," Maruzen Corporation, pp. 319-323, May 10, 2011, 4 pgs.
Hattori et al., "All about 3G Evolution: LTE Mobile Broadband System Technology," Maruzen Corporation, pp. 358-363, Dec. 25, 2009, 5 pgs.
Hattori et al., "All about 3G Evolution: HSPA Mobile Broadband Technology & LTE Basic Technology," Maruzen Corporation, pp. 78-81, May 10, 2011, 4 pgs.
Hattori et al., "Wireless Broadband Textbook," published by IDG Japan, pp. 301-302, Jun. 2002, 3 pgs.
Hattori, "OFDM/OFDMA Textbook," Impress R&D, pp. 2-9 and 50-53, Sep. 21, 2008, 7 pgs.
Hattori, "OFDM/OFDMA Textbook," Impress R&D, pp. 8-11, Sep. 21, 2008, 3 pgs.

(56) References Cited

OTHER PUBLICATIONS

Hattori, "OFDM/OFDMA Textbook," Impress R&D, pp. 72-77, Sep. 21, 2008, 4 pgs.
Hattori, "OFDM/OFDMA Textbook," Impress R&D, pp. 109-110 and 237-238, Sep. 21, 2008, 5 pgs.
Hattori, "OFDM/OFDMA Textbook," Impress R&D, pp. 162-163, Sep. 21, 2008, 2 pgs.
Hattori, "OFDM/OFDMA Textbook," Impress R&D, pp. 274-277, Sep. 21, 2008, 3 pgs.
Hattori, "OFDM/OFDMA Textbook," Impress R&D, pp. 280-283, Sep. 21, 2008, 3 pgs.
Hattori, "OFDM/OFDMA Textbook," Impress R&D, pp. 284-287, 296-297, and 306-307, Sep. 21, 2008, 6 pgs.
Hattori, "OFDM/OFDMA Textbook," Impress R&D, pp. 304-307, Sep. 2008, 3 pgs.
Hero et al., "Highlights of Statistical Signal and Array Processing," IEEE Signal Processing Magazine, vol. 15, No. 5, pp. 21-64, Sep. 2008, 44 pgs.
Hillebrand, "UMTS Work Program," UMTS Work Program, pp. 1-4, 1996, 4 pgs.
Hirosaki, "An Orthogonally Multiplexed QAM System Using the Discrete Fourier Transform," IEEE Trans. Communications, vol. 29, pp. 982-989, Jul. 1981, 8 pgs.
Hrasnica et al., "Modeling MAC Layer for Powerline Communications Networks," SPIE Symposium on Information Technology, Internet, Performance, and Control of Network Systems, Nov. 2000, 12 pgs.
Hrasnica et al., "Powerline Communications for Access Networks: Performance Study of the MAC Layer," III International Conference on Telecommunications, Oct. 23-25, 2000, 10 pgs.
Heath et al., "Coordinated Training and Transmission for Improved Interference Cancellation in a Cellular Network," IEEE 0-7803-6514-3/00, pp. 939-945, Oct. 2007, 7 pgs.
Hattori et al., "HSPA+/LTE/SAE Textbook," Impress R&D, pp. 2-11, Dec. 11, 2010, 6 pgs.
Hattori et al., "HSPA+/LTE/SAE Textbook," Impress R&D, pp. 30-31, Dec. 11, 2010, 2 pgs.
Hattori et al., "HSPA+/LTE/SAE Textbook," Impress R&D, pp. 48-55, Dec. 11, 2010, 7 pgs.
Hattori et al., "HSPA+/LTE/SAE Textbook," Impress R&D, pp. 146-149, Dec. 11, 2010, 3 pgs.
Hattori et al., "HSPA+/LTE/SAE Textbook," Impress R&D, pp. 398-401, Dec. 11, 2010, 3 pgs.
Huang et al., "A spatial clustering scheme for downlink beamfomning in SDMA mobile radio," Proc. of the 10th IEEE Workshop on Statistical Signal and Array Processing, pp. 191-195, Aug. 2000, 5 pgs.
Huang et al., "SINR Maximizing Space-Time Filtering for Asynchronous DS-CDMA," IEEE Journal on Selected Areas in Communications, vol. 18, No. 7, pp. 1191-1202, Jul. 2000, 12 pgs.
HuaWave: Issue 3, Aug. 2011, 28 pgs.
Huawei webpage, 1 pg.
Huawei webpage, available at www.huawei.com/jp/about-huawei/newsroom/press-release/hw-104207-huawei.htm, Dec. 13, 2012, 4 pgs.
IEEE Computer Society and the IEEE Microwave and Techniques Society, "Part 16: Air Interface for Fixed and Mobile Broadband Wireless Access Systems, Amendment 2: Physical and Medium Access Control Layers for Combined Fixed and Mobile Operation in Licensed Bands, and Corrigendum 1," IEEE Std. 802.16e, Feb. 28, 2006, 11 pgs.
IEEE Computer Society and the IEEE Microwave and Techniques Society, "Part 16: Air Interface for Fixed Broadband Wireless Access Systems," IEEE Std 802.16-2004, IEEE, Oct. 2004, 895 pgs.
IEEE Computer Society and the IEEE Microwave and Techniques Society, "Part 16: Air Interface for Fixed Broadband Wireless Access Systems," IEEE Std 802.16-2004, IEEE, pp. 167-213, Oct. 2004, 47 pgs.
IEEE Computer Society, "Part 11: Wireless LAN Medium Access Control (MAC) and Physical Layer (PHY) specifications: High-Speed Physical Layer in the 5 GHZ Band," IEEE Std 802.11a-1999, IEEE Supplement, Sep. 16, 1999, 90 pgs.
IEEE Standard Dictionary of Electrical and Electronics Terms, Sixth Edition, pp. 304-305, Sep. 30, 1989, 3 pgs.
IEEE Standard Dictionary of Electrical and Electronics Terms, Sixth Edition, p. 894, Apr. 1997, 2 pgs.
IEEE Standard Dictionary of Electrical and Electronic Terms, Sixth Edition, p. 959, Apr. 1997, 3 pgs.
Li et al., "Search Result for Clustered OFDM with channel estimation for high rate wireless data," IEEE Xplore Webpage, accessed on Dec. 10, 2013, 2 pgs.
Rohling et al., "Search Result for Performance comparison of different multiple access schemes for the downlink of an OFDM communication system," IEEE Xplore Webpage, accessed on Dec. 10, 2013, 2 pgs.
Electronics Information Communication Society of Japan, "IEICE Dictionary of Electronics, Information and Communication Terms," Corona Publishing Co., Ltd, pp. 318-319, and 416-417, Jul. 9, 1999, 4 pgs.
Illustrated Dictionary of Electronics, Fourth Edition, p. 114, May 1988, 3 pgs.
Imai, Hideki, "Information Theory," 10th Edition, pp. 1-7, Sep. 30, 1990, 6 pgs.
Inoue, "Illustrated Mechanism and Technology of Mobile Communication," Animo Publishers, pp. 82-85, Oct. 15, 2012, 3 pgs.
International Telecommunication Union (ITU), "Definitions of World Telecommunications/ICT Indicators," Mar. 2010, 4 pgs.
International Telecommunication Union (ITU), "Vocabulary of Terms for Wireless Access (Questions ITU-R 215/8 and ITU-R 140/9)," Recommendation ITU-R F.1399-1, May 2001, 5 pgs.
International Search Report issued for PCT/US02/36030 dated Jun. 26, 2003, 1 pg.
Internatinal Search Report & Written Opinion issued for PCT/US05/44156 dated Oct. 26, 2006, 5 pgs.
Ishii et al., "Spatial and Temporal Equalization Based on an Adaptive Tapped-Delay-Line Array Antenna," IEICE Trans. Commun., vol. E78-B, No. 8, pp. 1162-1169, Aug. 1995, 9 pgs.
Jafar et al., "Optimal Rate and Power Adaptation for Multirate CDMA," Stanford University, Wireless Systems Laboratory, Sep. 2000, 7 pgs.
Japanese Office Action issued for JP 2004-551367 dated Jan. 6, 2009, 3 pgs.
Jeng et al., "Experimental Studies of Spatial Signature Variation at 900 MHz for Smart Antenna Systems," IEEE Trans. on Antennas and Propagation, vol. 46, No. 7, pp. 953-962, Jul. 1998, 10 pgs.
Jeng et al., "Measurements of Spatial Signatures of an Antenna Array," Personal, Indoor, and Mobile Radio Communications, PIMRC'95, vol. 2, 0-7803-3002-1/95, pp. 669-672, Sep. 1995, 4 pgs.
Johnsson, Martin, "HiperLAN/2—The Broadband Radio Transmission Technology Operating in the 5 GHz Frequency Band," Global Forum, 1999, 22 pgs.
Johannisson, Bjorn (Ericsson), "Adaptive Base Station Antennas for Mobile Communication Systems," 1998 IEEE-APS Conference on Antennas and Propagation for Wireless Communications, pp. 49-52, Nov. 1-4, 1998, 4 pgs.
Kaiser, "MC-FDMA and MC-TDMA versus MC-CDMA and SS-MC-MA: Performance Evaluation for Fading Channels," Spread Spectrum Techniques and Applications, 1998. Proceedings, 1998 IEEE 5th Int'l Symposium on, 0-7803-4281-X, pp. 200-204, Sep. 2, 1998, 7 pgs.
Kapoor, S. et al., "Adaptive Interference Suppression in Multiuser Wireless, OFDM Systems Using Antenna Arrays," IEEE Transactions on Signal Processing, vol. 47, No. 12, pp. 3381-3391, Dec. 1999, 11 pgs.
Katzela et al., "Channel Assignment Schemes for Cellular Mobile Telecommunication Systems: A Comprehensive Survey," IEEE Personal Communications, 1070-9916/96, pp. 10-31, Jun. 1996, 22 pgs.
Keller et al., "Adaptive Modulation Techniques for Duplex OFDM Transmission," IEEE vol. 49, No. 5, Sep. 2000, 14 pgs.
Keller, Thomas, et al., "Adaptive Multicarrier Modulation: A Convenient Framework for Time-Frequency Processing in Wireless Communications," IEEE Proceedings of the IEEE, vol. 88, No. 5, pp. 611-640, May 5, 2000, 30 pgs.

(56) References Cited

OTHER PUBLICATIONS

Kenkyuukai, "Shin Joho Tsushin Gairon," Information Communication Technology Research Society, 2nd Edition, Oct. 15, 2012, 2 pgs.

Kerpez, Kenneth J., "The Channel Capacity of Hybrid Fiber/Coax (HFC) Networks," Information Theory, 1995, Proceedings 1995 IEEE International Symposium on Whistler, BC, Canada, p. 481, Sep. 17-22, 1995, 1 pg.

Kim, et al., "Performance Analysis of an MC-CDMA System with Antenna Array in a Fading Channel," IEICE Trans. Commun., vol. E83-B, No. 1, pp. 84-92, Jan. 2000, 9 pgs.

Kim, et al., "Spatial Multiuser Access OFDM with Antenna Diversity and Power Control," IEEE VTC 2000 at p. 273, pp. 273-279, vol. 1, Sep. 2000, 7 pgs.

Kinoshita et al, "Common Air Interface between Wide-Area Cordless Telephone and Urban Cellular Radio: Frequency Channel Dobully Reused Cellular Systems," IEICE Transactions B-2, vol. 76-B2, No. 6, pp. 487-495, Jun. 1993, 9 pgs.

Kinugawa, Y. et al., "Frequency and Time Division Multiple Access with Demand-Assignment Using Multicarrier Modulation for Indoor Wireless Communications Systems," IEICE Transactions on Communications, Institute of Electronics Information and Comm. Eng. Tokyo, Japan, vol. E77-B, No. 3, pp. 396-402, XP000451014, ISSN: 0916-8516, Mar. 1994, 7 pgs.

Kishore et al., "The Throughput of Adaptive Spread Spectrum Communication Over Multipath Dispersive Channels," ICPWC 2000, IEEE, pp. 532-537, Dec. 2000, 6 pgs.

Kivanc et al., "Subcarrier Allocation and Power control for OFDMA," IEEE 0-7803-6514-3/00, pp. 147-151, Oct. 2000, 5 pgs.

Knopp et al., "Information Capacity and Power Control in Single-Cell Multiuser Communications," IEEE 0-7803-2486-2/95, Jun. 1995, 5 pgs.

Kohno et al., "Adaptive Array Antenna Combined with Tapped Delay Line Using Processing Gain for Spread-Spectrum CDMA Systems," IEEE Int'l Symp. Personal Indoor and Mobile Radio Communications, pp. 634-638, Oct. 1992, 5 pgs.

Kojima, Fumihide, et al., "Adaptive Sub-Carriers Control Scheme for OFDM Cellular Systems," IEEE 51st Vehicular Technology Conference Proceedings, pp. 1065-1069, May 18, 2000, 5 pgs.

Kolding, "Link and System Performance Aspects of Proportional Fair Scheduling in WCDMA/HSDPA," Mar. 2003 IEEE 58th Vehicular Technology Conference, 2003, pp. 1717-1722, Oct. 6-9, 2003, 6 pgs.

Korean Office Action issued for 2003-7007962 dated Apr. 28, 2006, 3 pgs.

Korean Office Action issued for 2003-7007963 dated Apr. 29, 2006, 2 pgs.

Kronestedt et al., "Migration of Adaptive Antennas into Existing Networks," Vehicular Technology Conference, 1998, 48th IEEE, pp. 1670-1674, May 18-21, 1998, 5 pgs.

Kyocera webpage, available at www.kyocera.co.jp/prdct/telecom/consumer/kyl22/spec/index.html, Jan. 17, 2014, 4 pgs.

Kyritsi et al., "Correlation Analysis Based on MIMO Channel Measurements in an Indoor Environment," IEEE Journal on Selected Areas in Communications, vol. 21, No. 5, pp. 713-720, Jun. 2003, 8 pgs.

Lawrey, Eric, "Multiuser OFDM," 5th International Symposium on Signal Processing and its Applications, pp. 761-764, Aug. 22, 1999, 4 pgs.

Lawrey, Eric, et al., "Adaptive Frequency Hopping for Multiuser OFDM," Second International Conference on Information Communication & Signal Processing, Dec. 7, 1999, 5 pgs.

Lazaro, O., et al., "Dynamic Channel Allocation Based on a Hopfield Neural Network and Requirements for Autonomous Operation in a Distributed Environment," IEEE, Sep. 1999, 5 pgs.

Lei et al, "A Multicarrier Allocation (MCA) Scheme for Variable-Rate 3G Wireless System," IEEE Communications Magazine, 0163-6804/00, pp. 86-91, Oct. 2000, 6 pgs.

LG Webpage, available at www.lg.com/jp/mobile-phone/le-G2-L-01F, Feb. 3, 2014, 12 pgs.

Li et al., "A New Blind Receiver for Downlink DS-CDMA Communications," IEEE Communications Letters, vol. 3, No. 7, pp. 193-195, Jul. 1999, 3 pgs.

Li et al., "Adaptive Antenna Arrays for OFDM Systems with Cochannel Interference," IEEE Transactions on Communications, vol. 47, pp. 217-229, Feb. 1999, 13 pgs.

Li et al., "Channel Estimation for OFDM Systems with Transmitter Diversity in Mobile Wireless Channels," IEEE Journal on Selected Areas in Communications, vol. 17, No. 3, 0733-8716/99, pp. 461-471, Mar. 1999, 11 pgs.

Li et al., "Clustered OFDM with Channel Estimation for High Rate Wireless Data," 1999 IEEE International Workshop on Mobile Multimedia Communications (MoMuC'99), Nov. 15-17, 1999, 9 pgs.

Li et al., "Effects of Clipping and Filtering on the Performance of OFDM," IEEE 0-7803-3659-3/97, pp. 1634-1638, May 1997, 5 pgs.

Li et al., "Effects of Clipping and Filtering on the Performance of OFDM," IEEE Communications letters, vol. 2, No. 5, pp. 131-133, May 1998, 3 pgs.

Li et al., "Maximum-Likelihood Estimation of OFDM Carrier Frequency Offset for Fading Channels," IEEE 1058-6393/98, pp. 57-61, 1998, 5 pgs.

Li et al., "M-Sequences for OFDM Peak-to-Average Power Ratio Reduction and Error Correction," Electronics Letters, vol. 33, No. 7, Mar. 27, 1997, 2 pgs.

Li, "Pilot-Symbol-Aided Channel Estimation for OFDM in Wireless System," 1999 IEEE 49th Vehicular Technology Conference, vol. 2, pp. 1131-1135, May 1999, 5 pgs.

Li et al., "Robust Channel Estimation for OFDM Systems with Rapid Dispersive Fading Channels," IEEE Transactions on Communications, vol. 46, pp. 902-915, Jul. 1998, 14 pgs.

Li et al., "Robust transforms for channel estimator in clustered OFDM for high rate wireless data," IEEE 0-7803-6283-7/00, pp. 277-281, Jun. 2000, 5 pgs.

Li et al., "Transmitter diversity for OFDM Systems and its Impact on High-rate Data Wireless Networks," IEEE Journal on Selected Areas in Communications, vol. 17, pp. 1233-1243, Jul. 1999, 11 pgs.

Li, "Simplified Channel Estimation for OFDM Systems with Multiple Transmit Antennas," IEEE Trans. on Wireless Communications, vol. 1, pp. 67-75, Jan. 2002, 9 pgs.

Lin et al., "Experimental Studies of SDMA Schemes for Wireless Communications," Proc. IEEE Int. Conf. Acoust., Speech, Signal Processing, vol. 3, pp. 1760-1763, May 1995, 4 pgs.

Lin et al., "Error Control Coding, Fundamentals and Applications", Prentice Hall, Feb. 27, 1983, 21 pgs.

Liu, Hui et al., "An Efficient Multiuser Loading Algorithm for OFDM-Based Broadband Wireless Systems," Global Telecommunications Conference, 2000 IEEE 0-7803-6451-1/00, pp. 103-107, Nov. 27, 2000, 5 pgs.

Liu et al., "Efficient Network Utilization for Multimedia Wireless Networks," C.G Omidyar (Ed.), MWCN 2000, pp. 108-122, May 2000, 15 pgs.

Love et al., "Performance of 3GPP High Speed Downlink Packet Access (HSDPA)," IEEE 60th Vehicular Technology Conference, pp. 3359-3363, Sep. 26-29, 2004, 5 pgs.

Lozano et al., "Integrated Dynamic Channel Assignment and Power Control in TDMA Mobile Wireless Communications Systems," IEEE JSAC special series on wireless, vol. 17, pp. 2031-2040, Nov. 1999, 10 pgs.

"LTE Overview," 3GPP Webpage, accessed on Jul. 1, 2012, 4 pgs.

LTE Protocols and Procedures, Student Book LZT 123 8958 R1A, Ericsson, 2009, 4 pgs.

"LTE," ZTE Webpage, available at wwwen.zte.com/cn/en/products/wireless/lte, Nov. 6, 2012, 1 pg.

"LTE-Advanced," 3GPP Webpage, available at www.3gpp.org/lte-advanced, Feb. 8, 2013, 5 pgs.

Luise et al., "Carrier Frequency Acquisition and Tracking for OFDM Systems," IEEE Transactions on Communications, vol. 44, No. 11, pp. 1590-1598, Nov. 1996, 9 pgs.

Maeda, Noriyuki et al., "A Delay Profile Information Based Subcarrier Power Control Combined With a Partial Non-Power Allocation Technique for OFDM/FDD Systems," IEEE, 0-7803-6465-5/00, pp. 1380-1384, Sep. 2000, 5 pgs.

(56) References Cited

OTHER PUBLICATIONS

Maehata et al., "DSRC Using OFDM for Roadside-Vehicle Communication System," IEEE 0-7803-5718-3/00, pp. 148-152, May 2000, 5 pgs.
Matsui et al., "OFDMA/TDD Packet Transmission System with an Adaptive Subcarrier Selection Scheme for Asymmetric Wireless Communication Services," IEEE 0-7803-6622-0/01, pp. 54-55, Jun. 2001, 2 pgs.
Mehta et al., "Performance Analysis of Link Adaptation in Wireless Data Networks," Department of Electrical Engineering, Stanford University, Draft, Mar. 6, 2000, 15 pgs.
Mehta et al., "Performance Analysis of Link Adaptation in Wireless Data Networks," 2000 Global Telecomm. Conf. 1422, 0-7803-6451-1/00, pp. 1422-1426, Nov. 27, 2000, 5 pgs.
Merriam-Webster's Collegiate Dictionary, Tenth Edition, pp. 59, 631, and 1058-1059, Jan. 1999, 6 pgs.
Mexican Office Action issued for PA/a/2003/005311 dated Mar. 31, 2006, 2 pgs.
Midorikawa, "Information Science Dictionary," Iwanami Shoten Publisher, pp. 472-473, May 25, 1990, 3 pgs.
Mignone et al., "CD3-OFDM: A Novel Demodulation Scheme for Fixed and Mobile Receivers," IEEE Transactions on Communications, vol. 44, No. 9, pp. 1144-1151, Sep. 1996, 8 pgs.
Ministry of Internal Affairs and Communications Webpage, The Radio Use Web Site, available at http://www.tele.soumu.go.jp/j/adm/system/trunk/wimax/fwa, Feb. 14, 2014, 1 pg.
Montalbano et al., "Spatio-temporal array processing for aperiodic CDMA downlink transmission," Conference Record of the Thirty-Third Asilomar Conference on Signals, Systems, and Computers, vol. 2, pp. 912-916, Oct. 1999, 5 pgs.
Motegi, M. et al., "Optimum Band Allocation According to Subband Condition for BST-OFDM," 11th IEEE International Symposium on Personal Indoor and Mobile Radio Communications, vol. 2, XP002213669, Piscataway, NJ, USA, ISBN: 0-7803-6465-5, pp. 1236-1240, Sep. 18-21, 2000, 5 pgs.
Munster, M., et al., "Co-Channel Interference Suppression Assisted Adaptive OFDM in Interference Limited Environments," IEEE VTC'99, 0-7803-5435-4/99, pp. 284-288, Sep. 17, 1999, 5 pgs.
Naguib, F., et al., "A Space-Time Coding Modem for High-Data-Rate Wireless Communications," IEEE Journal on Selected Area in Communications, vol. 16, No. 8, pp. 1459-1478, Oct. 1998, 20 pgs.
Naguib et al., "Capacity Improvement with Base-Station Antenna Arrays in Cellular CDMA," IEEE Transactions on Vehicular Technology, vol. 43, No. 3, pp. 691-698, Aug. 1994, 8 pgs.
Naguib et al., "Performance of CDMA Cellular Networks with Base-Station Antenna Arrays: The Downlink," Proc. IEEE Int'l Conf. on Communications 94, pp. 795-799, May 1884, 5 pgs.
Newton's Telecom Dictionary, CMP Books, pp. 57 and 346, Mar. 2004, 4 pgs.
Nogueroles et al., "Performance of a Random OFDMA System for Mobile Communications," IEEE 0-7803-3893-6/98, pp. 37-43, Feb. 1998, 7 pgs.
Nogueroles, R. et al., "Improved Performance of a Random OFDMA Mobile Communication System," ISBN: 0-7803-4320-4, pp. 2502-2506, May 18-21, 1998, 5 pgs.
Nakajima et al., "Keitai Denwa Wa Naze Tsunagarunoka," 2nd Edition, Nikkei, Feb. 27, 2012, 3 pgs.
NTT Docomo Webpage, available at www.nttdocomo.co.jp/corporate/technology/rd/tech/lte/lte01/03/02.html, Jan. 22, 2014, 3 pgs.
NTT Technical Journal, "Super 3G (LTE)," pp. 15-21, Nov. 2008, 7 pgs.
Hattori, "OFDM/OFDMA Textbook," Impress R&D, pp. 6-7, Sep. 21, 2008, 4 pgs.
Hattori, "OFDM/OFDMA Textbook," Impress R&D, pp. 2-7, 56-61, and 280-281, Sep. 21, 2008, 8 pgs.
Hattori, "OFDM/OFDMA Textbook," Impress R&D, pp. 56-57, 60-65, and 78-79, Sep. 21, 2008, 6 pgs.
Hattori, "OFDM/OFDMA Textbook," Impress R&D, pp. 78-85, Sep. 21, 2008, 10 pgs.
Hattori, "OFDM/OFDMA Textbook," Impress R&D, pp. 2-7 and 73-85, Sep. 21, 2008, 22 pgs.
Hattori, "OFDM/OFDMA Textbook," Impress R&D, pp. 78-85, 284-287, and 304-307, Sep. 2008, 9 pgs.
"OFDMA(SOFDMA)," WiMAX Ga Wakaru, pp. 46-47, Sep. 10, 2008, 4 pgs.
"OFDMA," NTT Docomo Webpage, available htp://www.nttdocomo.co.jp/corporate/technology/rd/tech/lte/lte01/03/01.html, Aug. 18, 2013, 2 pgs.
"OFDMA," NTT Docomo Webpage, May 10, 2013, 2 pgs.
Office Action issued for Chinese Patent Application No. 200580041761.0 dated Nov. 27, 2009, 3 pgs.
Office Action issued for Chinese Patent Application No. 200610081062.5 dated Apr. 3, 2009, English Translation, 7 pgs.
Office Action issued for Israeli Patent Application No. 168458, issued on Jun. 23, 2009, and the English language translation, 4 pgs.
Office Action issued for Japanese Patent Application No. 2007-544620 dated May 19, 2011, 6 pgs (with English translation).
Office Action issued for Japanese Patent Application No. 2008-182746 dated Apr. 21, 2011, 6 pgs (with English translation).
Office Action issued for Japanese Patent Application No. 2008-193243 dated Apr. 21, 2011, 4 pgs (with English translation).
Office Action issued for Korean Patent Application No. 2003-7007961 dated Sep. 27, 2006, 7 pgs.
Office Action issued for ROC (Taiwan) No. 094143279, dated Aug. 15, 2011, 19 pgs (with English translation).
Ohgane, Takeo et al., "A Study on a Channel Allocation Scheme with an Adaptive Array in SDMA," IEEE, 0-7803-3659-3/97, pp. 725-729, May 1997, 5 pgs.
Olfat et al., "Adaptive Beamforming and Power Allocation for OFDM Over Wireless Networks," IEEE 0-7803-5148-7/98, pp. 759-763, Nov. 1998, 5 pgs.
Olfat, Masoud, et al., "Low Complexity Adaptive Beamforming and Power Allocation for OFDM Over Wireless Networks," 1999 IEEE International Conference on Communications, 0-7803-5284-X/99, pp. 523-527, Jun. 6, 1999, 5 pgs.
"Optimus it L-05E," LG Webpage, 24 pgs.
Oxford English Dictionary, Second Edition, vol. I, p. 602, Apr. 1989, 4 pgs.
Oxford English Dictionary, Second Edition, vol. XIV, p. 901, Apr. 1989, 3 pgs.
Papavassiliou et al., "Improving the Capacity in Wireless Networks Through Integrated Channel Base Station and Power Assignment," IEEE Transactions on Vehicular Technology, vol. 47, No. 2, pp. 417-427, May 1998, 11 pgs.
Papavassiliou et al., "Joint Optimal Channel Base Station and Power Assignment for Wireless Access," Polytechnic University, Jun. 17, 1996, 35 pgs.
Partial European Search Report issued for EP10175770.6 dated May 12, 2011, 7 pgs.
Paulraj et al., "A Taxonomy of Space-Time Processing for Wireless Networks", IEEE vol. 145, No. 1, Feb. 1998, 2 pgs.
Paulraj et al., "Space-Time Processing for Wireless Communication," IEEE Signal Processing magazine, pp. 49-53, Nov. 1997, 35 pgs.
Peixoto, "LTE: An Overview, High level considerations on practical implementation," Ericsson Internal, May 22, 2012, 3 pgs.
Pietrzyk et al., "Multiuser Subcarrier Allocation for QoS Provision in the OFDMA Systems," IEEE 0-7803-7467-3/02, pp. 1077-1081, Sep. 2002, 5 pgs.
Piolini, Flavio et al., "Smart Channel-Assignment Algorithm for SDMA Systems," IEEE Transactions on Microwave Theory and Techniques, vol. 47, No. 6, pp. 693-699, Jun. 1999, 7 pgs.
PCT Written Opinion for International Application No. PCT/US01/31766, mailed on Sep. 18, 2003, 4 pgs.
Prakash et al., "Distributed Dynamic Channel Allocation for Mobile Computing," PODC '95 Proceedings of the 14th annual ACM symposium on Principles of distributed computing, pp. 47-56, Dec. 31, 1995, 10 pgs.
Press Conference VoLTE, Ericsson Technical Paper, p. 8, Jul. 26, 2012, 1 pg.
Priscoli, "Basic Issues on Dynamic Allocation of PRMA Carriers," IEEE, 0-7803-2486-2/95, pp. 423-432, Jun. 1995, 5 pgs.

(56) References Cited

OTHER PUBLICATIONS

Qiu et al., "A Network-Assisted Dynamic Packet Assignment Algorithm for Wireless Data Networks," IEEE, VTC 2000, 0-7803-5718-3/00, pp. 735-739, May 2000, 5 pgs.
Qiu et al., "Third-Generation and Beyond (3.5G) Wireless Networks and its Applications," 2002 International Symposium on Circuits and Systems, 2002 IEEE 0-7803-7448-7/02, pp. I-41-I-44, May 2002, 4 pgs.
Raleigh et al., "Spato-Temporal Coding for Wireless Communicaton," IEEE Trans. on Communcations, vol. 46, No. 3, pp. 357-366, Mar. 1998, 10 pgs.
Random House Webster's College Dictionary, Second Edition, Random House New York, p. 15, Apr. 1999, 3 pgs.
Rashid-Farrokhi et al., "Transmit Beamforming and Power Control for Cellular Wireless Systems," IEEE Journal on Selected Areas in Communications, vol. 16, No. 8, pp. 1437-1450, Oct. 1998, 14 pgs.
Rhee et al., "Increase in Capacity of Multiuser OFDM System Using Dynamic Subchannel Allocation," IEEE VTC2000, 0-7803-5718-3/00, pp. 1085-1089, May 2000, 5 pgs.
Ritter, Gerhard, "Procedure and Radio Communicaton System to Allocate the Radio Resouces of a Radio Interface," Translated by: Schreiber Translations Inc., Jun. 2007, 38 pgs.
Robertson et al., "The Effects of Doppler Spreads in OFDM(A) Mobile Radio Systems," IEEE 0-7803-5435-4, Institute for Communications Technology, German Aerospace Center (DLR), Sep. 1999, 5 pgs.
Rohling et al., "Adaptive Coding and Modulation in an OFDM-TDMA Communication System," IEEE VTC '98, 0-7803-4320-4/98, pp. 773-776, May 1998, 4 pgs.
Rohling et al., "Performance Comparison of Different Multiple Access Schemes for the Downlink of an OFDM Communication System," IEEE 0-7803-3659-3/97, pp. 1365-1369, May 1997, 5 pgs.
Roy et al., "ESPRIT—Estimation of Signal Parameters Via Rotational Invariance Techniques," IEEE Transactions on Acoustics, Speech, and Signal Processing, vol. 37, No. 7, pp. 984-995, Jul. 1989, 12 pgs.
Royer, "ACA-579 Japan Live Testing Report," Revision 1.0, Global Intellectual Strategies, Oct. 30, 2013, 24 pgs.
Sari et al., "Orthogonal Frequency-Division Multiple Access and its Application to CATV Networks," European Transactions on Telecommunications, vol. 9, No. 6, pp. 507-516, Nov./Dec. 1998, 10 pgs.
Sari et al., "An Analysis of Orthogonal Frequency-Division Multiple Access," IEEE 0-7803-4198-8/97, pp. 1635-1639, Nov. 1997, 5 pgs.
Sari et al., "Search Result for an Analysis of Orthogonal Frequency-Division Multiple Access," IEEE Xplore Webpage, accessed on Apr. 7, 2014, 1 pg.
Sari, Hikmet, "Trends and Challenges in Broadband Wireless Access," IEEE 0-7803-6684-0/00, pp. 210-214, Oct. 2000, 5 pgs.
Sartenaer et al., "Resource Allocation for Frequency-Selective Multiple Access Channels with Adaptive QAM Modulation," IEEE 0-7803-6684-0, Oct. 2000, 8 pgs.
Sathananthan et al., "Analysis of OFDM in the Presence of Frequency Offset and a Method to Reduce Performance Degradation," IEEE 0-7803-6451-1/00, pp. 72-76, Nov. 2000, 5 pgs.
Sato et al., "Evaluation for the Capacity of Band Division Multiplexing MC-CDMA System under Fading Environments," Technical Report of IEICE A-P2000-97.SANE2000-74 RCS2000-120 (Oct. 2000), NII-Electronic Library Service, published Oct. 2000 [Translated], 7 pgs.
Sandell, Magnus, et al., "A Comparative Study of Pilot Based Channel Estimators for Wireless OFDM," published in Research Report TULEA 1996:19, Division of Signal Processing, Lulea University of Technology, Sep. 1996, 34 pgs.
Schmidt, Ralph O., "Multiple Emitter Location and Signal Parameter Estimation," IEEE Transactions on Antennas and Propagation, vol. AP-34, No. 3, pp. 276-280, Mar. 1986, 5 pgs.
Schmidt, Heiko, et al., "Reducing the Peak to Average Power Ratio of Multicarrier Signals by Adaptive Subcarrier Selection," IEEE 0-7803-5106-1/98, pp. 933-937, Oct. 1998, 5 pgs.

Segal et al, "Initial OFDM/OFDMA PHY proposal for the 802.16.3 BWA," IEEE 802.16.3c-00/33, Oct. 2000, 19 pgs.
Seong-Jun Oh et al., "Adaptive Resource Allocation in Power Constrained CDMA Mobile Networks," IEEE 0-7803-5668-3/99, pp. 510-514, Sep. 1999, 5 pgs.
Shad et al., "Indoor SDMA Capacity Using a Smart Antenna Basestation," IEEE 0-7803-3777-8/97, pp. 868-872, Oct. 1997, 5 pgs.
Shao et al., "Antenna Selection for MIMO-OFDM Spatial Multiplexing System," ISIT 2003, Yokohama, Japan, IEEE 0-7803-7728-1/03, p. 90, Jun. 29-Jul. 4, 2003, 1 pg.
Sheikh et al., "Smart Antennas for Broadband Wireless Access Networks," IEEE Communication Magazine, vol. 37, No. 11, pp. 1-17. Nov. 1999, 17 pgs.
Shen et al., "Design Tradeoffs in OFDMA Uplink Traffic Channels," IEEE Int'l Con. On Acoustics, Speech, and Signal Processing, vol. 4, May 2004, 5 pgs.
"Shin Joho Tsushin Hayawakari Koza," Nikkei Business Publications, pp. 132-133, Jan. 1, 1999, 7 pgs (with English translation).
Shinmura, "Kojien," 5th Edition, Iwanami Publishing Co., Ltd., p. 1525, Nov. 11, 1998, 2 pgs.
Shinmura, "Kojien," 5th Edition, Iwanami Publishing Co., Ltd., pp. 1945 and 2355, Nov. 11, 1998, 4 pgs.
Shinmura, "Kojien," 6th Edition, Iwanami Publishing Co., Ltd., pp. 222 and 824, Jan. 11, 2008, 3 pgs.
Shinmura, "Kojien," 6th Edition, Iwanami Publishing Co., Ltd., p. 1567, Jan. 11, 2008, 2 pgs.
Shogakukan, "New Shogakukan Random House English-Japanese Dictionary," pp. 1000-1001 and 1737, Jan. 10, 1999, 5 pgs.
"SingleRAN LTE," Huawei webpage, 2 pgs.
SMG#24, Tdoc SMG2 402/97, Philips Consumer Communications, ETSI, published Dec. 1997, "TD 402/97," 9 pgs.
Sollenberger et al., "Receiver Structures for Multiple Access OFDM," IEEE 0-7803-5565-2/99, pp. 468-472, May 1999, 5 pgs.
Spencer et al., "Channel Allocation in Multi-User MIMO Wireless Communications Systems," IEEE Conf. on Communications, vol. 5, pp. 3035-3039, Jun. 2004, 5 pgs.
Suard et al., "Uplink Channel Capacity of Space-Division-Multiple-Access Schemes," IEEE Trans. on Information Theory, vol. 44, No. 4, pp. 1468-1476, Jul. 1998, 9 pgs.
Sung et al., "User Speed Estimation and Dynamic Channel Allocation in a Hierarchical Cellular System," IEEE 0-7803-1927-3/94, pp. 91-95, Jun. 1994, 5 pgs.
Supplemental European Search Report issued for EP 02808132 dated May 2, 2007, 3 pgs.
Sureau et al., "Sidelobe Control in Cylindrical Arrays," IEEE Trans. Ant. Prop., vol. AP-30, No. 5, pp. 1027-1031, Sep. 1982, 5 pgs.
Takamura et al., "Field Trial Results of a Band Hopping OFDM System," Sony Corporation, Shingawa-ku, Tokyo, Japan, IEEE Vehicular Technology Conference, Sep. 1999, 6 pgs.
Takimoto, "Radiowave and Communication from the Basis," pp. 76-79, Jan. 20, 2013, 3 pgs.
Tang et al., "An Adaptive Modulation Scheme for Simultaneous Voice and Data Transmission Over Fading Channels," IEEE Vehicular Technology Conference (VTC '98), Draft dated Dec. 1, 1997, 32 pgs.
Tangemann et al., "Comparison of Upgrade Techniques for Mobile Communication Systems," IEEE International Conference on Communications, 1994, pp. 201-205, May 1-5, 1994. 5 pgs.
Tangemann, "Influence of the User Mobility on the Spatial Multiplex Gain of an Adaptive SDMA System," 5th IEEE International Symposium on Personal, Indoor and Mobile Radio Communications, 1994, pp. 745-749, Sep. 18-23, 1994, 5 pgs.
Tangemann, "Near-Far Effects in Adaptive SDMA Systems," Sixth IEEE International Symposium on Personal, Indoor, and Mobile Radio Communications, 1995, Sep. 27-29, 1995, 5 pgs.
Telecommunications Industry Association (TIA), "Mobile Station—Base Station Compatibility Standard for Dual-Mode Wideband Spread Spectrum Cellular System," TIA/EIA/IS-95-A, May 1995, 118 pgs.
Telephony's Dictionary, Second Edition, Graham Langley, pp. 2-3, Apr. 1986, 4 pgs.

(56) References Cited

OTHER PUBLICATIONS

Toba et al., "A Demand-Assign Optical Frequency-Division-Multiple-Access Star Network," Journal of Lightwave Technology, vol, 11, No. 5/6, pp. 1088-1094, May/Jun. 1993, 7 pgs.
Tonello, A., et al., "Analysis of the Uplink of an Asynchronous Multi-User DMT OFDMA System Impaired by Time Offsets, Frequency Offsets, and Multi-Path Fading," 52nd Vehicular Technology Conference (IEEE VTS Fall VTC 2000), vol. 3, pp. 1094-1099, Sep. 2000, 6 pgs.
Toufik & Knopp, "Multiuser Channel Allocation Algorithms Achieving Hard Fairness," Dept. of Mobile Communications Eurecom Institute, QoS Seminaire, Nov. 26, 2004, 5 pgs.
Tralli et al., "Adaptive C-OFDM System at 30 GHz for the Last Mile Wireless Broadband Access to Interactive Services," IEEE 0-7803-4788-9/98, pp. 1314-1319, Jun. 1998, 8 pgs.
Tse and Hanly, "Multiaccess Fading Channels'—Part I: Polymatriod Structure, Optimal Resource Allocation and Throughput Capacities," IEEE Trans. Info. Theory, vol. 44, No. 7, pp. 2796-2815, Nov. 1998, 20 pgs.
Tsoulos et al., "Application of Adaptive Antenna Technology to Third Generation Mixed Cell Radio Architectures," Proc. IEEE 44th Vehicular Technology Conference, pp. 615-619, Jun. 1994, 5 pgs.
Tsoulos, G.V., "Smart Antennas for Mobile Communication Systems: Benefits and Challenges," Electronics & Communication Engineering Journal, pp. 84-94, Apr. 1999, 12 pgs.
Tufvesson et al., "Pilot Assisted Channel Estimation for OFDM in Mobile Cellular Systems," Department of Applied Electronics, Lund University, VTC'97, May 1997, 5 pgs.
Tureli et al., "Software Radio Implementation of Carrier Offset Estimation for OFDM Communications," Conf. Record of the 32nd Asilomar Conference on Signals, Systems Computers, vol. 1, pp. 60-64, Nov. 1, 1998, 5 pgs.
"Urbano," Kyocera Webpage, available at www.kyocera.co.jp/prdct/telecom/consumer/101/spec/index.html#specifications, Aug. 5, 2013, 12 pgs.
"ULTRA WiFi 4G SoftBank 102Z," ZTE Webpage, 4 pgs.
Universal Mobile Telecommunications System (UMTS); UMTS Terrestrial Radio Access (UTRA); Concept Evaluation (UMTS 30.06 version 3.0.0), ETSI, ETSI OFDMA Concept Evaluation, TR 101 146 V3.0.0, Dec. 1997, 689 pgs.
Valenzuela et al., "Estimating Local Mean Signal Strength of Indoor Multipath Propagation," IEEE Transactions on Vehicular Technology, vol. 46, No. 1, pp. 203-212, Feb. 1997, 11 pgs.
Van de Beek et al., "A Conceptual Study of OFDM-based Multiple Access Schemes: Part 2—Channel Estimation in the Uplink," Tdoc 116/96, ETSI STC SMG2, meeting No. 18, Helsinki, Finland, Sep. 1996, 7 pgs.
Van de Beek et al., "A Conceptual Study of OFDM-based Multiple Access Schemes: Part 3—Performance Evaluation of a Coded System," Tdoc 166/96, ETSI STC SMG2 meeting No. 19, Dusseldor, Germany, Sep. 1996, 7 pgs.
Van de Beek et al., "A Conceptual Study of OFDM-based Multiple Access Schemes: Part 4, Tracking of Time Frequency Offsets," Tdoc 250/96, ETSI STC SMG2, meeting No. 20, Nice, France, Dec. 1996, 12 pgs.
Van de Beek et al., "A Time and Frequency Synchronization Scheme for Multiuser OFDM," Research Report Jun. 1998, Division of Signal Processing, Lulea University of Technology, Aug. 1998, 28 pgs.
Van de Beek et al., "A Time and Frequency Syncronization Scheme for Multiuser OFDM," IEEE Journal on Selected Areas in Communication, vol. 17, No. 11, pp. 1900-1914, Nov. 1999, 15 pgs.
Van de Beek et al., "On Channel Estimation in OFDM Systems", Proceedings of Vehicular Technology Conference (VTC 95) vol. 2, pp. 815-819, Sep. 1995, 6 pgs.
Van de Beek et al., "Synchronization and Channel Estimation in OFDM Systems," Lulea University of Technology, Division of Signal Processing, Lulea, Sweden, Sep. 1998, 158 pgs.
Van de Beek et al., "Synchronization of a TDMA-OFDM Frequency Hopping System," In Proc. IEEE Vehic. Technol. Conf., vol. 2, pp. 1290-1294, Ottawa, Canada, May 1998, 6 pgs.

Van Nee et al., "OFDM for Wireless Multimedia Communications," Artech House, published Dec. 22, 1999, 272 pgs.
Van Nee et al., "OFDM for Wireless Multimedia Communications," Artech House Universal Personal Communications, Dec. 31, 1999, 14 pgs.
Vandenameele et al., "A Combined OFDM/SDMA Approach for WLAN," IEEE 49th Vehicular Tech. Conf., vol. 2, IEEE 0-7803-5565-2/99, pp. 1712-1716, May 1999, 5 pgs.
Vanderaar, Mark et al., "Provisional Application," Jul. 24, 2000, 11 pgs.
Viswanathan et al., "Adaptive Coded Modulation Over Slow Frequency-Selective Fading Channels," 0-7803-5565-2/99, pp. 2388-2392, May 1999, 5 pgs.
Wahlqvist et al., "A Conceptual Study of OFDM-Based Multiple Access Schemes, Part 1: Air Interface Requirements," Telia Research AB, May 6, 1996, 6 pgs.
Wahlqvist et al., "Capacity Comparison of an OFDM Based Multiple Access System Using Different Dynamic Resource Allocation," IEEE 0-7803-3659-3/97, pp. 1664-1668, May 1997, 5 pgs.
Wahlqvist et al., "Description of Telias OFDM Based Proposal (Working document in the OFDM concept group)," Telia, ETSI STC SMG2#22, Tdoc 180/97, May 12-16, 1997, 22 pgs.
Wahlqvist, "Design and Evaluation of an OFDM-based Proposal for Third Generation Mobile Communication," Lulea 1998:25, Lulea University of Technology, published Jul. 1998, 118 pgs.
Wahlqvist et al., "Time Synchronization in the uplink of an OFDM system," In Proc. IEEE Vehic. Technol. Conf., vol. 3, Atlanta, pp. 1569-1573, May 1996, 5 pgs.
Wahlqvist et al., "WW3/BAI Registered Documents," dated Sep. 26, 1995, 932 pgs.
Waldeck, Torsten, et al., "Telecommunication Applications Over the Low Voltage Power Distribution Grid," Spread Spectrum Techniques and Applications, 1998, Proceedings 1998 IEEE 5th International Symposium on Sun City, South Africa, vol. 1, pp. 73-77, Sep. 2-4, 1998, 5 pgs.
Wang et al., "Dynamic Channel Resource Allocation in Frequency Hopped Wireless Communication Systems," IEEE 0-7803-2015-8/94, p. 229, Jul. 1994, 1 pg.
Wang et al., "Wireless Multicarrier Communications," IEEE Signal Processing Magazine, vol. 17, No. 3, pp. 29-48, May 2000, 20 pgs.
Ward, James and Compton, R. Ted, Jr., "High Throughput Slotted ALOHA Packet Radio Networks with Adaptive Arrays," IEEE Transactions on Communications, vol. 41, No. 3, pp. 460-470, Mar. 1993, 11 pgs.
Webster's Encyclopedia Unabridged Dictonary of the English Language, Gramercy Books, p. 1734, Apr. 1996, 3 pgs.
Webster's New Ninth Collegiate Dictionary, p. 1303, 1991, 3 pgs.
Webster's New World College Dictionary, Third Edition, p. 70, Jun. 1997, 2 pgs.
Wei, Lei, "Synchronization Requirements for Multi-user OFDM on Satellite Mobile and Two-path Rayleigh Fading Channels," IEEE Transactions on Communications, vol. 43, No. 2/3/4, pp. 887-895, Feb. 1995, 9 pgs.
Weinstein et al., "Data Transmission by Frequency-Division Multiplexing using the Discrete Fourier Transform," IEEE Trans. on Comm. Tech., vol. com-19, No. 5, pp. 628-634, Oct. 1971, 7 pgs.
Willars et al., "Distribution of WWW Oct. 1995 Deliverable," dated Sep. 29, 1995, 296 pgs.
Winters et al., "The Impact of Antenna Diversity on the Capacity of Wireless Communication Systems," IEEE Trans. On Communications, vol. 42, No. 2/3/4, pp. 1740-1751. Feb./Mar./Apr. 1994, 12 pgs.
Winters, "Signal Acquisition and Tracking with Adaptive Arrays in the Digital Mobile Radio System IS-54 with Flat Fading," IEEE Transactions on Vehicular Technology, vol. 43, No. 4, pp. 377-384, Nov. 1993, 8 pgs.
"Wireless City Planning," ZTE Webpage, available at www.zte.co.jp/press_center/news/ztejapan/201109/t20110928_9277.html, Feb. 21, 2013, 1 pg.
Wolniansky P.W. et al., "V-BLAST: An Architecture for Realizing Very High Data Rates Over the Rich-Scattering Wireless Channel," 1998 URSI Int'l Symposium on Signals, Systems, and Electronics, pp. 295-300, Sep. 1998, 6 pgs.

(56) References Cited

OTHER PUBLICATIONS

Wong et al., "A Real-Time Sub-Carrier Allocation Scheme for Multiple Access Downlink OFDM Transmission," IEEE 0-7803-5435-4/99, pp. 1124-1128, Sep. 1999, 5 pgs.
Wong, K-K, et al., "Adaptive Antennas at the Mobile and Base Stations in an OFDM/TDMA Systems," IEEE, 0-7803-4984-9/98, pp. 183-188, Nov. 1998, 6 pgs.
Wong et al., "Adaptive Antennas at the Mobile and Base Stations in an OFDM/TDMA Systems," Department of Electrical & Electronic Engineering, The Hong Kong University of Science & Technology, Clear Water Bay, Kowloon, Hong Kong, Pre-Published Version, 6 pgs.
Wong, Kai-Kit, et al., "Adaptive Antennas at the Mobile and Base Stations in an OFDM/TDMA Systems," IEEE Transactions on Communications, vol. 49, No. 1, pp. 195-206, Jan. 2001, 12 pgs.
Wong et al., "Investigating the Performance of Smart Antenna Systems at the Mobile and Base Stations in the Down and Uplinks," Proceedings of 1998 IEEE Vehicular Technology Conference, vol. 2, pp. 880-884, May 1998, 5 pgs.
Wong et al., "Multiuser Subcarrier Allocation for OFDM Transmission Using Adaptive Modulation," IEEE 0-7803-5565-2/99, pp. 479-483, May 1999, 5 pgs.
Wong, C. Y., et al., "Multiuser OFDM With Adaptive Subcarrier, Bit, and Power Allocation," IEEE Journal on Selected Areas in Communications, IEEE Inc., New York, USA, vol. 17, No. 10, XP000855475, ISSN: 0733-8716/99, pp. 1747-1758, Oct. 1999, 12 pgs.
Wong, C. Y., et al. "Search Result for Muitiuser OFDM With Adaptive Subcarrier, Bit, and Power Allocation," IEEE Xplore Webpage, accessed on Apr. 7, 2014, 1 pg.
Xu et al., "Experimental Studies of Space-Division-Multiple-Access Schemes for Spectral Efficient Wireless Communications," IEEE 0-7803-1825-0/94, pp. 800-804, May 1994, 5 pgs.
Xu et al., "Throughput Multiplication of Wireless LANs for Multimedia Services: SDMA Protocol Design," IEEE 0-7803-1820-X/94, pp. 1326-1332, Nov. 1994, 7 pgs.
Yan et al., "Rate Adaptive Space-time Modulation Techniques for Combating Cochannel Interference," 2001 IEEE Int'l Conf. on Acoustics, Speech, and Signal processing, pp. 2469-2472, May 2001, 4 pgs.
Yang et al., "A Message-Passing Approach to Distributed Resource Allocation in Uplink DFT-Spread-OFDMA Systems," IEEE Transactions on Communications, vol. 59, No. 4, pp. 1099-1113, Apr. 2011, 15 pgs.
Ye Li, et al., "Clustered OFDM with channel estimation for high rate wireless data," Mobile Multimedia Communications, 1999 (MOMUC '99), 1999 IEEE International Workshop on San Diego, CA, USA, IEEE, US, XP010370695, ISBN: 0-7803-5904-6, pp. 43-50, Nov. 15, 1999, 8 pgs.
Yeh, C., et al., "Channel Estimation Using Pilot Tones in OFDM Systems," IEEE Transactions on Broadcasting, vol. 45, No. 4, pp. 400-409, Dec. 1999, 10 pgs.
Yener et al., "Combined temporal and spatial filter structures for CDMA systems," IEEE Vehicular Technology Conference, vol. 5, 0-7809-6507-0/00, pp. 2386-2393, Sep. 2000, 8 pgs.
Yin, "Cross Layer Design and Optimization of Wireless Networks," University of Washington, 2001, 142 pgs.
Yin & Liu, "Dynamic Scheduling in Antenna Array Packet Radio," Conference Record of the 33rd Asilomar Conference on Signals, Systems, and Computers, vol. 1, IEEE, 0-7803-5700-0/99, pp. 154-158, Oct. 1999, 5 pgs.
Yin & Liu, "An SDMA Protocol for Wireless Multimedia Networks," 2000 IEEE International Conference on Acoustics, Speech, and Signal Processing, vol. 5, IEEE, 0-7803-6293-4/00, pp. 2613-2616, Jun. 2000, 4 pgs.
Yin & Liu, "Performance of Space-Division Multiple-Access (SDMA) With Scheduling," IEEE Transactions on Wireless Communications, vol. 1, No. 4, pp. 611-618, Oct. 2002, 8 pgs.
Yu et al., "Transmit Selection Diversity Technique in the MIMO-OFDM System for HSDPA," Vehcular Technology Conference 2004, VTC 2004, Spring 2004, IEEE 59th, vol. 1, pp. 362-366, May 2004, 5 pgs.
Yukiji, Yamauchi, "Towards the Spread Spectrum Communication Next Generation High Performance Communication," Tokyo Denki University Publication Bureau, pp. 123-125, Dec. 20, 1997, 7 pgs (with English translation).
Zhang, Yunjun et al., "Orthogonal Frequency Division Multiple Access Peak-to-Average Power Ratio Reduction using Optimized Pilot Symbols," IEEE International Conference on Communication Technology Proceedings, vol. 1, pp. 574-577, Aug. 21, 2000, 4 pgs.
Zwick et al., "A Statistical Model for Indoor Environments Including Angle of Arrival, 48th IEEE Vehicular Technology Conference," IEEE 0-7803-4320-4/98, pp. 615-619, May 1998, 5 pgs.
Zysman et al., "Technology Evolution for Mobile and Personal Communications," Bell Labs Technical Journal, pp. 107-129, Jan.-Mar. 2000, 23 pgs.
"PicoNode," Nortel, available at http://www.nortelnetworks.com/products/01/gsmlpn.html, 1999, 4pgs.
"Wireless LAN," Nokia, available at http://www.nokia.com/corporate/wlan/woffice.html, Dec. 2000, 2 pgs.
*Adaptix, Inc.* v. *Ericsson Inc.*, Memorandum Opinion and Order, Civil Action No. 6:14-cv-501, -502, -503, E.D. Tex., Jul. 22, 2015, 48 pgs.
*Sony Mobile Communications (USA) Inc.* v. *Adaptix, Inc.*, Decision—Institution of Inter Partes Review, IPR2014-01524, P.T.A.B., Apr. 7, 2015, 14 pgs.
*Sony Mobile Communications (USA) Inc.* v. *Adaptix, Inc.*, Patent Owner's Request for Adverse Judgment, IPR2014-01524, P.T.A.B., Jul. 20, 2015, 3 pgs.
*Sony Mobile Communications (USA) Inc.* v. *Adaptix, Inc.*, Judgment—Termination of the Proceeding, IPR2014-01524, P.T.A.B., Jul. 22, 2015, 4 pgs.
*Sony Mobile Communications (USA) Inc.* v. *Adaptix, Inc.*, Decision—Institution of Inter Partes Review, IPR2014-01525, P.T.A.B., Apr. 8, 2015, 14 pgs.
*Sony Mobile Communications (USA) Inc.* v. *Adaptix, Inc.*, Patent Owner's Response (with exhibits), IPR2014-01525, P.T.A.B., Jun. 23, 2015, 750 pgs.
*Sony Mobile Communications (USA) Inc.* v. *Adaptix, Inc.*, Declaration of Michael Caloyannides, Ph.D., IPR2014-01525, P.T.A.B., Jun. 23, 2015, 38 pgs.
*Sony Mobile Communications (USA) Inc.* v. *Adaptix, Inc.*, Oral Deposition of Robert Akl., D. Sc. taken on May 20, 2015, IPR2014-01524 of U.S. Pat. No. 6,947,748 and IPR2014-01525 of U.S. Pat. No. 7,454,212, received Jun. 4, 2015, 108 pgs.
*Sony Mobile Communications (USA) Inc.* v. *Adaptix, Inc.*, Petitioner's Reply to Patent Owner's Response (with exhibits), IPR2014-01525, P.T.A.B., Sep. 15, 2015, 54 pgs.
*Kyocera Corporation* v. *Adaptix, Inc.*, Decision—Institution of Inter Partes Review, IPR2015-00319, P.T.A.B., Jun. 10, 2015, 14 pgs.
v*Kyocera Corporation* v. *Adaptix, Inc.*, Patent Owner's Request for Adverse Judgment, IPR2015-003196, P.T.A.B., Jul. 23, 2015, 3 pgs.
*Kyocera Corporation* v. *Adaptix, Inc.*, Judgment—Termination of Proceeding, IPR2015-00319, P.T.A.B., Jul. 31, 2015, 4 pgs.
*Kyocera Corporation* v. *Adaptix, Inc.*, Decision—Denying Institution of Inter Partes Review, IPR2015-00318, P.T.A.B., Jun. 10, 2015, 21 pgs.
*Kyocera Corporation* v. *Adaptix, Inc.*, Petitioner's Motion for Partial Hearing, IPR2015-00318, P.T.A.B., Jun. 30, 2015, 10 pgs.
*Kyocera Corporation* v. *Adaptix, Inc.*,Patent Owner's Opposition to Petitioners' Request for Rehearing, IPR2015-00318, P.T.A.B., Jul. 29, 2015, 8 pgs.
*ZTE Corporation* v. *Adaptix, Inc.*, Patent Owner's Request for Adverse Judgment, IPR2015-01185, P.T.A.B., Jul. 24, 2015, 4 pgs.
*ZTE Corporation* v. *Adaptix, Inc.*, Judgment—Termination of the Proceeding, IPR2015-01185, P.T.A.B., Jul. 28, 2015, 4 pgs.
*ZTE Corporation* v. *Adaptix, Inc.*, Decision—Denial of Institution of Inter Partes Review and Denial of Motion for Joinder, IPR2015-01184, P.T.A.B., Jul. 24, 2015, 9 pgs.
Ercolini, Declaration of Michael James Ercolini at Hayes Messina Gilman & Hayes LLC, with Exhibits, Apr. 24, 2015, 36 pgs.

(56) References Cited

OTHER PUBLICATIONS

Gilhousen et al., "On the Capacity of a Cellular CDMA System," IEEE Transactions on Vehicular Technology, vol. 40, No. 2, pp. 303-312, May 1991, 10 pgs.
Ikubundo, German-Japanese Dictionary, "vorliegen," pp. 1658-1659, Feb. 1, 1993, 2 pgs.
Saito, "Digital Modulation Techniques for Wireless Communications," The Institute of Electronics, Information and Communications Engineers (IEICE), in Japanese, Feb. 10, 1996, 10 pgs.
Sagara, "Kimura-Sagara German-Japanese Dictionary," pp. 1638-1639, Hakuyusha Corporation, Feb. 1, 1984, 2 pgs.
*Adaptix, Inc.* v. *Alcatel-Lucent USA, Inc. et. al.*, Complaint, Civil Action No. 6:15-cv-00041, E.D. Tex., Jan. 13, 2015, 8 pgs.
*Adaptix, Inc.* v. *Ericsson, Inc. et al.*, Complaint, Civil Action No. 6:15-cv-00042, E.D. Tex., Jan. 13, 2015, 6 pgs.
*Adaptix, Inc.* v. *Ericsson, Inc. et al.*, Summons in a Civil Action, Civil Action No, 6:15-cv-00042, E.D. Tex., Apr. 16, 2015, 8 pgs,.
6:15-cv-00043, -00044-, -00045, Defendants' Invalidity Contentions Pursuant to Patent Local Rules 3-3 and 3-4, with Exhibits, Redacted, E.D. Tex., Jan. 8, 2016, 1957 pgs.
*Adaptix, Inc.* v. *Alcatel-Lucent USA, Inc. et al.*, Complaint, Civil Action No. 6:15-cv-00604, E.D. Tex., Jun. 25, 2015, 6 pgs.
*Ericsson Inc. and Telefonaktiebolaget LM Ericsson* v. *Adaptix, Inc.*, Petition for Inter Partes Review of U.S. Pat. No. 8,934,445, with Exhibits, IPR2016-00619, P.T.A.B., Feb. 12, 2016, 1086 pgs.
*Ericsson Inc, and Telefonaktiebolaget LM Ericsson* v. *Adaptix, Inc.*, Declaration of Dr. Sylvia Hall-Ellis, IPR2016-00619, P.T.A.B., Feb. 11, 2016, 15 pgs.
*Ericsson Inc. and Telefonaktiebolaget LM Ericsson* v. *Adaptix, Inc.*, Declaration of Zygmunt J. Haas, Ph.D., IPR2016-00619, P.T.A.B., Feb. 12, 2016, 107 pgs.
European Patent Office (EPO), Notice of Opposition against the grant of European Patent Publication No. 2 367 314 B1, Dec. 2, 2015, 115 pgs.
Baginski et al., "Interbus: Grundlagen und Praxis," Second Edition, Heidelberg, p. 21, Feb. 1998, 3 pgs.
Hanzo et al., "Single- and Multi-carrier Quadrature Amplitude Modulation: Principles and Applications for Personal Communications, WLANs and Broadcasting," (excerpts), Jun. 7, 2000, 163 pgs.
Rappaport, "Wireless Communications; Principles & Practice," (excerpts) Oct. 5, 1995, 172 pgs.
Wu et al., "Orthogonal Frequency Division Multiplexing: A Multi-Carrier Modulation Scheme," IEEE Transactions on Consumer Electronics, vol. 41, No. 3, pp. 392-399, Aug. 1995, 8 pgs.
*Sprint Spectrum L.P. et al.* v. *Adaptix, Inc.*, Petition for Inter Partes Review of U.S. Pat. No. 8,934,375, with Exhibits, IPR2016-00823, P.T.A.B., Mar. 30, 2016, 1541 pgs.
*Sprint Spectrum L.P. et al.* v. *Adaptix, Inc.*, Declaration of Richard D. Gitlin, Sc.D., IPR2016-00823, P.T.A.B., Mar. 29, 2016, 116 pgs.
*Sprint Spectrum L.P. et al.* v. *Adaptix, Inc.*, Petition for Inter Partes Review of U.S. Pat. No. 8,934,375, IPR2016-00824, P.T.A.B., Mar. 30, 2016, 1839 pgs.
*Sprint Spectrum L.P. et al.* v. *Adaptix, Inc.*, Declaration of Richard D. Gitlin, Sc.D., IPR2016-00824, P.T.A.B., Mar. 29, 2016, 116 pgs.
Bahai and Saltzberg, "Multi-Carrier Digital Communications: Theory and Applications of OFDM," pp. 29-31, Jan. 1, 1999, 14 pgs.

a. Cell A

OFDMA WITH ADAPTIVE SUBCARRIER-CLUSTER CONFIGURATION AND SELECTIVE LOADING

CROSS-REFERENCE TO RELATED APPLICATIONS

This application is a Continuation of U.S. patent application Ser. No. 14/678,848 filed Apr. 3, 2015; which is a Continuation of U.S. patent application Ser. No. 14/294,117 filed Jun. 2, 2014; which is a Continuation of U.S. patent application Ser. No. 13/230,625 filed Sept. 12, 2011 and issued Feb. 24, 2015 as U.S. Pat. No. 8,964,719; which is a Continuation of U.S. patent application Ser. No. 12/748,781 filed Mar. 29, 2010 and issued Oct. 11, 2011 as U.S. Pat. No. 8,036,199; which is a Continuation of U.S. patent application Ser. No. 11/931,926 filed Oct. 31, 2007 and issued May 11, 2010 as U.S. Pat. No. 7,715,358; which is a Continuation of U.S. patent application Ser. No. 11/199,586 filed Aug. 8, 2005 and issued November 18, 2008 as U.S. Pat. No. 7,454,212; which is a Continuation of U.S. patent application Ser. No. 09/738,086 filed Dec. 15, 2000 and issued Sep. 20, 2005 as U.S. Pat. No. 6,947,748; the disclosure of which are incorporated herein by reference.

FIELD OF THE INVENTION

The invention relates to the field of wireless communications; more particularly, the invention relates to multi-cell, multi-subscriber wireless systems using orthogonal frequency division multiplexing (OFDM).

BACKGROUND OF THE INVENTION

Orthogonal frequency division multiplexing (OFDM) is an efficient modulation scheme for signal transmission over frequency-selective channels. In OFDM, a wide bandwidth is divided into multiple narrowband subcarriers, which are arranged to be orthogonal with each other. The signals modulated on the subcarriers are transmitted in parallel. For more information, see Cimini, Jr., "Analysis and Simulation of a Digital Mobile Channel Using Orthogonal Frequency Division Multiplexing," IEEE Trans. Commun., vol. COM-33, no. 7, July 1985, pp. 665-75; Chung and Sollenberger, "Beyond 3G: Wideband Wireless Data Access Based on OFDM and Dynamic Packet Assignment," IEEE Communications Magazine, Vol. 38, No. 7, pp. 78-87, July 2000.

One way to use OFDM to support multiple access for multiple subscribers is through time division multiple access (TDMA), in which each subscriber uses all the subcarriers within its assigned time slots. Orthogonal frequency division multiple access (OFDMA) is another method for multiple access, using the bask format of OFDM. In OFDMA, multiple subscribers simultaneously use different sub-carriers, in a fashion similar to frequency division multiple access (FDMA). For more information, see Sari and Karam, "Orthogonal Frequency-Division Multiple Access and its Application to CATV Networks," European Transactions on Telecommunications, Vol. 9 (6), pp. 507-516, November/December 1998 and Nogueroles, Bossert, Donder, and Zyablov, "Improved Performance of a Random OFDMA Mobile Communication System," Proceedings of IEEE VTC'98, pp. 2502-2506.

Multipath causes frequency-selective fading. The channel gains are different for different subcarriers. Furthermore, the channels are typically uncorrelated for different subscribers. The subcarriers that are in deep fade for one subscriber may provide high channel gains for another subscriber. Therefore, it is advantageous in an OFDMA system to adoptively allocate the subcarriers to subscribers so that each subscriber enjoys a high channel gain. For more information, see Wong et al., "Multiuser OFDM with Adaptive Subcarrier, Bit and Power Allocation," IEEE J. Select. Areas Common., Vol. 17(10), pp. 1747-1758, October 1999.

Within one cell, the subscribers can be coordinated to have different subcarriers in OFDMA. The signals for different subscribers can be made orthogonal and there is little intracell interference. However, with aggressive frequency reuse plan, e.g., the same spectrum is used for multiple neighboring cells, the problem of intercell interference arises. It is clear that the intercell interference in an OFDMA system is also frequency selective and it is advantageous to adoptively allocate the subcarriers so as to mitigate the effect of intercell interference.

One approach to subcarrier allocation for OFDMA is a joint optimization operation, not only requiring the activity and channel knowledge of all the subscribers in all the cells, but also requiring frequent rescheduling every time an existing subscriber is dropped off the network or a new subscriber is added onto the network. This is often impractical is real wireless system, mainly due to the bandwidth cost for updating the subscriber information and the computation cost for the joint optimization.

SUMMARY OF THE INVENTION

A method and apparatus for allocating subcarriers in an orthogonal frequency division multiple access (OFDMA) system is described. In one embodiment, the method comprises allocating at least one diversity cluster of subcarriers to a first subscriber and allocating at least one coherence cluster to a second subscriber.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
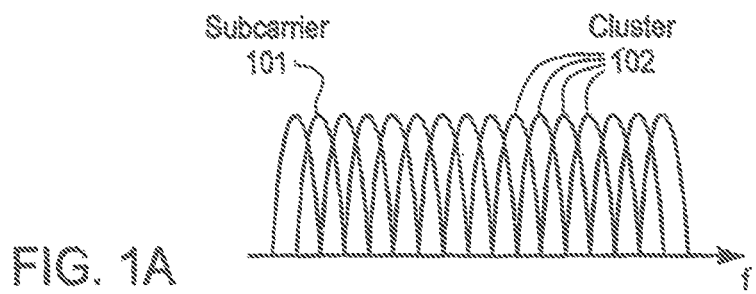
FIG. 1A illustrates subcarriers and clusters.

A method and apparatus for allocating subcarriers in an orthogonal frequency division multiple access (OFDMA) system, is described. In one embodiment, the method comprises allocating at least one diversity cluster of subcarriers to a first subscriber and allocating at least one coherence cluster to a second subscriber.

The techniques disclosed herein axe described using OFDMA (clusters) as an example. However, they are not limited to OFDMA-based systems. The techniques apply to multi-carrier systems in general, where, for example, a carrier can be a cluster in OFDMA, a spreading code in CDMA, an antenna beam in SDMA (space-division multiple access), etc. In one embodiment, subcarrier allocation is performed in each cell separately. Within each cell, the allocation for individual subscribers (e.g., mobiles) is also made progressively as each new subscriber is added to the system as opposed to joint allocation for subscribers within each cell in which allocation decisions axe made taking into account all subscribers in a cell for each allocation.

For downlink channels, each subscriber first measures the channel and interference information for all the subcarriers and then selects multiple subcarriers with good performance (e.g., a high signal-to-interference plus noise ratio (SINR)) and feeds back the information on these candidate subcarriers to the base station. The feedback may comprise channel and interference information (e.g., signal-to-interference-plus-noise-ratio information) on all subcarriers or just a portion of subcarriers. In case of providing information on only a portion of the subcarriers, a subscriber may provide a list of subcarriers ordered starting with those subcarriers which the subscriber desires to use, usually because their performance is good or better than that of other subcarriers.

Upon receiving the information from the subscriber, the base station further selects the subcarriers among the candidates, utilizing additional information available at the base station, e.g., the traffic load information on each subcarrier, amount of traffic requests queued at the base station for each frequency band, whether frequency bands are overused, and/or how long a subscriber has been waiting to send information. In one embodiment, the subcarrier loading information of neighboring cells can also be exchanged between base stations. The base stations can use this information in subcarrier allocation to reduce inter-cell interference.

In one embodiment, the selection by the base station of the channels to allocate, based on the feedback, results in the selection of coding/modulation rates. Such coding/modulation rates may be specified by the subscriber when specifying subcarriers that it finds favorable to use. For example, if the SINR is less than a certain threshold (e.g., 12 dB), quadrature phase shift keying (QPSK) modulation is used; otherwise, 16 quadrature amplitude modulation (QAM) is used. Then the base station informs the subscribers about the subcarrier allocation and the coding/modulation rates to use.

In one embodiment, the feedback information for downlink subcarrier allocation is transmitted to the base station through the uplink access channel, which occurs in a short period every transmission time slot, e.g., 400 microseconds in every 10-millisecond time slot. In one embodiment, the access channel occupies the entire frequency bandwidth. Then the base station can collect the uplink SINR of each subcarrier directly from the access channel. The SINR as well as the traffic load information on the uplink subcarriers are used for uplink subcarrier allocation.

For either direction, the base station makes the final decision of subcarrier allocation for each subscriber.

In the following description, a procedure of selective subcarrier allocation is also disclosed, including methods of channel and interference sensing, methods of information feedback from the subscribers to the base station, and algorithms used by the base station for subcarrier selections.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in details in order to avoid obscuring the present invention.

Some portions of the detailed descriptions which follow are presented in terms of algorithms and symbolic representations of operations on data bits within a computer memory. These algorithmic descriptions and representations ate the means used by those skilled in the data, processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical, (electronic) quantities within the computer system's registers and memories into other data similarly represented as physical quantities within the computer system memories or registers or other such information storage, transmission or display devices.

Use present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"): random access memory ("RAM"); magnetic disk storage media; optical storage media; flash memory devices: electrical, optical, acoustical or other form of propagated signals (e.g., carrier waves, infrared signals, digital signals, etc.); etc.

Subcarrier Clustering

The techniques described herein are directed to subcarrier allocation for data traffic channels. In a cellular system, there are typically other channels, pre-allocated for the exchange of control information and other purposes. These channels often include down link and up link control channels, uplink access channels, and time and frequency synchronization channels.

FIG. 1A illustrates multiple subcarriers, such as subcarrier 101, and cluster 102. A cluster, such as cluster 102, is defined as a logical unit that contains at least one physical subcarrier, as shown in FIG. 1A. A cluster can contain consecutive or disjoint subcarriers. The mapping between a cluster and its subcarriers can be fixed, or reconfigurable. In rise latter case, the base station informs the subscribers when the clusters are redefined. In one embodiment, the frequency spectrum includes 512 subcarriers and each cluster includes four consecutive subcarriers, thereby resulting in 128 clusters.

An Exemplary Subcarrier/Cluster Allocation Procedure

Figure 1B:
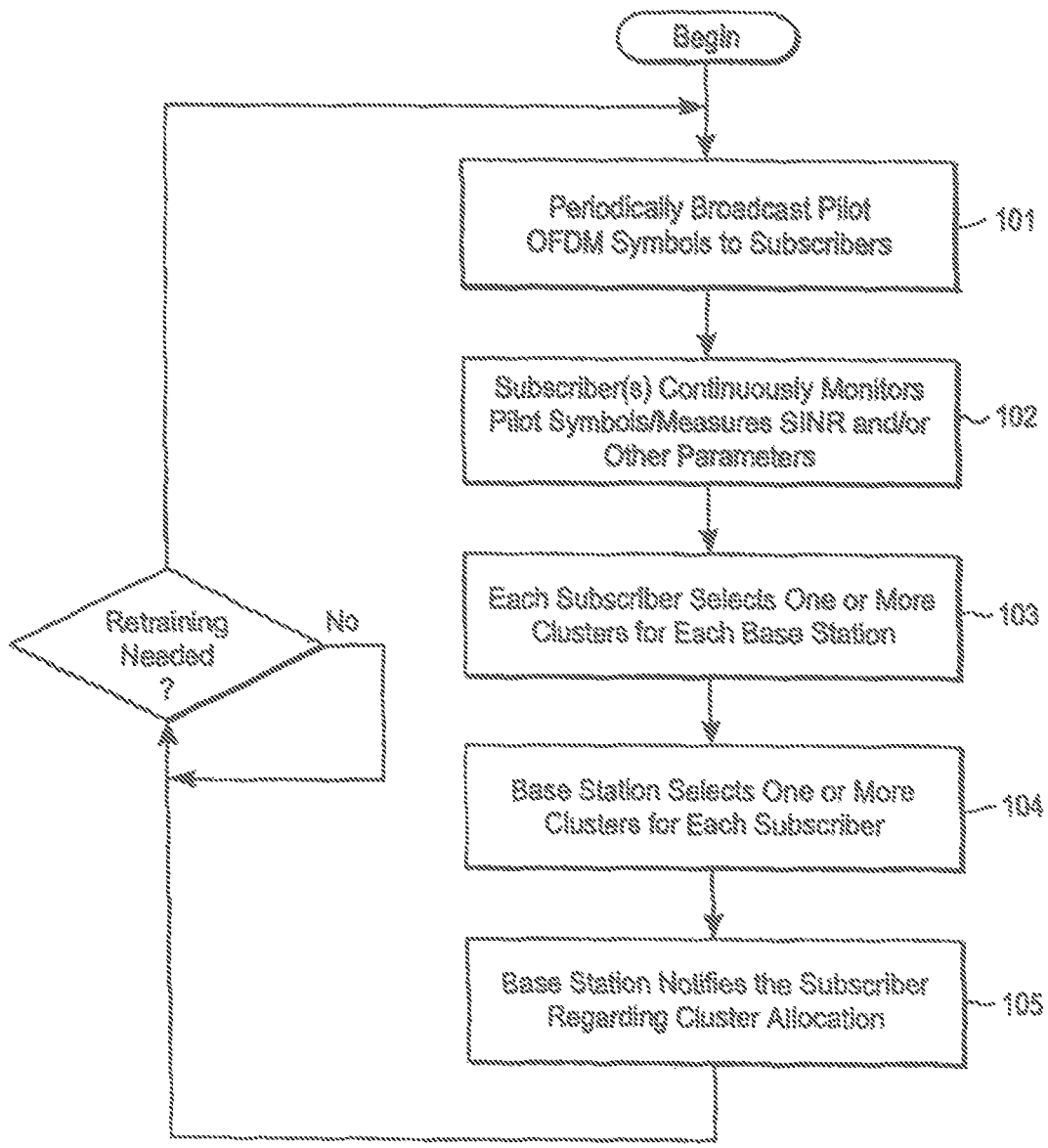
FIG. 1B is a flow diagram, of one embodiment of a process for allocating subcarriers.

FIG. 1B is a flow diagram of one embodiment of a process for allocation clusters to subscribers. The process is performed by processing logic that may comprise hardware (e.g., dedicated logic, circuitry, etc.), software (such as that which runs on, for example, a general purpose computer system or dedicated machine), or a combination of both.

Referring to FIG. 1B, each base station periodically broadcasts pilot OFDM symbols to every subscriber within its cell (or sector) (processing block 101). The pilot symbols, often referred to as a sounding sequence or signal, are known to both the base station and the subscribers. In one embodiment, each pilot symbol covers the entire OFDM frequency bandwidth. The pilot symbols may be different for different cells (or sectors). The pilot symbols can serve multiple purposes; time and frequency synchronization, channel estimation and signal-to-interference/noise (SINR) ratio measurement for cluster allocation.

Next, each subscriber continuously monitors the reception of the pilot symbols and measures the SINR and/or other parameters, including inter-cell interference and intra-cell traffic, of each cluster (processing block 102). Based on this information, each subscriber selects one or more clusters with good performance (e.g., high SINR and low traffic loading) relative to each other and feeds back the information on these candidate clusters to the base station through predefined uplink access channels (processing block 103). For example, SINR values higher than 10 dB may indicate good performance. Likewise, a cluster utilization factor less than 50% may be indicative of good performance. Each subscriber selects the clusters with relatively better performance than others. The selection results in each subscribes: selecting dusters they would prefer to use based on the measured parameters.

In one embodiment, each subscriber measures the SINR of each subcarrier cluster and reports these SINR measurements to their base station through an access channel. The SINR value may comprise the average of the SINR values of each of the subcarriers in the cluster. Alternatively, the SINR value for the cluster may be the worst SINR among the SINR values of the subcarriers in the cluster. In still another embodiment a weighted averaging of SINR values of the subcarriers in the cluster is used to generate an SINR value for the cluster. This may be particularly useful in diversity clusters where the weighting applied to the subcarriers may be different.

The feedback of information from each subscriber to the base station contains a SINR value for each cluster and also indicates the coding/modulation rate dust the subscriber desires to use. No cluster index is needed to indicate which SINR value in the feedback corresponds to which cluster as long as the order of information in the feedback is known to the base station. In an alternative embodiment, the information in the feedback is ordered according to which clusters have the best performance relative to each other for the subscriber. In such a case, an index is needed to indicate to which cluster the accompanying SINR value corresponds.

Upon receiving the feedback from a subscriber, the base station further selects one or more clusters for the subscriber among the candidates (processing block 104), The base station may utilize additional information available at the base station, e.g., the traffic load information on each subcarrier, amount of traffic requests queued at the base station for each frequency band, whether frequency bands are overused, and how long a subscriber has been waiting to send information. The subcarrier loading information of neighboring cells can also be exchanged between base stations. The base stations can use this information in subcarrier allocation to reduce inter-cell interference.

After cluster selection, the base station notifies the subscriber about the cluster allocation through a downlink common control channel or through a dedicated downlink traffic channel if the connection to the subscriber has already been established (processing block 105). In one embodiment, the base station also informs the subscriber about the appropriate modulation/coding rates.

Once the basic communication link is established, each subscriber can continue to send the feedback to the base station using a dedicated traffic channel (e.g., one or more predefined uplink access channels).

In one embodiment, the base station allocates all the clusters to be used by a subscriber at once. In an alternative embodiments the base station first allocates multiple clusters, referred to herein as the basic clusters, to establish a data link between the base station and the subscriber. The base station then subsequently allocates more clusters, referred to herein as the auxiliary clusters, to the subscriber to increase the communication bandwidth. Higher priorities can be given to the assignment of basic clusters and lower priorities may be given to dust of auxiliary clusters. For example, the base station first ensures the assignment of the basic clusters to the subscribers and then tries to satisfy further requests on the auxiliary clusters from the subscribers. Alternatively, the base station may assign auxiliary clusters to one or more subscribers before allocating basic clusters to other subscribers. For example, a base station may allocate basic and auxiliary clusters to one subscriber before allocating any clusters to other subscribers. In one embodiment, the base station allocates basic clusters to a new subscriber and then determines if there are any other subscribers requesting clusters. If not, then the base station allocates the auxiliary clusters to that new subscriber.

From time to time, processing logic performs retraining by repeating the process described above (processing block 106). The retraining may be performed periodically. This retraining compensates for subscriber movement and any changes in interference. In one embodiment, each subscriber reports to the base station its updated selection of clusters and their associated SINRs. Then the base station further performs the reselection and informs the subscriber about the new cluster allocation. Retraining can be initiated by the base station, and in which case, the base station requests a specific subscriber to report its updated cluster selection. Retraining can also be initiated by the subscriber when it observes channel deterioration.

Adaptive Modulation and Coding

In one embodiment, different modulation and coding rates are used to support reliable transmission over channels with different SINR. Signal spreading over multiple subcarriers may also be used to improve the reliability at very low SINR.

As example coding/modulation table is given below in Table 1.

TABLE 1

| Scheme | Modulation | Code Rate |
| --- | --- | --- |
| 0 | QPSK, ⅛ Spreading | ½ |
| 1 | QPSK, ¼ Spreading | ½ |
| 2 | QPSK, ½ Spreading | ½ |
| 3 | QPSK | ½ |
| 4 | 8PSK | ⅔ |
| 5 | 16QAM | ¾ |
| 6 | 64QAM | ⅚ |

In the example above, ⅛ spreading indicates that one QPSK modulation symbol is repeated over eight subcarriers. The repetition/spreading may also be extended to the time domain. For example, one QPSK symbol can be repeated over four subcarriers of two OFDM symbols, resulting also ⅛ spreading.

The coding/modulation rate can be adaptively changed according to the channel conditions observed at the receiver after the initial cluster allocation and rate selection.

Pilot Symbols and SINR Measurement

Figure 2:
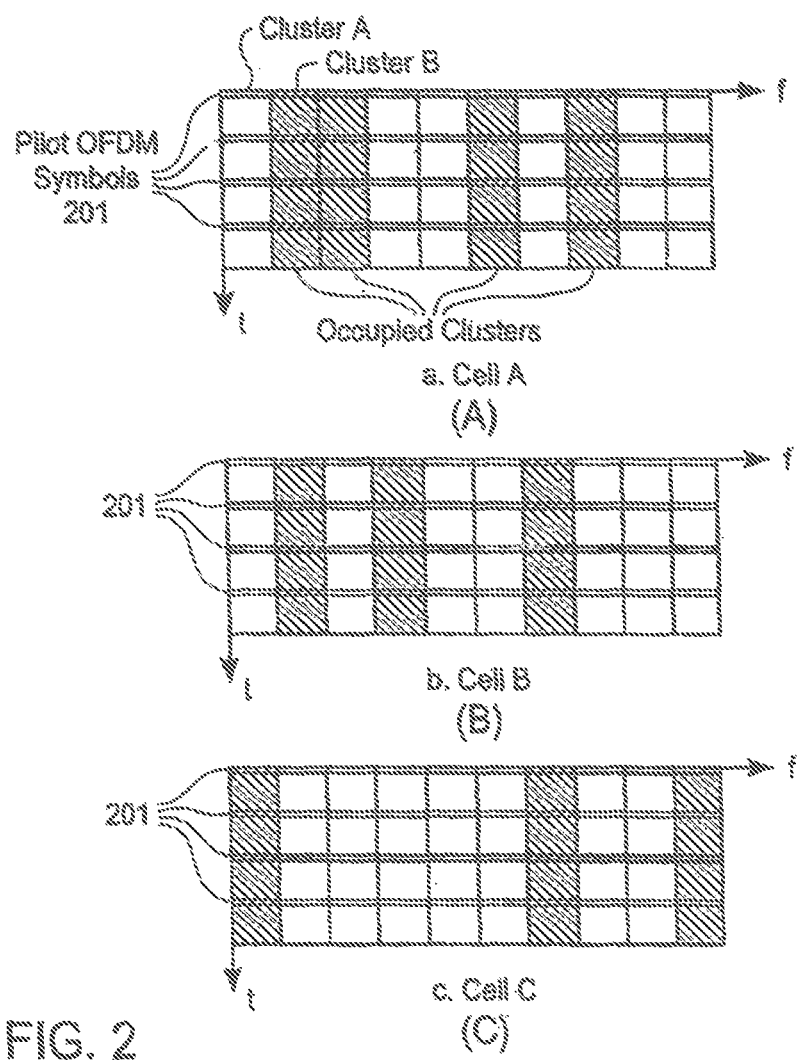
FIG. 2 illustrates time and frequency grid of OFDM symbols, pilots and clusters.

In one embodiment, each base station transmits pilot symbols simultaneously, and each pilot symbol occupies the entire OFDM frequency bandwidth, as shown in FIGS. 2A-C. Referring to FIGS. 2A-C, pilot symbols 201 are shown traversing the entire OFDM frequency bandwidth for cells A, B and C) respectively. In one embodiment, each of the pilot symbols have a length or duration of 128 microseconds with a guard time, the combination of which is approximately 152 microseconds. After each pilot period, there are a predetermined number of date periods followed by another set of pilot symbols. In one embodiment mere are four data periods used to transmit data alter each pilot, and each of the data periods is 152 microseconds.

A subscriber estimates the SINR for each cluster from the pilot symbols. In one embodiment, the subscriber first estimates the channel response, including the amplitude and phase, as if there is no interference or noise. Once the channel is estimated, tire subscriber calculates the interference/noise from the received signal.

The estimated SINR values may be ordered from largest to smallest SINRs and the clusters with large SINR values are selected. In one embodiment, the selected clusters have SINR values that are larger than the minimum SINR which still allows a reliable (albeit low-rate) transmission supported by the system. The number of clusters selected may depend on the feedback bandwidth and the request transmission rate. In one embodiment, the subscriber always tries to send the information about as many clusters as possible from which, the base station chooses.

The estimated SINR values are also used to choose the appropriate coding/modulation rate for each cluster as discussed above. By using an appropriate SINR indexing scheme, an SINR index may also indicate a particular coding and modulation rate that a subscriber desires to use. Note that even for the same subscribers, different clusters can have different modulation/coding rates.

Pilot symbols serve an additional purpose in determining interference among thee cells. Since the pilots of multiple cells are broadcast at the same time, they will interfere with each other (because they occupy the entire frequency band). This collision of pilot symbols may be used to determine the amount of interference as a worst case scenario. Therefore, in one embodiment, the above SINR estimation using this method is conservative in that the measured interference level is the worst-case scenario, assuming that all the interference sources axe on. Thus, the structure of pilot symbols is such that it occupies the entire frequency baud and causes collisions among different cells for use in detecting the worst case SINR in packet transmission systems.

During data traffic periods, the subscribers can determine the level of interference again. The data traffic periods are used to estimate the intra-cell traffic as well as the inter-cell interference level. Specifically, the power difference during the pilot and traffic periods may be used to sense the (intra-cell) traffic loading and inter-cell interference to select the desirable clusters.

The interference level on certain clusters may be lower, because these clusters may be unused in the neighboring cells. For example, in cell A, with respect to cluster A there is less interference because cluster A is unused in cell B (while it is used in cell C). Similarly, in cell A, cluster B will experience lower interference from cell B because cluster B is used in cell B but not in cell C.

The modulation/coding rate based on bus estimation is robust to frequent interference changes resulted from bursty packet transmission. This is because the rate prediction is based on the worst case situation in which ail interference sources are transmitting.

In one embodiment, a subscriber utilizes the information available from both, the pilot symbol, periods and the data traffic periods to analyze the presence of both the intra-cell traffic load and inter-cell interference. The goal of the subscriber is to provide an indication to the base station as to those clusters that the subscriber desires to use. Ideally, the result of the selection by the subscriber is dusters with high channel gain, low interference from other cells, and high availability. The subscriber provides feedback information that includes the results, listing desired clusters in order or not as described herein.

Figure 3:
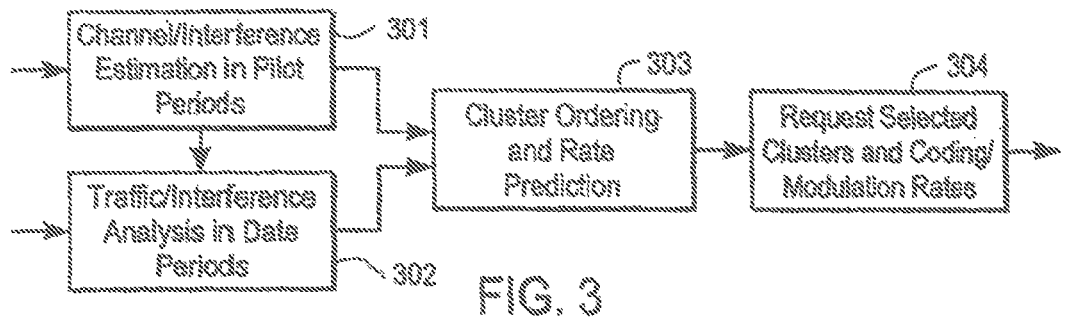
FIG. 3 illustrates subscriber processing.

FIG. 3 illustrates one embodiment of subscriber processing. The processing is performed by processing logic that may comprise hardware (e.g., dedicated logic, circuitry, etc.), software (such as that which runs on, for example, a general purpose computer system or dedicated machine), or a combination of both.

Referring to FIG. 3, channel/interference estimation processing block 301 performs channel and interference estimation in pilot periods in response to pilot symbols. Traffic/interference analysis processing block 302 performs traffic and interference analysis in data periods in response to signal information and information from channel/interference estimation block 301.

Cluster ordering and rate prediction processing block 303 is coupled to outputs of channel/interference estimation processing block 301 and traffic/interference analysis processing block 302 to perform cluster ordering and selection along with rate prediction.

The output of cluster ordering processing block 303 is input to cluster request processing block 304, which requests clusters and modulation/coding rates. Indications of these selections are seat to the base station. In one embodiment, the SINE, on each cluster is reported to the base station through an access channel. The information is used for cluster selection to avoid clusters with heavy intra-cell traffic loading and/or strong interference from other cells. That is, a new subscriber may not be allocated use of a particular cluster if heavy intra-cell traffic loading already exists with respect to that cluster. Also, clusters may not be allocated if the interference is so strong that the SINR only allows for low-rate transmission or no reliable transmission at all.

The channel/interference estimation by processing block 301 is well-known in the art by monitoring the interference that is generated due to full-bandwidth pilot symbols being simultaneously broadcast in multiple cells. The interface information is forwarded to processing block 302 which uses the information to solve the following equation:

$$H_i S_i + I_i + n_i = y_i$$

where $S_i$ represents the signal for subcarrier (freq. band) i, $I_i$ the interference for subcarrier i, $n_i$ is the noise associated with subcarrier i, and $y_i$ is the observation for subcarrier i. In the case of 512 subcarriers, i may range from 0 to 511. The $I_i$ and $n_i$ are not separated and may be considered one quantity. The interference/noise and channel gain $H_i$ are not known. During pilot periods, the signal $S_i$ representing the pilot symbols, and the observation $y_i$ are knowns, thereby allowing determination of the channel gain $H_i$ for the case where there is no interference or noise. Once this is known, it may be plugged back into the equation to determine the interference/noise during data periods since $H_i$, $S_i$ and $y_i$ are all known.

The interference information from processing blocks 301 and 302 are used by the subscriber to select desirable clusters. In one embodiment, using processing block 303, the subscriber orders clusters and also predicts the data rate that would be available using such clusters. The predicted data rate information may be obtained from a look up table with precalculated data rate values. Such a look up table may store the pairs of each SINR and its associated desirable transmission rate. Based on this information, the subscriber selects clusters that it desires to use based on predetermined performance criteria. Using the ordered list of clusters, the subscriber requests the desired clusters along with coding and modulation rates known to the subscriber to achieve desired data rates.

Figure 4:
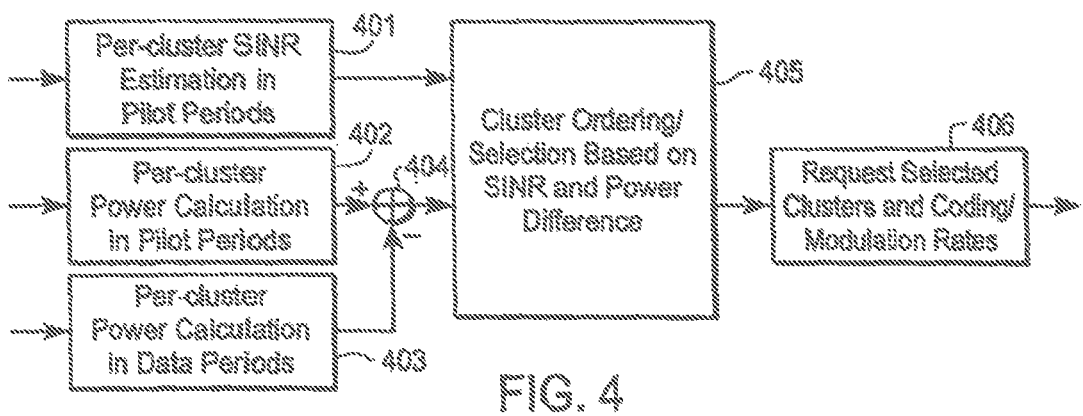
FIG. 4 illustrates one example of FIG. 3.

FIG. 4 is one embodiment of an apparatus for the selection of clusters based on power difference. Use approach uses information available during both pilot symbol periods and data traffic periods to perform energy detection. The processing of FIG. 4 may be implemented in hardware, (e.g., dedicated logic, circuitry, etc.). software (such as is run on, for example, a general purpose computer system or dedicated machine), or a combination of both.

Referring to FIG. 4, a subscriber includes SINR estimation processing block 401 to perform SINR estimation for each cluster in pilot periods, power calculation processing block 402 to perform power calculations for each cluster in pilot periods, and power calculation processing block 403 to perform power calculations in data periods for each cluster. Subtractor 404 subtracts the power calculations for data periods from processing block 403 from those in pilot periods from processing block 402. The output of subtractor 404 is input to power difference ordering (and group selection) processing block 405 that performs cluster ordering and selection based on SINE, and the power difference between pilot periods and data periods. Once the clusters have been selected, the subscriber requests the selected clusters and the coding/modulation rates with processing block 406.

More specifically, in one embodiment, the signal power of each cluster during the pilot periods is compared with that during the traffic periods, according to the following:

$$P_P = P_S + P_I + P_N,$$

$$P_D = \begin{cases} P_N, \text{ with no signal and interference} \\ P_S + P_N, \text{ with signal only} \\ P_I + P_N, \text{ with interference only} \\ P_S + P_I + P_N, \text{ with both signal and interference} \end{cases}$$

$$P_P - P_D = \begin{cases} P_S + P_I, \text{ with no signal and interference} \\ P_I, \text{ with signal only} \\ P_S, \text{ with interference only} \\ 0, \text{ with both signal and interference} \end{cases}$$

where $P_P$ is the measured power corresponding to each cluster during pilot periods, $P_D$ is the measured power during the traffic periods, $P_S$ is the signal power, $P_I$ is the interference power, and $P_N$ is the noise power.

In one embodiment, the subscriber selects clusters with, relatively large $P_P/(P_P - P_D)$ (e.g., larger than a threshold such as 10 dB) and avoids clusters with low $P_P/(P_P - P_D)$ (e.g., lower than a threshold such as 10 dB) when possible.

Alternatively, the difference may be based on the energy difference between observed, samples during the pilot period and during the data traffic period for each of the subcarriers in a cluster such as the following:

$$\Delta_1 = |y_i^P| - |y_i^D|$$

Thus, the subscriber scans the differences for all subcarriers.

Depending on the actual implementation, a subscriber may use the following metric, a combined function of both SINR and $P_P - P_D$, to select the clusters:

$$\beta = f(SINR, P_P/(P_P - P_D))$$

where f is a function of the two inputs. One example of f is weighted averaging (e.g., equal weights). Alternatively, a subscriber selects a cluster based on its SINR and only uses the power difference $P_P - P_D$ to distinguish clusters with similar SINR. The difference may be smaller than a threshold (e.g., 1 dB).

Both the measurement of SINR and $P_P - P_D$ can be averaged over time to reduce variance and improve accuracy. In one embodiments a moving-average time window is used that is long enough to average out the statistical abnormity yet short enough to capture the time-varying nature of channel and interference, e.g., 1 millisecond.

Feedback Format for Downlink Cluster Allocation

Figure 5:
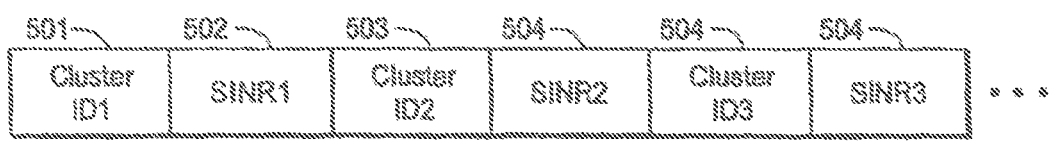
FIG. 5 illustrates one embodiment of a format for arbitrary cluster feedback.

In one embodiment, for the downlink, the feedback contains both the indices of selected clusters and their SINR. An exemplary format for arbitrary cluster feedback is shown in FIG. 5. Referring to FIG. 5, the subscriber provides a cluster index (ID) to indicate the cluster and its associated SINR value. For example, in the feedback, the subscriber provides cluster ID1 (501) and the SINR for the cluster, SINR1 (502), cluster ID2 (503) and the SINR for the cluster, SINR2 (504), and cluster ID3 (505), and the SINR for the cluster, SINR3 (506), etc. The SINR for the cluster may be created using an average of the SINRs of tire subcarriers. Thus, multiple arbitrary clusters can be selected as the candidates. As discussed above, the selected clusters can also be ordered in the feedback to indicate priority. In one embodiment, the subscriber may form a priority list of clusters and sends back the SINR information in a descending order of priority.

Typically, an index to the SINR level, instead of the SINR itself is sufficient to indicate the appropriate coding/modulation for the cluster. For example, a 3-bit field can be used for SINR indexing to indicate 8 different rates of adaptive coding/modulation.

An Exemplary Base Station

The base station assigns desirable clusters to the subscriber making the request. In one embodiments the availability of the cluster for allocation to a subscriber depends on the total traffic load on the cluster. Therefore, the base station selects the clusters not only with high SINR, but also with low traffic load.

Figure 13:
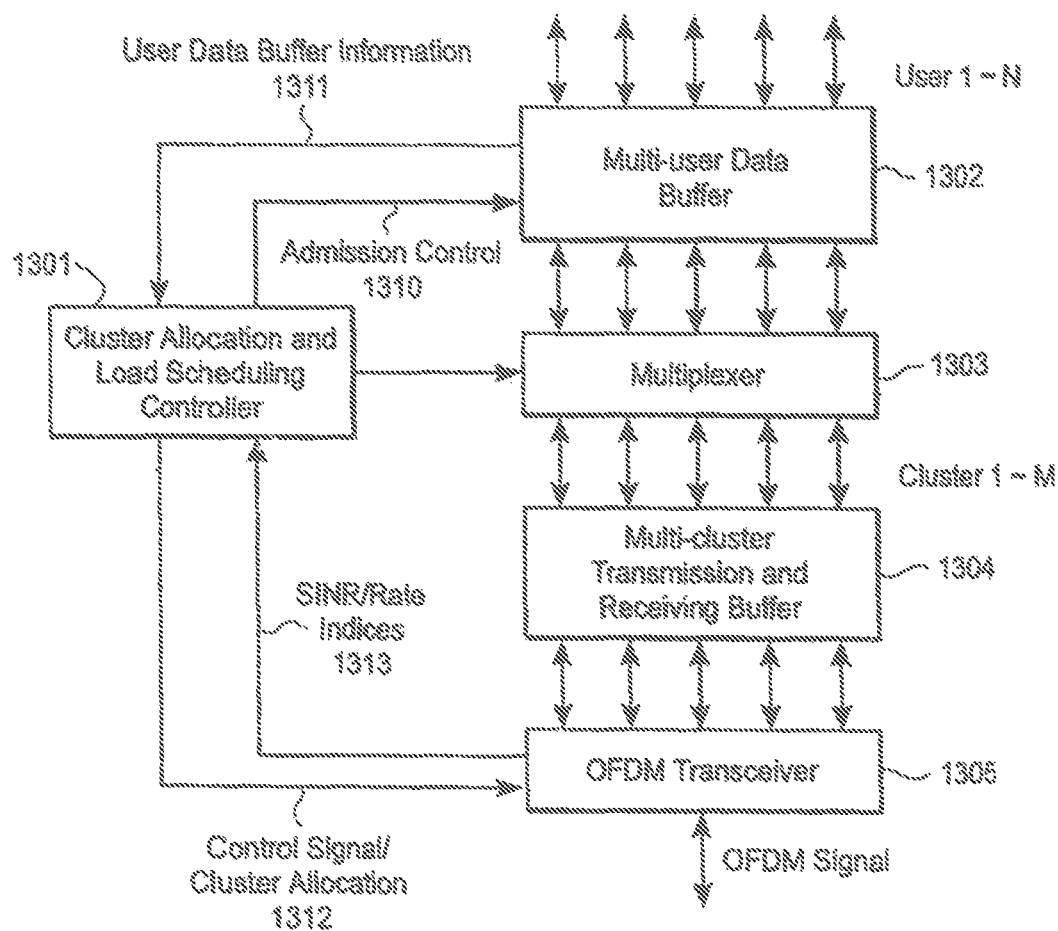
FIG. 13 illustrates one embodiment of a base station.

FIG. 13 is a block diagram of one embodiment of a base station. Referring to FIG. 13, cluster allocation and load scheduling controller 1301 (cluster allocator) collects all the necessary information, including the downlink/uplink SINR of clusters specified for each subscriber (e.g., via SINR/rate indices signals 1313 received from OFDM transceiver 1305) and user data, queue fullness/traffic load (e.g., via user data buffer information 1311 from multi-user data buffer 1302). Using this information, controller 1301 makes the decision on cluster allocation and load scheduling for each user, and stores the decision information in a memory (not shown). Controller 1301 informs the subscribers about the decisions through control signal channels (e.g., control signal/cluster allocation 1312 via OFDM transceiver 1305). Controller 1301 updates the decisions during retraining.

In one embodiment, controller 1301 also performs admission control to user access since it knows the traffic load of the system. This may be performed by controlling user data buffers 1302 using admission control signals 1310.

The packet data of User 1~N are stored in the user data buffers 1302. For downlink, with the control of controller 1301, multiplexer 1303 loads the user data to cluster data buffers (for Cluster 1~M) waiting to be transmitted. For the uplink, multiplexer 1303 sends the data in the cluster buffers to the corresponding user butlers. Cluster buffer 1304 stores the signal to be transmitted through OFDM transceiver 1305 (for downlink) and the signal received, from transceiver 1305. In one embodiment, each user might occupy multiple clusters and each cluster might be shared by multiple users (in a time-division-multiplexing fashion).

Group-Based Cluster Allocation

Figure 6:
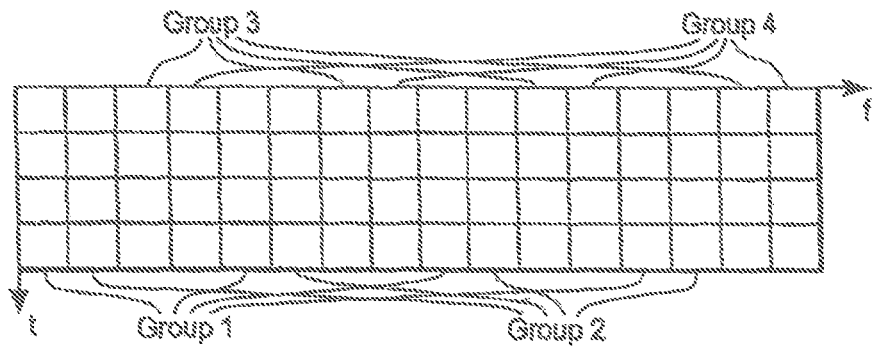
FIG. 6 illustrates one embodiment of a partition the clusters into groups.

In another embodiment, for the downlink, the clusters axe partitioned into groups. Each group can include multiple clusters. FIG. 6 illustrates an exemplary partitioning. Referring to FIG. 6, groups 1-4 are shown with arrows pointing to clusters mat are in each group as a result of the partitioning. In one embodiment, the clusters within each group are spaced far apart over the entire bandwidth. In one embodiment, the clusters within each group are spaced apart farther than the channel coherence bandwidth, i.e., the bandwidth within which the channel response remains roughly the same. A typical value of coherence bandwidth is 100 kHz for many cellular systems. This improves frequency diversity within each group and increases the probability that at least some of the clusters within a group can provide high SINR. The clusters may be allocated in groups.

Goals of group-based cluster allocation include reducing the data bits for cluster indexing, thereby reducing the bandwidth requirements of the feedback channel (information) and control channel (information) for cluster allocation. Group-based cluster allocation may also be used to reduce inter-cell interference.

After receiving the pilot signal from the base station, a subscriber sends back the channel information on one or more cluster groups, simultaneously or sequentially. In one embodiment, only the information on some of the groups is sent back to the base station. Many criteria can be used to choose and order the groups, based on the channel information, the inter-cell interference levels, and the intra-cell traffic load on each cluster.

Figures 7, 8:
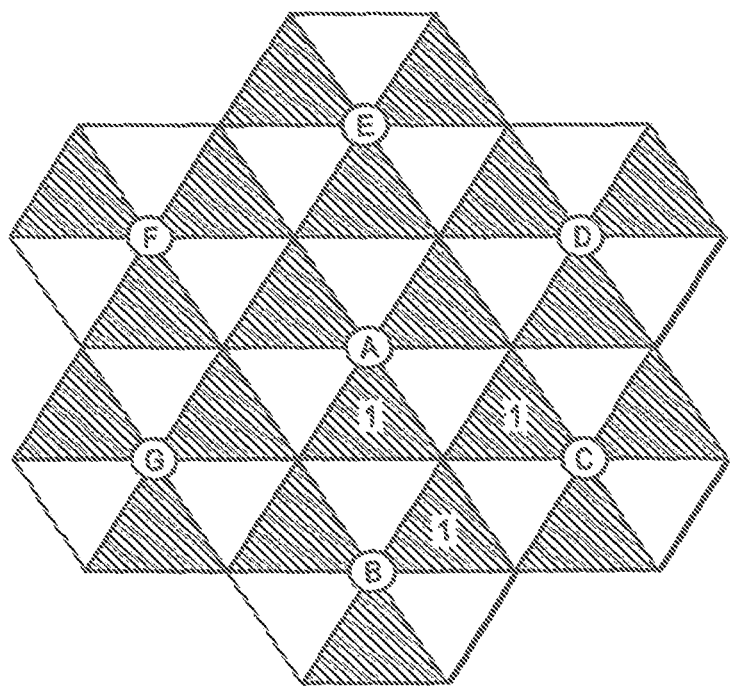
FIG. 7 illustrates one embodiment of a feedback format for group-based cluster allocation.
FIG. 8 illustrates frequency reuse and interference in a multi-cell, multi-sector network.

In one embodiment, a subscriber first selects the group with the best overall performance and then feedbacks the SINR information for the clusters in that group. The subscriber may order the groups based on their number of clusters for winch the SINR is higher hunt a predefined threshold. By transmitting the SINR, of ail the clusters in the group sequentially, only the group index, instead of all the cluster indices, needs to be transmitted. Thus, the feedback for each group generally contains two types of information: the group index and the SINR value of each cluster within the group. FIG. 7 illustrates an exemplary format for indicating a group-based cluster allocation. Referring to FIG. 7, a group ID, ID1, is followed by the SINR values for each of the clusters in the group. This can significantly reduce the feedback overhead.

Upon receiving the feedback information from the subscriber, the cluster allocator at the base station selects multiple clusters from one or more groups, if available, and then assigns the clusters to the subscriber. This selection may be perforated by an allocation in a media access control portion of the base station.

Furthermore, is a multi-cell environment, groups can have different priorities associated with different cells. In one embodiment the subscriber's selection of a group is biased by the group priority, which means that certain subscribers have higher priorities on the usage of some groups than the other subscribers.

In one embodiment, there is no fixed association between one subscriber and one cluster group; however, in an alternative embodiment there may be such a fixed association. In an implementation having a fixed association between a subscriber and one or more cluster groups, the group index in the feedback information can be omitted, because this information is known to both subscriber and base station by default.

In another embodiment, the pilot signal sent from the base station to the subscriber also indicates the availability of each cluster, e.g., the pilot signal shows which clusters have already been allocated for other subscribers and which clusters are available for new allocations. For example, the base station can transmit a pilot sequence 1111 1111 on the subcarriers of a cluster to indicate that the cluster is available, and 1111 -1-1-1-1 to indicate the cluster is not available. At the receiver, the subscriber first distinguishes the two sequences using the signal processing methods which am well known in the art e.g., the correlation methods, and then estimates the channel and interference level.

With the combination of this information and the channel characteristics obtained by the subscriber, the subscriber can prioritize the groups to achieve both, high SINR and good load balancing.

In one embodiment, the subscriber protects the feedback information by using error correcting codes. In one embodiment, the SINR information in dm feedback is first compressed using source coding techniques, e.g., differential encoding, and then encoded by the channel codes.

FIG. 8 shows one embodiment of a frequency reuse pattern for an exemplary cellular set up. Each cell has hexagonal structure with six sectors using directional antennas at the base stations. Between the cells, the frequency reuse factor is one. Within each cell, the frequency reuse factor is 2 where the sectors use two frequencies alternatively. As shown in FIG. 8, each shaded sector uses half of the available OFDMA clusters and each unshaded sector uses the other half of the clusters. Without loss of generality, the clusters used by the shaded sectors are referred to herein as odd clusters and those used by the unshaded sectors are referred to hereto as even clusters.

Consider the downlink signaling with omni-directional antennas at the subscribers. From FIG. 8, it is clear that for the downlink in the shaded sectors. Cell A interferes with Cell B, which in turn interferes with Cell C, which in turn interferes with Cell A, namely, A->B->C->A. For the unshaded sectors, Cell A interferes with Cell C, which in turn interferes with Cell B, which in turn interferes with Cell A, namely, A->C->B->A, Sector A1 receives interference from Sector C1, but its transmission interferes with Sector B1. Namely, its interference source and the victims with which it interferes are not the same. This might cause a stability problem its a distributed cluster-allocation system using interference avoidance: if a frequency cluster is assigned in Sector B1 but not in Sector C1, the cluster may be assigned in A1 because it may be seen as clean in A1. However, the assignment of this cluster A1 can cause interference problem to the existing assignment in B1.

In one embodiment, different cluster groups are assigned different priorities for use in different cells to alleviate the aforementioned problem when the traffic load is progressively added to a sector. The priority orders are jointly designed such that a cluster can be selectively assigned to avoid interference from its interference source, while reducing, and potentially minimizing, the probability of causing interference problem to existing assignments in other cells.

Using the aforementioned example, the odd clusters (used by the shaded sectors) axe partitioned into 3 groups: Group 1,2,3. The priority orders are listed in Table 2.

TABLE 2

Priority ordering for the downlink of the shaded sectors. Table

| Priority Ordering | Cell A | Cell B | Cell C |
|---|---|---|---|
| 1 | Group 1 | Group 3 | Group 2 |
| 2 | Group 2 | Group 1 | Group 3 |
| 3 | Group 3 | Group 2 | Group 1 |

Consider Sector A1. First, the clusters in Group 1 are selectively assigned. If there are still more subscribers demanding clusters, the clusters in Group 2 are selectively assigned to subscribers, depending on the measured SINR (avoiding the clusters receiving strong interference from Sector C1). Note that the newly assigned clusters from Group 2 to Sector A1 shall not cause interference problem in Sector B1, unless the load in Sector B1 is so heavy that the clusters in both Group 3 and 1 are used up and the clusters in Group 2 are also used. Table 3 shows the cluster usage when less than ⅔ of all the available clusters are used in Sector A1, B1, and C1.

TABLE 3

Cluster usage for the downlink of the shaded sectors with less than ⅔ of the full load.

| Cluster Usage | Cell A | Cell B | Cell C |
|---|---|---|---|
| 1 | Group 1 | Group 3 | Group 2 |
| 2 | Group 2 | Group 1 | Group 3 |
| 3 | | | |

Table 4 shows the priority orders for the unshaded sectors, which are different from those for the shaded sectors, since the interfering relationship is reversed.

TABLE 4

Priority ordering for the downlink of the unshaded sectors.

| Priority Ordering | Cell A | Cell B | Cell C |
|---|---|---|---|
| 1 | Group 1 | Group 2 | Group 3 |
| 2 | Group 2 | Group 3 | Group 1 |
| 3 | Group 3 | Group 1 | Group 2 |

Intelligent Switching between Coherence and Diversity Clusters

In one embodiment, there are two categories of clusters: coherence clusters, containing multiple subcarriers close to each other and diversity clusters, containing multiple subcarriers with at least some of the subcarriers spread far apart over the spectrum. The closeness of the multiple subcarriers in coherence clusters is preferably within the channel coherence bandwidth, i.e. the bandwidth within which the channel response remains roughly the same, which is typically within 100 kHz for many cellular systems. On the other hand, the spread of subcarriers in diversity clusters is preferably larger than the channel coherence bandwidth, typically within 100 kHz for many cellular systems. Of course, the larger the spread, the better the diversity. Therefore, a general goal in such cases is to maximize the spread.

Figure 9:
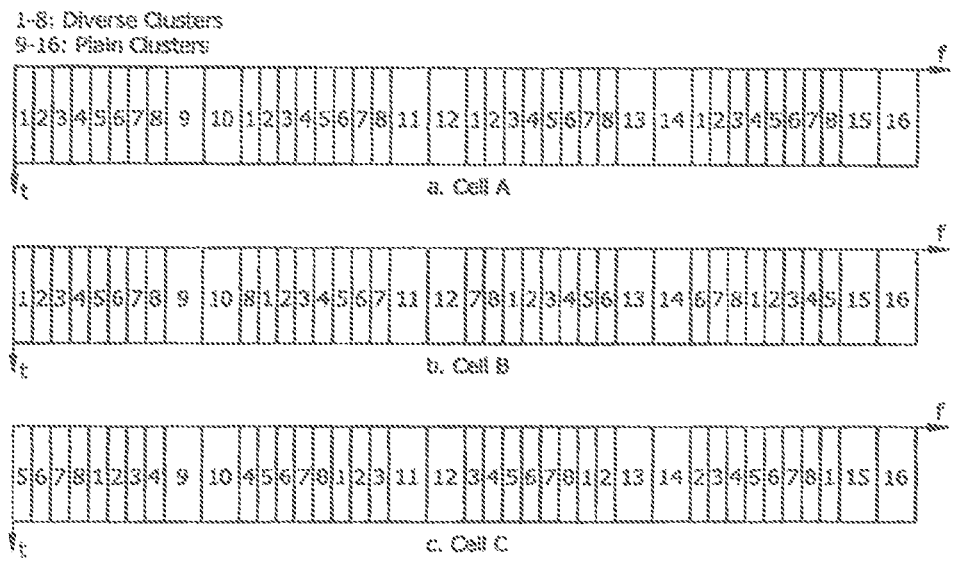
FIG. 9 illustrates different cluster formats for coherence clusters and diversity clusters.

FIG. 9 illustrates exemplary cluster formats for coherence clusters and diversity clusters for Cells A-C. Referring to FIG. 9, for cells A-C, the labeling of frequencies (subcarriers) indicates whether the frequencies are part of coherence or diversity clusters. For example, those frequencies labeled 1-8 are diversity clusters and those labeled 9-16 are coherence clusters. For example, all frequencies labeled 1 in a cell are part of one diversity cluster, all frequencies labeled 2 in a cell are part of another diversity cluster, etc., while the group of frequencies labeled 9 are one coherence cluster, the group of frequencies labeled 10 are another coherence cluster, etc. The diversity clusters cars be configured differently for different cells to reduce the effect of inter-cell interference through interference averaging.

FIG. 9 shows example cluster configurations for three neighboring cells. The interference from a particular cluster in one cell are distributed to many clusters in other cells, e.g., the interference from Cluster 1 in Cell A are distributed to Cluster 1, 8, 7, 6 in Cell B. This significantly reduces the interference power to any particular cluster in Cell B. Likewise, the interference to any particular cluster in one cell comes from many different clusters in other cells. Since not all clusters are strong interferers, diversity clusters, with channel coding across its subcarriers, provide interference diversity gain. Therefore, it is advantageous to assign diversity clusters to subscribers that are close (e.g., within the coherent bandwidth) to the cell boundaries and are more subject to inter-cell interference.

Since the subcarriers in a coherence cluster are consecutive or close (e.g., within the coherent bandwidth) to each other, they are likely within the coherent bandwidth of the channel fading. Therefore, the channel gain of a coherence cluster can vary significantly and cluster selection can greatly improve the performance. On the other hand, the average channel gain of a diversity cluster has less of a degree of variation due to the inherent frequency diversity among the multiple subcarriers spread over the spectrum. With channel coding across the subcarriers within the cluster, diversity clusters are more robust to cluster mis-selection (by the nature of diversification itself), while yielding possibly less gain from cluster selection. Channel coding across the subcarriers means that each codeword contains bits transmitted from multiple subcarriers, and more specifically, the difference bits between codewords (error vector) are distributed among multiple subcarriers.

More frequency diversity can be obtained through subcarrier hopping over time in which a subscriber occupies a set of subcarriers at one time slot and another different set of subcarriers at a different time slot. One coding unit (frame) contains multiple such time slots and the transmitted bits are encoded across the entire frame.

Figure 10:
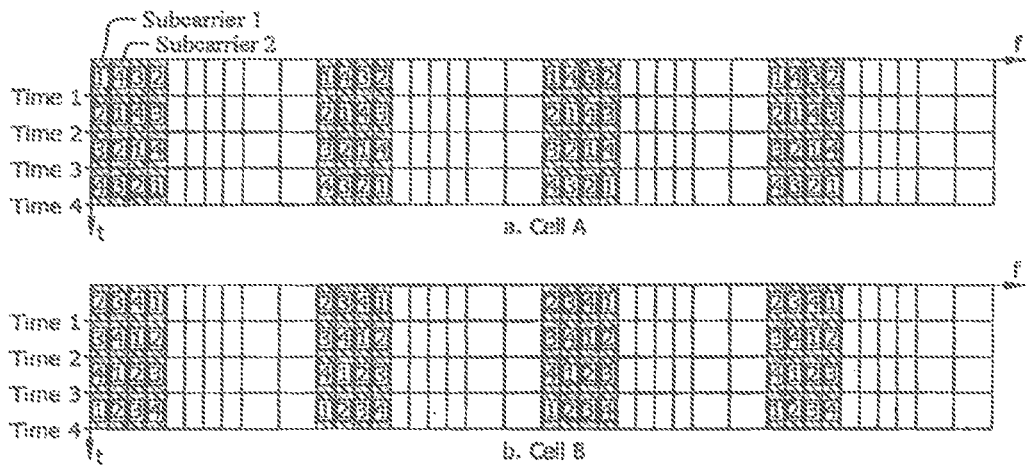
FIG. 10 illustrates diversity clusters with subcarrier hopping.

FIG. 10 illustrates diversity cluster with subcarrier hopping. Referring to FIG. 10, there are four diversity clusters in each of cells A and B shown, with each subcarrier in individual diversity clusters having the same label (1, 2, 3, or 4). There are four separate time slots shown and during each of the time slots, the subcarriers tor each of the diversity clusters change. For example, in cell A, subcarrier 1 is part of diversity cluster 1 during time slot 1, is part of diversity cluster 2 during time slot 2, is part of diversity cluster 3 during time slot 3, and is part of diversity cluster 4 dining time slot 4. Thus, more interference diversity can be obtained through subcarrier hopping over time, with feather interference diversity achieved by using different hopping patterns for different cells, as shown in FIG. 10.

The manner in which the subscriber changes the subcarriers (hopping sequences) can be different for different cells in order to achieve better interference averaging through coding.

For static subscribers, such as in fixed wireless access, the channels change very little over time. Selective cluster allocation using the coherence clusters achieves good performance. On the other hand, for mobile subscribers, the channel time variance (the variance due to changes in the channel over time) can be very large. A high-gain cluster at one time can be in deep fade at another. Therefore, cluster allocation needs to be updated at a rapid rate, causing significant control overhead. In this case, diversity clusters can be used to provide extra robustness and to alleviate the overhead of frequent cluster reallocation. In one embodiment, cluster allocation is performed faster than the channel changing rate, winch is often measured by the channel Doppler rate (in Hz), i.e. how many cycles the channel changes per second where the channel is completely different after one cycle. Note that selective cluster allocation can be performed on both coherence and diversity clusters.

In one embodiment, for cells containing mixed mobile and fixed subscribers, a channel/interference variation detector can be implemented at either the subscriber or the base station, or both. Using the detection results, the subscriber and the base station intelligently selects diversity clusters to mobile subscribers or fixed subscribers at cell boundaries, and coherence clusters to fixed subscribers close to the base station. The channel/interference variation detector measures the channel (SINR) variation from, time to time for each cluster. For example, in one embodiment, the channel/interference detector measures the power difference between pilot symbols for each cluster and averages the difference over a moving window (e.g., 4 time slots). A large difference indicates that channel/interference changes frequently and subcarrier allocation may be not reliable. In such a case, diversity clusters are more desirable for the subscriber.

Figure 11:
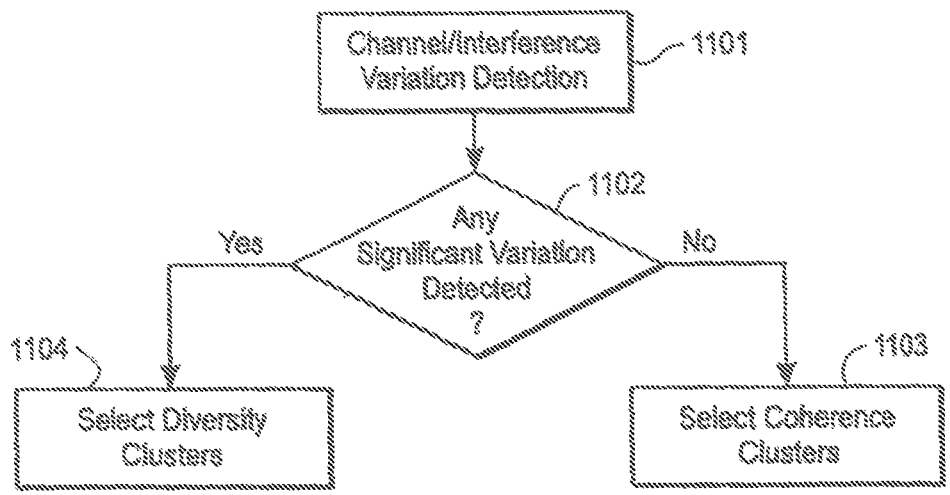
FIG. 11 illustrates intelligent switching between diversity clusters and coherence clusters depending on subscribers mobility.

FIG. 11 is a flow diagram of one embodiment of a process for intelligent selection between diversity clusters and coherence clusters depending on subscribers mobility. The process is performed by processing logic that may comprise hardware (e.g., circuitry, dedicated logic, etc.), software (such as that which runs on, for example, a general purpose computer system or dedicated machine), or a combination of both.

Referring to FIG. 11, processing logic in the base station performs channel/interference variation detection (processing block 1101). Processing logic then tests whether the results of the channel/interference variation detection indicate that the user is mobile or in a fixed position close to the edge of the cell (processing block 1102). If the user is not mobile or is not in a fixed position close to tire edge of the cell, processing transitions to processing block 1103 where processing logic in the base station selects coherence clusters; otherwise, processing transitions to processing block 1104 in which processing logic in the base station selects diversity clusters.

In one embodiment, the base station determines whether a subscriber is mobile or fixed by detecting a rate of change of pilot signals, or the normalized channel variation, and determining that the rate of change is greater than a predetermined threshold. The normalized instantaneous difference between channels may be represented as $$\frac{|H_i - H_{i+1}|^2}{|H_i|^2},$$

where $H_i$ represents the channel and i is the index to represent the individual channels.

The threshold is system dependent. For example, the rate of change is greater than 10% (although any percentage (e.g., 20%) could be used), then the base station concludes that the subscriber is mobile. In one embodiment, if the constant period in signaling is not greater than a multiple of the round trip delay (e.g., 5 times the round trip delay), then the base station determines that the subscriber is mobile and allocates diversity clusters; otherwise, the base station allocates coherence clusters.

The selection can be updated and intelligently switched during retraining.

Figure 12:
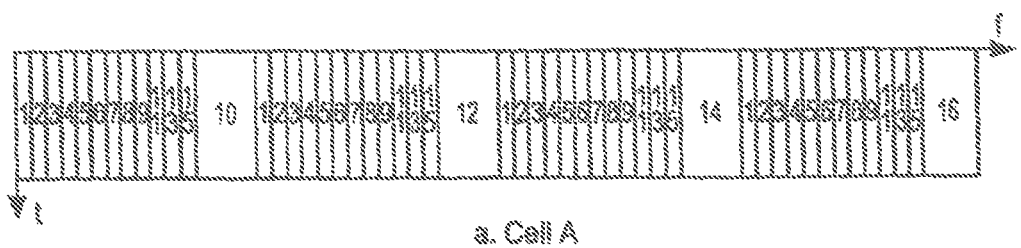
FIG. 12 illustrates one embodiment of a reconfiguration of cluster classification.

The ratio/allocation of the numbers of coherence and diversity clusters in a cell depends on the ratio of the population of mobile and fixed subscribers. When the population changes as the system evolves, the allocation of coherence and diversity clusters can be reconfigured, to accommodate the new system needs. FIG. 12 illustrates a reconfiguration of cluster classification which can support more mobile subscribers than that in FIG. 9.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method, comprising:
    transmitting, at a first time by a base station, at least a first pilot symbol to a subscriber unit for measuring the at least a first pilot symbol and obtaining first channel and interference information for a plurality of orthogonal frequency division multiple access (OFDMA) subcarriers;
    receiving, by the base station from the subscriber unit, after the transmitting of the at least first pilot symbol to the subscriber unit, first feedback of channel and interference information relating to at least one subset of OFDMA subcarriers of the plurality of OFDMA subcarriers, the receiving of the first feedback of channel and interference information includes receiving a first indication of a modulation and coding rate associated with a first OFDMA subcarrier of the at least one subset of OFDMA subcarriers of the plurality of OFDMA subcarriers and a second indication of a modulation and coding rate associated with a second OFDMA subcarrier of the at least one subset of OFDMA subcarriers of the plurality of OFDMA subcarriers;
    transmitting, by the base station to the subscriber unit, a first allocation of OFDMA subcarriers of the plurality of OFDMA subcarriers selected by the base station for use by the subscriber unit, after, and based on at least the receiving of the first feedback of channel and interference information;
    transmitting, at a second time after the first time, by the base station, at least a second pilot symbol to the subscriber unit for measuring the at least second pilot symbol and obtaining second channel and interference information for the plurality of OFDMA subcarriers;
    receiving, by the base station from the subscriber unit, after the transmitting of the at least second pilot symbol to the subscriber unit, second feedback of channel and interference information relating to the at least one subset of OFDMA subcarriers of the plurality of OFDMA subcarriers, the receiving of the second feedback of channel and interference information includes receiving a third indication of a modulation and coding rate associated with the first OFDMA subcarrier of the at least one subset of OFDMA subcarriers of the plurality of OFDMA subcarriers and a fourth indication of a modulation and coding rate associated with the second OFDMA subcarrier of the at least one subset of OFDMA subcarriers of the plurality of OFDMA subcarriers; and
    transmitting, by the base station to the subscriber unit, a second allocation of OFDMA subcarriers of the plurality of OFDMA subcarriers selected by the base station for use by the subscriber unit, after, and based on at least the receiving of the second feedback of channel and interference information.

2. The method of claim 1, further comprising transmitting, by the base station to the subscriber unit, a retraining request, the second feedback of channel and interference information being received after the transmitting of the retraining request.

3. The method of claim 1, wherein at least one OFDMA subcarrier of the first allocation of OFDMA subcarriers of the plurality of OFDMA subcarriers is non-contiguous with other OFDMA subcarriers of the first avocation of OFDMA subcarriers of the plurality of OFDMA subcarriers.

4. The method of claim 1, wherein the first, second, third, and fourth indications of modulation and coding rates associated with the first and second OFDMA subcarriers of the at least one subset of OFDMA subcarriers of the plurality of OFDMA subcarriers include a signal-to-interference-plus-noise ratio (SINR) index.

5. The method of claim 1, wherein the receiving of the first feedback of channel and interference information and the second feedback of channel and interference information from the subscriber unit occurs on all OFDMA subcarriers of the plurality of OFDMA subcarriers.

6. The method of claim 1, wherein the second allocation of OFDMA subcarriers of the plurality of OFDMA subcarriers is different from the first allocation of OFDMA subcarriers of the plurality of OFDMA subcarriers.

7. The method of claim 1, wherein each of the first and second pilot symbols occupies an entire orthogonal frequency division multiplexing (OFDM) frequency bandwidth.

8. A base station, comprising:
    a transceiver configured to:
        transmit, at a first time, at least a first pilot symbol to a subscriber unit for measuring the at least a first pilot symbol and obtaining first channel and interference information for a plurality of orthogonal frequency division multiple access (OFDMA) subcarriers;
        receive, from the subscriber unit, after the transmitting of the at least first pilot symbol to the subscriber unit, first feedback of channel and interference information relating to at least one subset of OFDMA subcarriers of the plurality of OFDMA subcarriers, the receiving of the first feedback of channel and interference information includes receiving a first indication of a modulation and coding rate associated with a first OFDMA subcarrier of the at least one subset of OFDMA subcarriers of the plurality of OFDMA subcarriers and a second indication of a modulation and coding rate associated with a second OFDMA subcarrier of the at least one subset of OFDMA subcarriers of the plurality of OFDMA subcarriers;
        transmit, to the subscriber unit, a first allocation of OFDMA subcarriers of the plurality of OFDMA subcarriers selected by the base station for use by the subscriber unit, after, and based on at least the receipt of the first feedback of channel and interference information;
        transmit, at a second time after the first time, at least a second pilot symbol to the subscriber unit for measuring the at least second pilot symbol and obtaining second channel and interference information for the plurality of OFDMA subcarriers;
        receive, from the subscriber unit, after the transmission of the at least second pilot symbol to the subscriber unit, second feedback of channel and interference information relating to the at least one subset of OFDMA subcarriers of the plurality of OFDMA subcarriers, the receipt of the second feedback of channel and interference information includes receiving a third indication of a modulation and coding rate associated with the first OFDMA subcarrier of the at least one subset of OFDMA subcarriers of the plurality of OFDMA subcarriers and a fourth indication of a modulation and coding rate associated with the second subcarrier of the at least one subset of OFDMA subcarriers of the plurality of OFDMA subcarriers: and
        transmit, to the subscriber unit, a second allocation of OFDMA subcarriers of the plurality of OFDMA subcarriers selected by the base station for use by the subscriber unit, after, and based on at least the receipt of the second feedback of channel and interference information.

9. The base station of claim 8, wherein the transceiver is further configured to transmit, to the subscriber unit, a retraining request, the receipt of the second feedback of channel and interference information occurring after the transmission of the retraining request.

10. The base station of claim 8, wherein at least one OFDMA subcarrier of the first allocation of OFDMA subcarriers of the plurality of OFDMA subcarriers is non-contiguous with other OFDMA subcarriers of the first allocation of OFDMA subcarriers of the plurality of OFDMA subcarriers.

11. The base station of claim 8, wherein the first, second, third, and fourth indications of modulation and coding rates associated with the first and second OFDMA subcarriers of the at least one subset of OFDMA subcarriers of the plurality of OFDMA subcarriers include a signal-to-interference-plus-noise ratio (SINR) index.

12. The base station of claim 8, wherein the receipt of the first feedback of channel and interference information and the second feedback of channel and interference information from the subscriber unit occurs on all OFDMA subcarriers of the plurality of OFDMA subcarriers.

13. The base station of claim 8, wherein the second allocation of OFDMA subcarriers of the plurality of OFDMA subcarriers is different from the first allocation of OFDMA subcarriers of the plurality of OFDMA subcarriers.

14. The base station of claim 8, wherein each of the first and second pilot symbols occupies an entire orthogonal frequency division multiplexing (OFDM) frequency bandwidth.

15. A method for a wireless system employing orthogonal frequency division multiple access (OFDMA) at least on a downlink, the method comprising:
providing, at a first step by a base station, a first pilot symbol using a plurality of OFDMA subcarriers to a subscriber unit;
receiving, at a second step by the base station from the subscriber unit, first feedback information as to a plurality of clusters, each of which includes at least two OFDMA subcarriers of the plurality of OFDMA subcarriers;
providing, at a third step by the base station, first allocation information as to a first plurality of OFDMA subcarriers to the subscriber unit for use by the subscriber unit;
providing, at a fourth step by the base station, a second pilot symbol using a plurality of OFDMA subcarriers to the subscriber unit;
receiving, at a fifth step by the base station, from the subscriber unit, second feedback information as to the plurality of clusters;
providing, at a sixth step by the base station, second allocation information as to a second plurality of OFDMA subcarriers to the subscriber unit for use by the subscriber unit;
the first feedback information including indices relating to a first modulation and coding rate respectively for each cluster of the plurality of clusters; and
the second feedback information including indices relating to a second modulation and coding rate respectively for each cluster of the plurality of clusters.

16. The method according to claim 15, wherein each of the first and second feedback information is compressed using source coding techniques and encoded using error correcting codes.

17. The method according to claim 15, wherein the first pilot symbol and the second pilot symbol cover an entire OFDM frequency bandwidth.

18. The method according to claim 15, wherein the first allocation information is to show that the first plurality of OFDMA subcarriers are selected from at least one cluster of the plurality of clusters upon which the first feedback information is received.

19. The method according to claim 15, wherein the second allocation information is to show that the second plurality of OFDMA subcarriers are selected from at least one cluster of the plurality of clusters upon which the second feedback information is received.

20. The method according to claim 15, wherein the plurality of OFDMA subcarriers are selected from at least one cluster with good performance relative to other clusters.

21. The method according to claim 15, wherein the fifth step is initiated by the base station and based on a request provided by the base station.

22. The method according to claim 15, wherein the fifth step is initiated by he base station as a part of a retraining process.

23. The method according to claim 15, wherein the first feedback information is pertinent to first channel and interference information that the subscriber unit measures based on the first pilot symbol provided by the base station, and
wherein the second feedback information is pertinent to second channel and interference information that the subscriber unit measures based on the second pilot symbol provided by the base station.

24. A base station for a wireless system employing orthogonal frequency division multiple access (OFDMA) at least on a downlink, the base station comprising:
a processor configured to:
provide a first pilot symbol using a plurality of OFDMA subcarriers to a subscriber unit, at a first step;
receive, from the subscriber unit, first feedback information as to a plurality of clusters, each of which includes at least two OFDMA subcarriers of the plurality of OFDMA subcarriers, at a second step;
provide first allocation information as to a first plurality of OFDMA subcarriers to the subscriber unit for use by the subscriber unit, at a third step;
provide a second pilot symbol using a plurality of OFDMA subcarriers to the subscriber unit, at a fourth step;
receive, from the subscriber unit, second feedback information as to the plurality of clusters, at a fifth step;
provide second allocation information as to a second plurality of OFDMA subcarriers to the subscriber unit for use by the subscriber unit, at a sixth step;
the first feedback information including indices relating to a first modulation and coding rate respectively for each cluster of the plurality of clusters; and
the second feedback information including indices relating to a second modulation and coding rate respectively for each cluster of the plurality of clusters.

25. The base station according to claim 24, wherein each of the first and second feedback information is compressed using source coding techniques and encoded using error correcting codes.

26. The base station according to claim 24, wherein the first pilot symbol and the second pilot symbol cover an entire OFDM frequency bandwidth.

27. The base station according to claim 24, wherein the first allocation information is to show that the first plurality of OFDMA subcarriers are selected from at least one duster of the plurality of dusters upon which the first feedback information is received.

28. The base station according to claim 24, wherein the second allocation information is to show that the second plurality of OFDMA subcarriers are selected from at least one duster upon which the second feedback information is received.

29. The base station according to claim 24, wherein the plurality of OFDMA subcarriers are selected from at least one duster with good performance relative to other dusters.

30. The base station according to claim 24, wherein the fifth step is initiated by the base station and based on a request provided by the base station.

31. The base station according to claim 24, wherein the fifth step is initiated by the base station as a part of a retraining process.

32. The base station according to claim 24, wherein the first feedback information is pertinent to first channel and interference information that the subscriber unit measures based on the first pilot symbol provided by the base station, and wherein the second feedback information is pertinent to second channel and interference information that the subscriber unit measures based on the second pilot symbol provided by the base station.

* * * * *